(12) United States Patent
Zhang et al.

(10) Patent No.: US 10,925,116 B2
(45) Date of Patent: Feb. 16, 2021

(54) BEAM INDICATION FOR SEMI-PERSISTENT AND GRANT-FREE TRANSMISSIONS

(71) Applicant: Apple Inc., Cupertino, CA (US)

(72) Inventors: Yushu Zhang, Beijing (CN); Gang Xiong, Beaverton, OR (US); Guotong Wang, Beijing (CN); Alexei Vladimirovich Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/449,294

(22) Filed: Jun. 21, 2019

(65) Prior Publication Data

US 2019/0306924 A1    Oct. 3, 2019

Related U.S. Application Data

(63) Continuation of application No. PCT/CN2018/092842, filed on Jun. 26, 2018, and a continuation of application No. PCT/CN2018/092907, filed on Jun. 26, 2018, and a continuation of application No. PCT/CN2018/093855, filed on Jun. 29, 2018, and a continuation of application No. PCT/CN2018/100006, filed on Aug. 10, 2018.

(Continued)

(51) Int. Cl.
*H04W 88/06*      (2009.01)
*H04B 7/06*      (2006.01)
(Continued)

(52) U.S. Cl.
CPC .......... *H04W 88/06* (2013.01); *H04B 7/0695* (2013.01); *H04L 5/0051* (2013.01); *H04L 25/0226* (2013.01); *H04W 72/042* (2013.01); *H04W 72/046* (2013.01); *H04W 72/0493* (2013.01); *H04W 72/1257* (2013.01); *H04W 72/14* (2013.01); *H04W 76/27* (2018.02); *H04W 80/02* (2013.01)

(58) Field of Classification Search
None
See application file for complete search history.

(56) References Cited

U.S. PATENT DOCUMENTS

2017/0195998 A1* 7/2017 Zhang .................... H04B 7/086
2017/0302355 A1* 10/2017 Islam ................... H04B 7/0621
(Continued)

*Primary Examiner* — Brian S Roberts
(74) *Attorney, Agent, or Firm* — Kowert, Hood, Munyon, Rankin & Goetzel, P.C.

(57) ABSTRACT

A UE can include processing circuitry coupled to memory. To configure the UE for semi-persistent scheduling (SPS) transmission or a grant-free transmission, the processing circuitry is to decode RRC signaling from a base station, the RRC signaling configuring a plurality of transmission configuration information (TCI) candidates indicating a first set of transmission beams for an initial transmission on an SPS PDSCH. The initial transmission uses an initial transmission beam that is selected based on a TCI beam index. A MAC CE from the base station is decoded, the MAC CE indicating a re-configuration of the plurality of TCI candidates to include at least a second set of transmission beams for the SPS PDSCH. A transmission beam is selected from the second set of transmission beams based on the TCI beam index. Downlink data received in a subsequent transmission via the selected transmission beam on the SPS PDSCH is decoded.

20 Claims, 30 Drawing Sheets

Related U.S. Application Data

(60) Provisional application No. 62/770,404, filed on Nov. 21, 2018.

(51) Int. Cl.
| | |
|---|---|
| *H04W 72/12* | (2009.01) |
| *H04W 72/04* | (2009.01) |
| *H04W 72/14* | (2009.01) |
| *H04W 80/02* | (2009.01) |
| *H04L 25/02* | (2006.01) |
| *H04L 5/00* | (2006.01) |
| *H04W 76/27* | (2018.01) |

(56) References Cited

U.S. PATENT DOCUMENTS

| | | | |
|---|---|---|---|
| 2019/0150124 A1* | 5/2019 | Nogami | H04W 72/0446 370/330 |
| 2019/0158205 A1* | 5/2019 | Sheng | H04L 5/0048 |
| 2020/0137821 A1* | 4/2020 | Cirik | H04B 17/327 |

* cited by examiner

BEAM INDICATION FOR SEMI-PERSISTENT AND GRANT-FREE TRANSMISSIONS

PRIORITY CLAIM

This application claims the benefit of priority to the following applications:

PCT Patent Application Serial No. PCT/CN2018/093855, filed Jun. 29, 2018, and entitled "INTERFERENCE AWARE BEAM REPORTING;"

PCT Patent Application Serial No. PCT/CN2018/092842, filed Jun. 26, 2018, and entitled "SECONDARY CELL BEAM FAILURE RECOVERY;"

PCT Patent Application Serial No. PCT/CN2018/100006, filed Aug. 10, 2018, and entitled "SYNCHRONIZATION SIGNAL BLOCK QUASI CO-LOCATION (QCL) INDICATION;"

PCT Patent Application Serial No. PCT/CN2018/092907, filed Jun. 26, 2018, and entitled "BEAM INDICATION FOR SEMI-PERSISTENT AND GRANT-FREE TRANSMISSION;" and U.S. Provisional Patent Application Ser. No. 62/770,404, filed Nov. 21, 2018, and entitled "SYSTEM AND METHOD FOR BEAM INDICATION FOR UPLINK AND DOWN-LINK TRANSMISSIONS."

Each of the above-identified provisional patent applications is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for interference aware beam reporting. Further aspects are related to secondary cell beam failure recovery. Yet other aspects are related to synchronization signal block quasi co-location (QCL) indication. Additional aspects are related to beam indication for semi-persistent and grant-free transmission. Further aspects are related to systems and methods for beam indication for uplink and downlink transmissions.

BACKGROUND

Mobile communications have evolved significantly from early, voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments. Additional operations in the unlicensed spectrum include NR-U type communications in the unlicensed band.

Further enhanced operation of LTE systems in the licensed as well as unlicensed spectrum is expected in future releases and 5G systems. Such enhanced operations can include techniques to address interference aware beam reporting, secondary cell beam failure recovery, synchronization signal block quasi co-location (QCL) indication, beam indication for semi-persistent and grant-free transmission, and beam indication for uplink and downlink transmissions.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
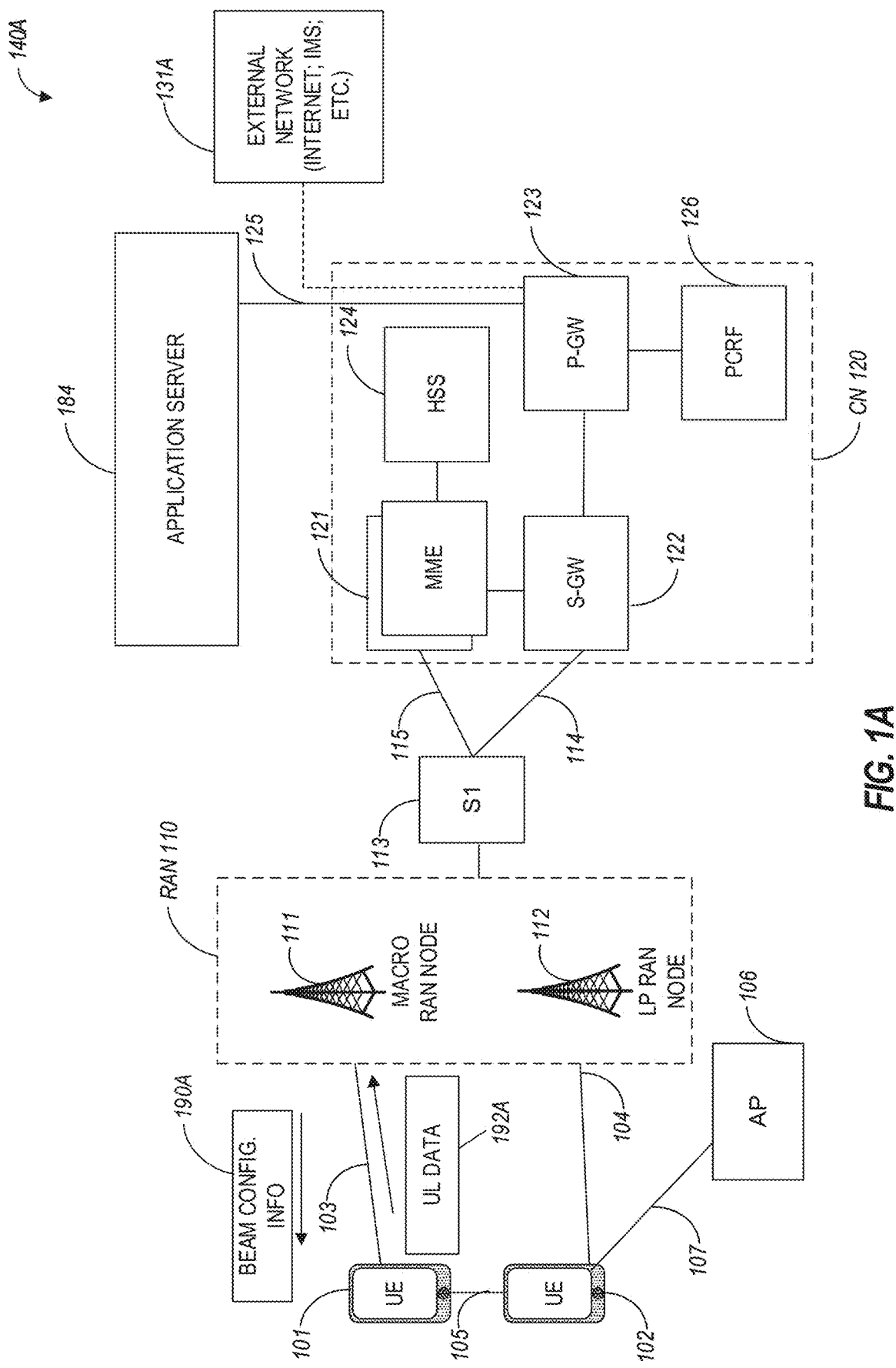
FIG. 1A illustrates an architecture of a network in accordance with some aspects.

FIG. 1A illustrates an architecture of a network in accordance with some aspects. The network 140A is shown to include user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, drones, or any other computing device including a wired and/or wireless communications interface.

Any of the radio links described herein (e.g., as used in the network 140A or any other illustrated network) may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third. Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UNITS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G or 5G-NR, 3GPP LTE Extra, LTE-Advanced Pro, LTE Licensed-Assisted. Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched. Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.1 lay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

LTE and LTE-Advanced are standards for wireless communications of high-speed data for user equipment (UE) such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced. LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where, in particular, the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, FIG. 1D, FIG. 1E, FIG. 1F, and FIG. 1G.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMF's 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UL's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land. Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PDSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some aspects, the UE 101 can receive configuration information 190A for beam indication for semi-persistent and grant-free transmission of uplink or downlink information. In some aspects, the configuration information 190A can include downlink control information (DCI), radio resource control RRC) signaling, or another type of configuration information. In some aspects, the configuration information 190A includes beam indication for downlink information, which can be communicated in a physical downlink shared channel and received via the UE 101 using the indicated beam. In other aspects, the configuration information 190A includes beam indication for uplink data transmission. In this regard, the UE 101 can transmit uplink data 192A based on the beam configuration information 190A. Other aspects for beam indication for semi-persistent and grant-free transmissions are discussed hereinbelow.

Figure 1B:
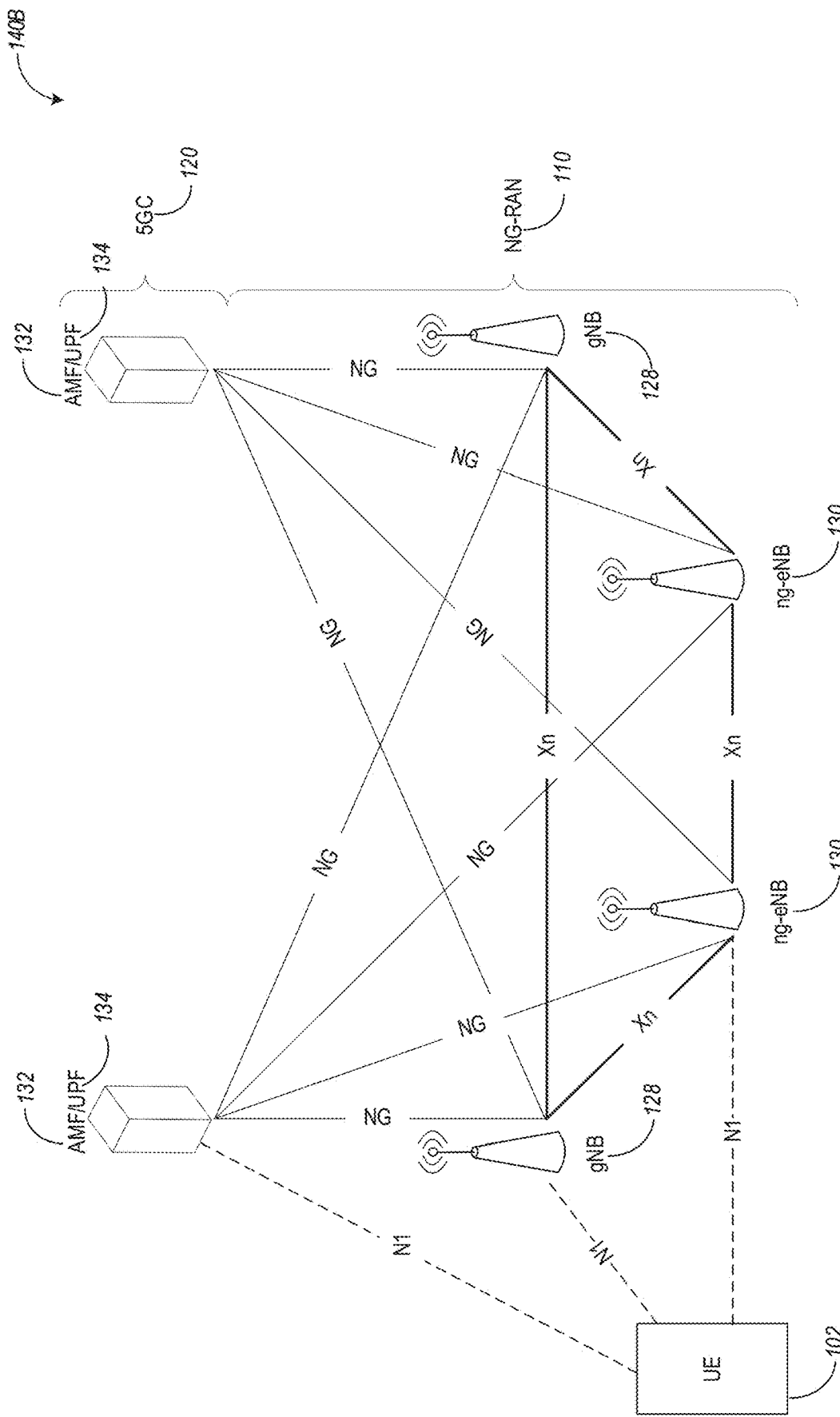
FIG. 1B is a simplified diagram of an overall next generation (NG) system architecture in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130. The gNBs 128 and the NG-eNBs 130 can be communicatively coupled to the UE 102 via, e.g., an N1 interface.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE and is connected via the NG interface to the 5GC 120. In some aspects, an NG-eNB 130 can include a node providing evolved universal terrestrial radio access (E-UTRA) user plane and control plane protocol terminations towards the UE and is connected via the NG interface to the 5GC 120.

In some aspects, each of the gNBs 128 and the NG-eNBs 130 can be implemented as a base station, a mobile edge server, a small cell, a home eNB, and so forth.

Figure 1C:
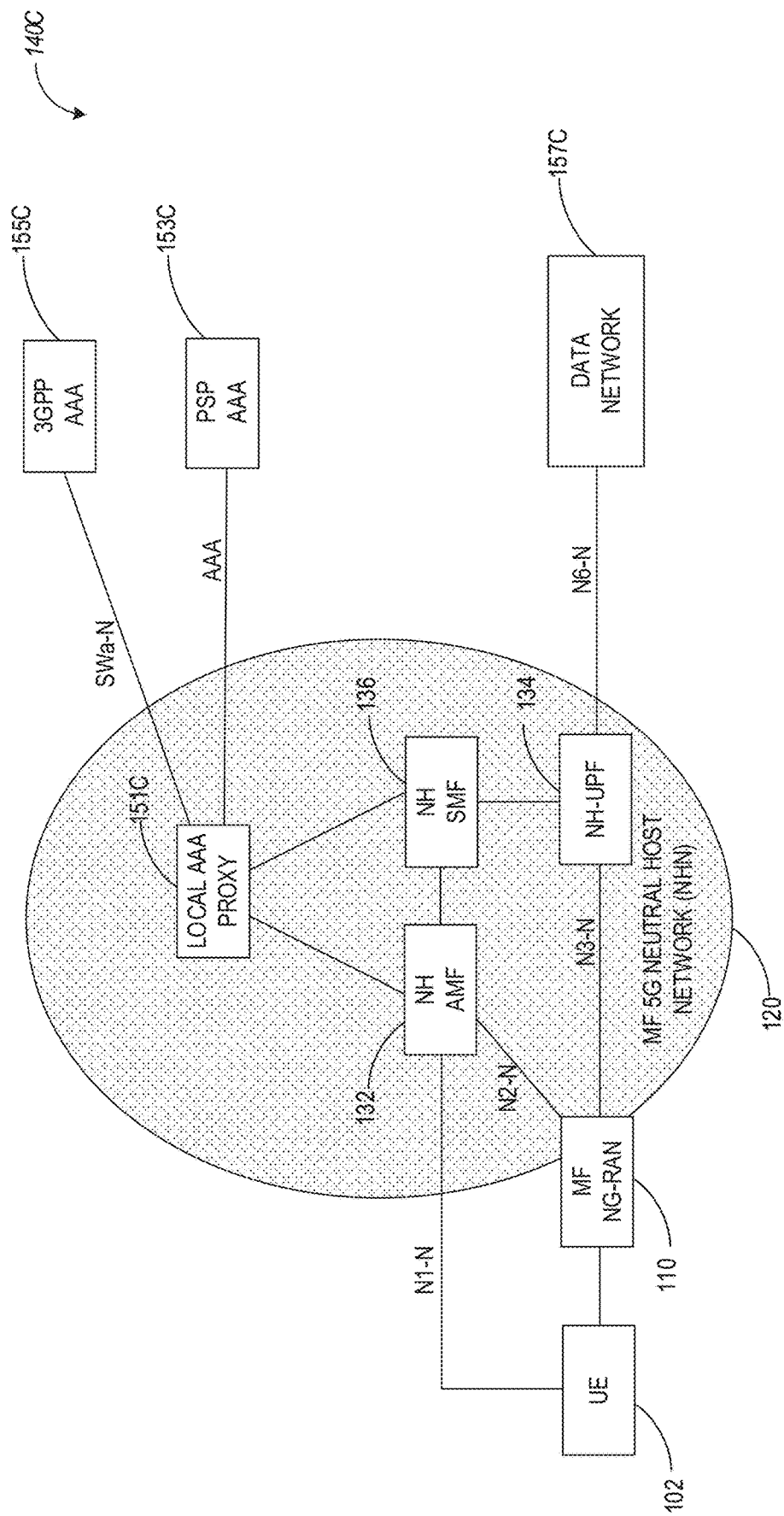
FIG. 1C illustrates an example MulteFire Neutral Host Network (NHN) 5G architecture in accordance with some aspects.

FIG. 1C illustrates an example MulteFire Neutral Host Network (NHN) 5G architecture 140C in accordance with some aspects. Referring to FIG. 1C, the MulteFire 5G architecture 140C can include the UE 102, NG-RAN 110, and the core network 120. The NG-RAN 110 can be a MulteFire NG-RAN (MF NG-RAN), and the core network 120 can be a MulteFire 5G neutral host network (NHN).

In some aspects, the MF NHN 120 can include a neutral host AME (NH AMF) 132, an NH SMF 136, an NH UPF 134, and a local AAA proxy 151C. The AAA proxy 151C can provide a connection to a 3GPP AAA server 155C and a participating service provider AAA (PSP AAA) server 153C. The NH-UPF 134 can provide a connection to a data network 157C.

The MF NG-RAN 120 can provide similar functionalities as an NG-RAN operating under a 3GPP specification. The NH-AMF 132 can be configured to provide similar functionality as an AMF in a 3GPP 5G core network (e.g., as described in reference to FIG. 1D). The NH-SMF 136 can be configured to provide similar functionality as an SMF in a 3GPP 5G core network (e.g., as described in reference to FIG. 1D). The NH-UPF 134 can be configured to provide similar functionality as a UPF in a 3GPP 5G core network (e.g., as described in reference to FIG. 1D).

Figure 1D:
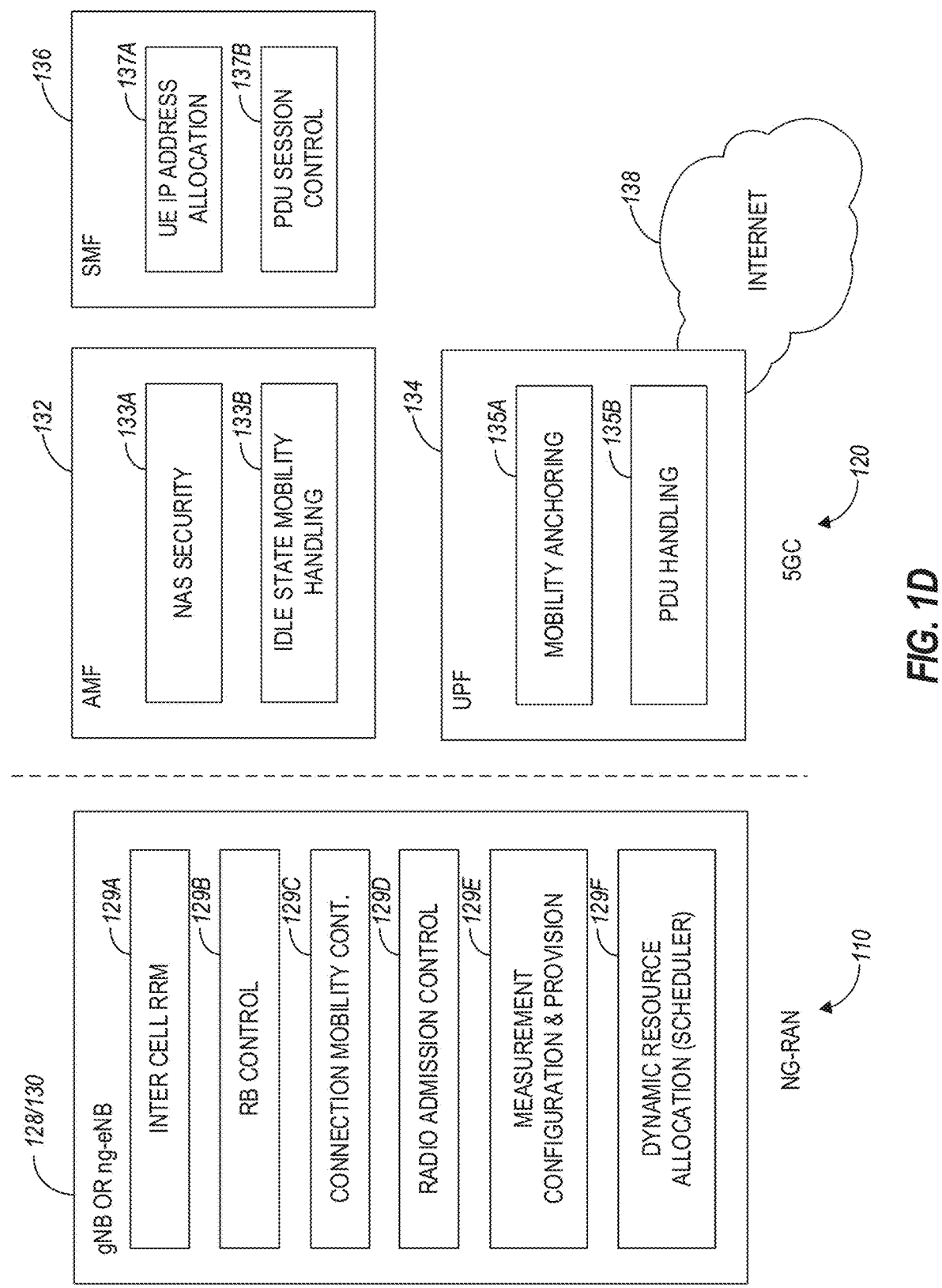
FIG. 1D illustrates a functional split between next generation radio access network (NG-RAN) and the 5G Core network (5GC) in accordance with some aspects.

FIG. 1D illustrates a functional split between NG-RAN and the 5G Core (5GC) in accordance with some aspects. Referring to FIG. 1D, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter-core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL, rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1E:
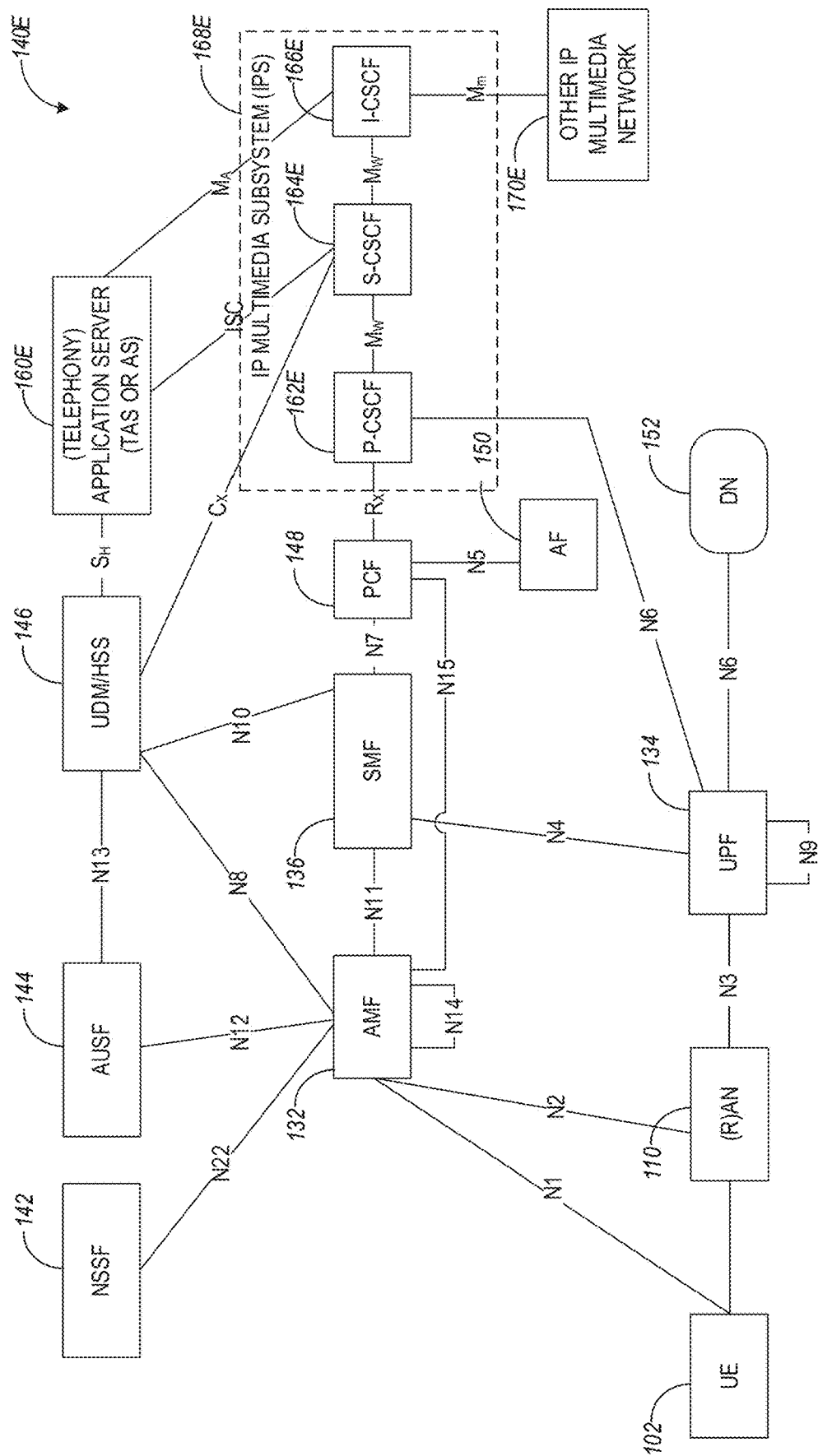
FIG. 1E and FIG. 1F illustrate a non-roaming 5G system architecture in accordance with some aspects.
Figure 1F:
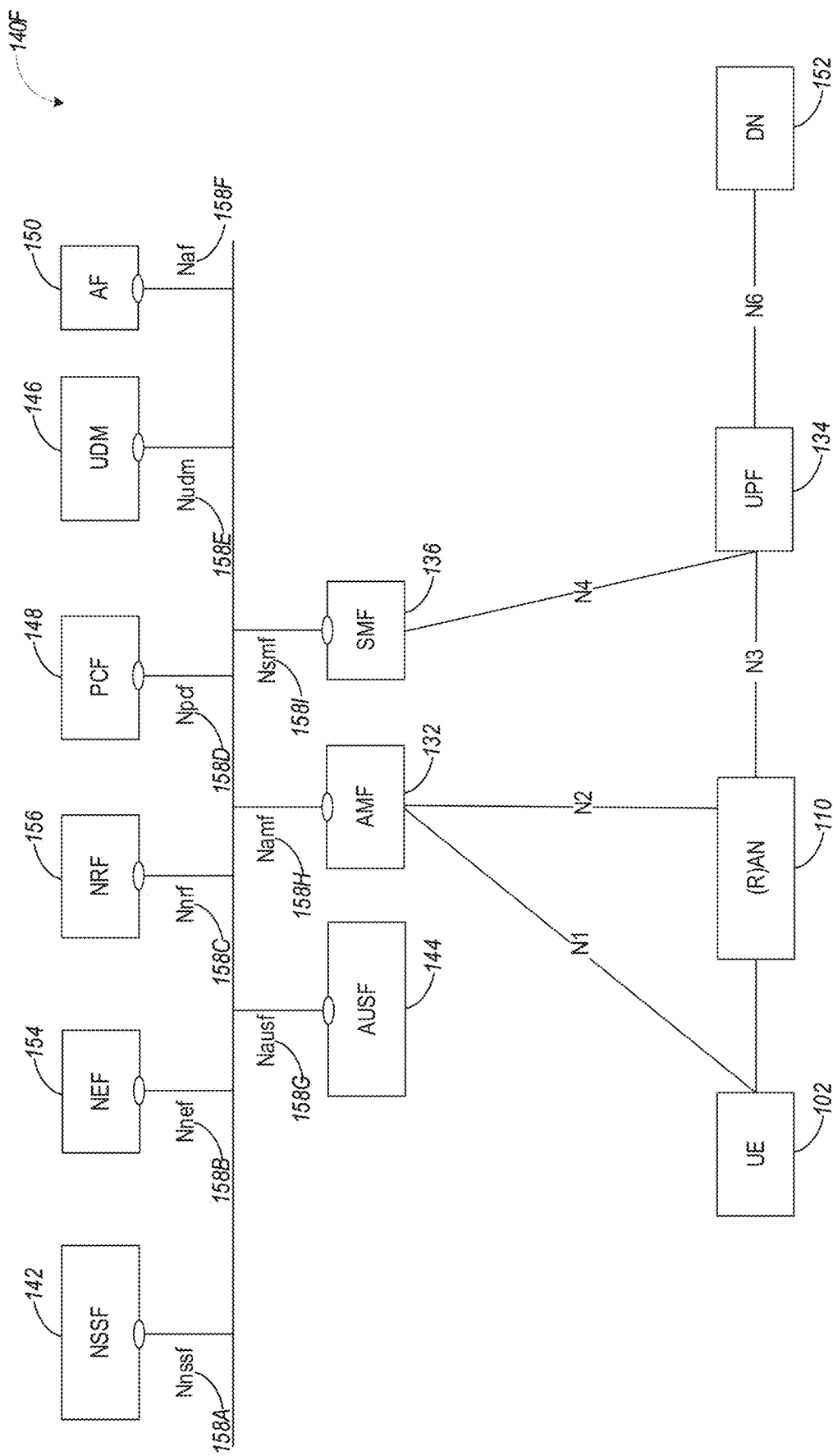

FIG. 1E and FIG. 1F illustrate a non-roaming 5G system architecture in accordance with some aspects. Referring to FIG. 1E, there is illustrated a 5G system architecture 140E in a reference point representation. More specifically, UE 102 can be in communication with RAN 110 as well as one or more other 5G core (5GC) network entities. The 5G system architecture 140E includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AU SF) 144, and unified data management (UDM)/home subscriber server (HSS) 146. The UPF 134 can provide a connection to a data network (DN) 152, which can include, for example, operator services, Internet access, or third-party services. The AMF can be used to manage access control and mobility, and can also include network slice selection functionality. The SMF can be configured to set up and manage various sessions according to network policy. The UPF can be deployed in one or more configurations according to the desired service type. The PCF can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140E includes an IP multimedia subsystem (IMS) 168E as well as a plurality of IP multimedia core network subsystem entities, such as call session control functions (CSCFs). More specifically, the IMS 168E includes a CSCF, which can act as a proxy CSCF (P-CSCF) 162E, a serving CSCF (S-CSCF) 164E, an emergency CSCF (E-CSCF) (not illustrated in FIG. 1E), and/or interrogating CSCF (I-CSCF) 166E. The P-CSCF 162E can be configured to be the first contact point for the UE 102 within the JIM subsystem (IMS) 168E. The S-CSCF 164E can be configured to handle the session states in the network, and the E-CSCF can be configured to handle certain aspects of emergency sessions such as routing an emergency request to the correct emergency center or PSAP. The I-CSCF 166E can be configured to function as the contact point within an operators network for all IMS connections destined to a subscriber of that network operator, or a roaming subscriber currently located within that network operator's service area. In some aspects, the I-CSCF 166E can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160E can be coupled to the IMS 168E via the S-CSCF 164E and/or the I-CSCF 166E.

In some aspects, the 5G system architecture 140E can use unified access barring mechanism using one or more of the techniques described herein, which access barring mechanism can be applicable for all RRC states of the UE 102, such as RRC_IDLE, RRC_CONNECTED, and RRC_INACTIVE states.

In some aspects, the 5G system architecture 140E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator-specific ways.

Referring to FIG. 1F, there is illustrated a 5G system architecture 140F and a service-based representation. System architecture 140F can be substantially similar to (or the same as) system architecture 140E. In addition to the network entities illustrated in FIG. 1E, system architecture 140F can also include a network exposure function (NEF) 154 and a network repository function (NRF) 156.

In some aspects, 5G system architectures can be service-based and interaction between network functions can be represented by corresponding point-to-point reference points Ni (as illustrated in FIG. 1E) or as service-based interfaces (as illustrated in FIG. 1F).

A reference point representation shows that interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150), N6 (between the UPF 134 and the DN 152), N7 (between the SMF 136 and the PCF 148), N8 (between the UDM 146 and the ANF 132), N9 (between two UPFs 134), N10 (between the UDM 146 and the SMF 136), N11 (between the AMF 132 and the SMF 136), N12 (between the AUSF 144 and the AMF 132), N13 (between the AUSF 144 and the UDM 146), N14 (between two AMFs 132), N15 (between the PCF 148 and the AMF 132 in case of a non-roaming scenario, or between the PCF 148 and a visited network and AMF 132 in case of a roaming scenario), N16 (between two SMFs; not illustrated in FIG. 1E), and N22 (between AMF 132 and NSSF 142). Other reference point representations not shown in FIG. 1E can also be used.

In some aspects, as illustrated in FIG. 1F, service-based representations can be used to represent network functions within the control plane that enable other authorized network functions to access their services. In this regard, 5G system architecture 140F can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1F can also be used.

Figure 1G:
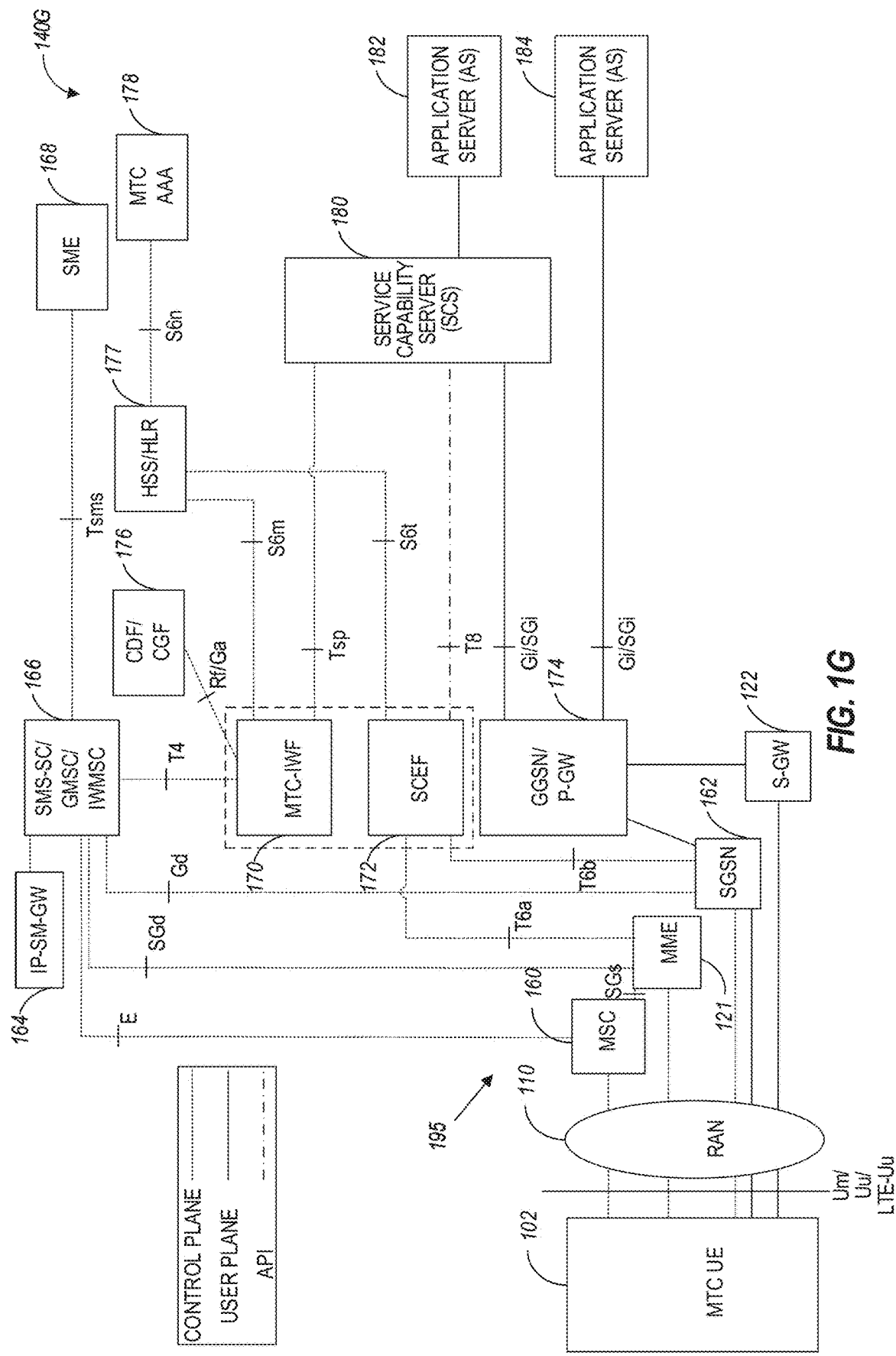
FIG. 1G illustrates an example Cellular Internet-of-Things (CIoT) network architecture in accordance with some aspects.

FIG. 1G illustrates an example of CIoT network architecture in accordance with some aspects. Referring to FIG. 1G, the CIoT architecture 140G can include the UE 102 and the RAN 110 coupled to a plurality of core network entities. In some aspects, the UE 102 can be machine-type communication (MTC) UE. The CIoT network architecture 140G can further include a mobile services switching center (MSC) 160, kLME 121, a serving GPRS support node (SGSN) 162, a S-GW 122, an IP-Short-Message-Gateway (IP-SM-GW) 164, a Short Message Service Service Center (SMS-SC)/gateway mobile service center (GMSC)/Interworking MSC (IWMSC) 166, MTC interworking function (MTC-IWF) 170, a Service Capability Exposure Function (SCEF) 172, a gateway GPRS support node (GGSN)/ Packet-GW (P-GW) 174, a charging data function (CDF)/ charging gateway function (CGF) 176, a home subscriber server (HSS)/a home location register (HLR) 177, short message entities (SME) 168, MTC authorization, authentication, and accounting (MTC AAA) server 178, a service capability server (SCS) 180, and application servers (AS) 182 and 184.

In some aspects, the SCEF 172 can be configured to securely expose services and capabilities provided by various 3GPP network interfaces. The SCEF 172 can also provide means for the discovery of the exposed services and capabilities, as well as access to network capabilities through various network application programming interfaces (e.g., API interfaces to the SCS 180).

FIG. 1G further illustrates various reference points between different servers, functions, or communication nodes of the CIoT network architecture 140G. Some example reference points related to MTC-IWF 170 and SCEF 172 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 170 and the SMS-SC 166 in the HPLMN), T6a (a reference point used between SCEF 172 and serving MME 121), T6b (a reference point used between SCEF 172 and serving SGSN 162), T8 (a reference point used between the SCEF 172 and the SCS/AS 180/182), S6m (a reference point used by MTC-IWF 170 to interrogate HSS/HLR 177), 56*n* (a reference point used by MTC-AAA server 178 to interrogate HSS/HLR 177), and S6*t* (a reference point used between SCEF 172 and HSS/HLR 177).

In some aspects, the CIoT UE 102 can be configured to communicate with one or more entities within the CIoT architecture 140G via the RAN 110 according to a Non-Access Stratum (NAS) protocol, and using one or more reference points, such as a narrowband air interface, for example, based on one or more communication technologies, such as Orthogonal Frequency-Division Multiplexing (OFDM) technology. As used herein, the term "MT UE" refers to a UE capable of CIoT optimizations, as part of a CIoT communications architecture.

In some aspects, the NAS protocol can support a set of NAS messages for communication between the CIoT UE 102 and an Evolved Packet System (EPS) Mobile Management Entity (MMF) 121 and SGSN 162.

In some aspects, the CIoT network architecture 140F can include a packet data network, an operator network, or a cloud service network, having, for example, among other things, a Service Capability Server (SCS) 180, an Application Server (AS) 182, or one or more other external servers or network components.

The RAN 110 can be coupled to the HSS/HLR servers 177 and the AAA servers 178 using one or more reference points including, for example, an air interface based on an S6a reference point, and configured to authenticate/authorize CIoT UE 102 to access the CIoT network. The RAN 110 can be coupled to the CIoT network architecture 140G using one or more other reference points including, for example, an air interface corresponding to an SGi/Gi interface for 3GPP accesses. The RAN 110 can be coupled to the SCEF 172 using, for example, an air interface based on a T6*a*/T6*b* reference point, for service capability exposure. In some aspects, the SCEF 172 may act as an API GW towards a third-party application server such as AS 182. The SCEF 172 can be coupled to the HSS/HLR 177 and MTC AAA 178 servers using an S6t reference point, and can further expose an Application Programming Interface to network capabilities.

In certain examples, one or more of the CIoT devices disclosed herein, such as the CIoT UE 102, the CIoT RAN 110, etc., can include one or more other non-CIoT devices, or non-CIoT devices acting as CIoT devices, or having functions of a CIoT device. For example, the CIoT UE 102 can include a smartphone, a tablet computer, or one or more other electronic device acting as a CIoT device for a specific function, while having other additional functionality.

In some aspects, the RAN 110 can include a CIoT enhanced Node B (CIoT eNB) 111 communicatively coupled to the CIoT Access Network Gateway (CIoT GW) 195. In certain examples, the RAN 110 can include multiple base stations (e.g., CIoT eNBs) connected to the CIoT GW 195, which can include MSC 160, MME 121, SGSN 162, and/or S-GW 122. In certain examples, the internal architecture of RAN 110 and CIoT GW 195 may be left to the implementation and need not be standardized.

As used herein, the term "circuitry" may refer to, be part of, or include an Application Specific Integrated Circuit (ASIC) or other special purpose circuit, an electronic circuit, a processor (shared, dedicated, or group), or memory (shared, dedicated, or group) executing one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, the circuitry may include logic, at least partially operable in hardware. In some aspects, circuitry, as well as modules disclosed herein, may be implemented in combinations of hardware, software and/or firmware. In some aspects, functionality associated with a circuitry can be distributed across more than one piece of hardware or software/firmware module. In some aspects, modules (as disclosed herein) may include logic, at least partially operable in hardware. Aspects described herein may be implemented into a system using any suitably configured hardware or software.

Figure 1H:
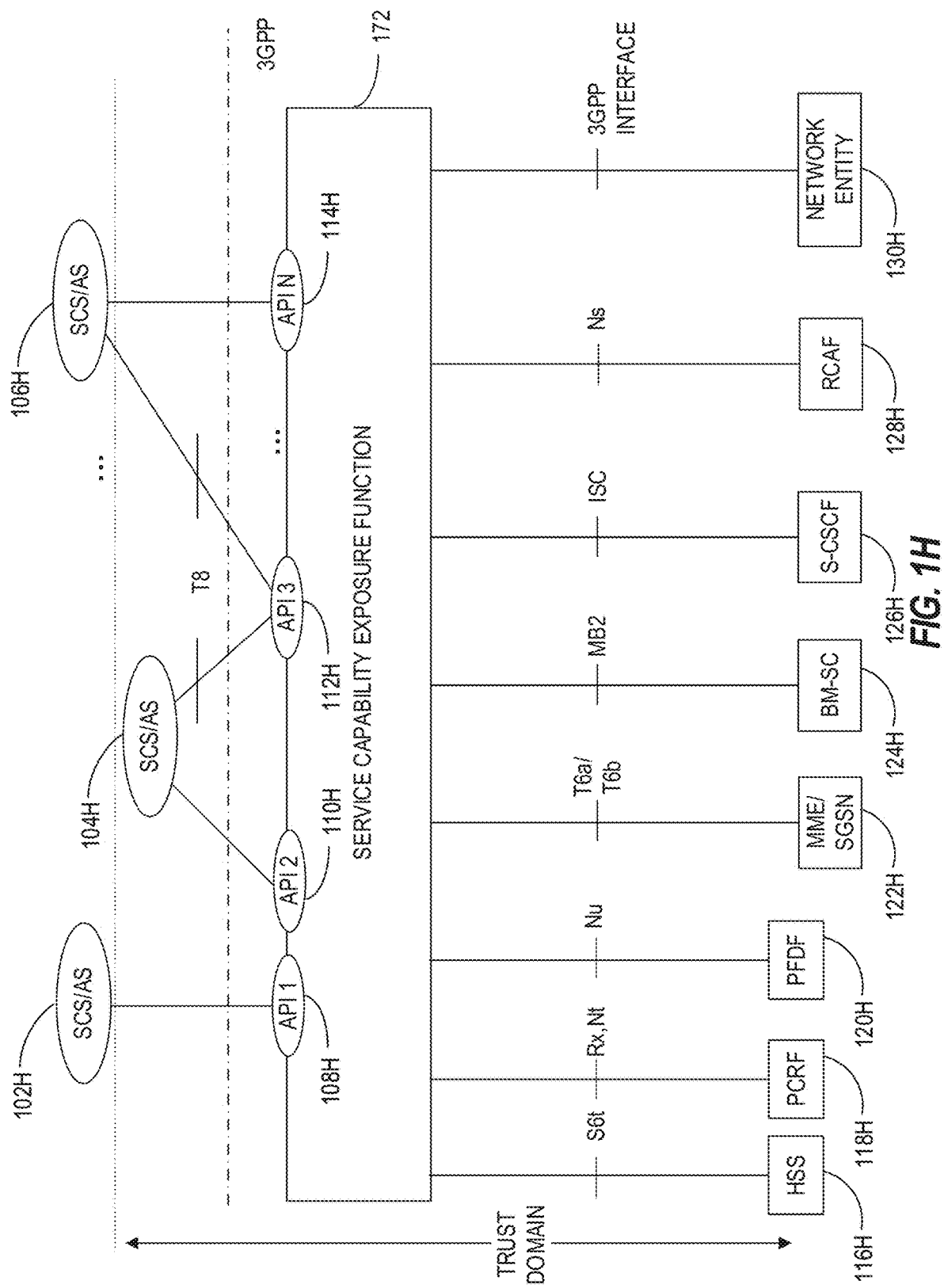
FIG. 1H illustrates an example of a Service Capability Exposure Function (SCEF) in accordance with some aspects.

FIG. 1H illustrates an example of a Service Capability Exposure Function (SCEF) in accordance with some aspects. Referring to FIG. 1H, the SCEF 172 can be configured to expose services and capabilities provided by 3GPP network interfaces to external third-party service provider servers hosting various applications. In some aspects, a 3GPP network such as the CIoT architecture 140G, can expose the following services and capabilities: a home subscriber server (HSS) 116H, a policy and charging rules function (PCRF) 118H, a packet flow description function (PFDF) 120H, a MME/SGSN 122H, a broadcast multicast service center (BM-SC) 124H, a serving call server control function (S-CSCF) 126H, a RAN congestion awareness function (RCAF) 128H, and one or more other network entities 130H. The above-mentioned services and capabilities of a 3GPP network can communicate with the SCEF 172 via one or more interfaces as illustrated in FIG. 1H.

The SCEF 172 can be configured to expose the 3GPP network services and capabilities to one or more applications running on one or more service capability server (SC S)/application server (AS), such as SCS/AS 102H, 104H, . . . , 106H. Each of the SCS/AG 102H-106H can communicate with the SCEF 172 via application programming interfaces (APIs) 108H, 110H, 112H, . . . , 114H, as seen in FIG. 1H.

Figure 1I:
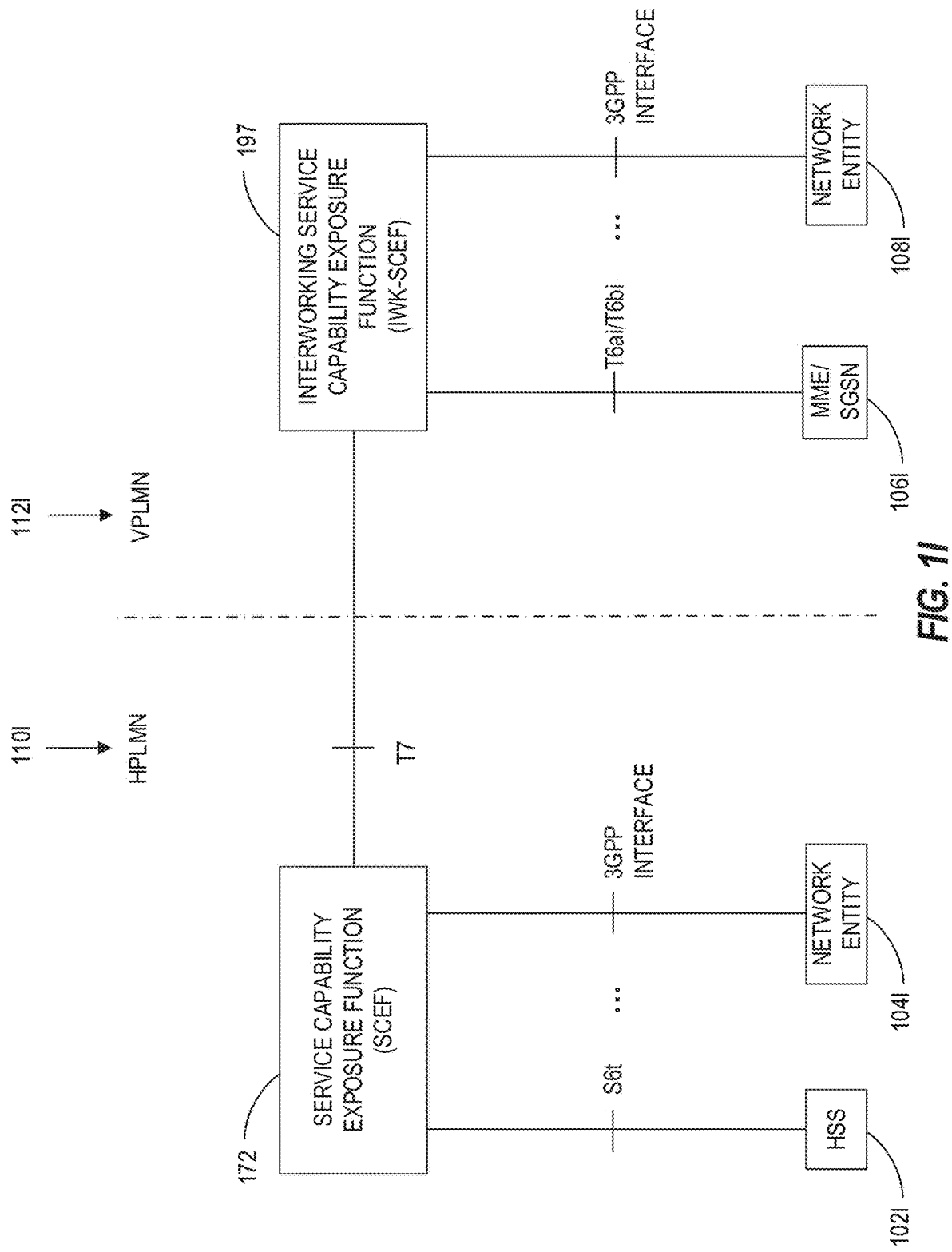
FIG. 1I illustrates an example of roaming architecture for SCEF in accordance with some aspects.

FIG. 1I illustrates an example of roaming architecture for SCEF in accordance with some aspects. Referring to FIG. 1I, the SCEF 172 can be located in HPLMN 110I and can be configured to expose 3GPP network services and capabilities, such as 102I, . . . , 104I. In some aspects, 3GPP network services and capabilities, such as 106I, . . . , 108I, can be located within VPLMN 112L In this case, the 3GPP network services and capabilities within the VPLMN 112I can be exposed to the SCEF 172 via an interworking SCEF (IWK-SCEF) 197 within the VPLMN 112I.

Figure 1J:
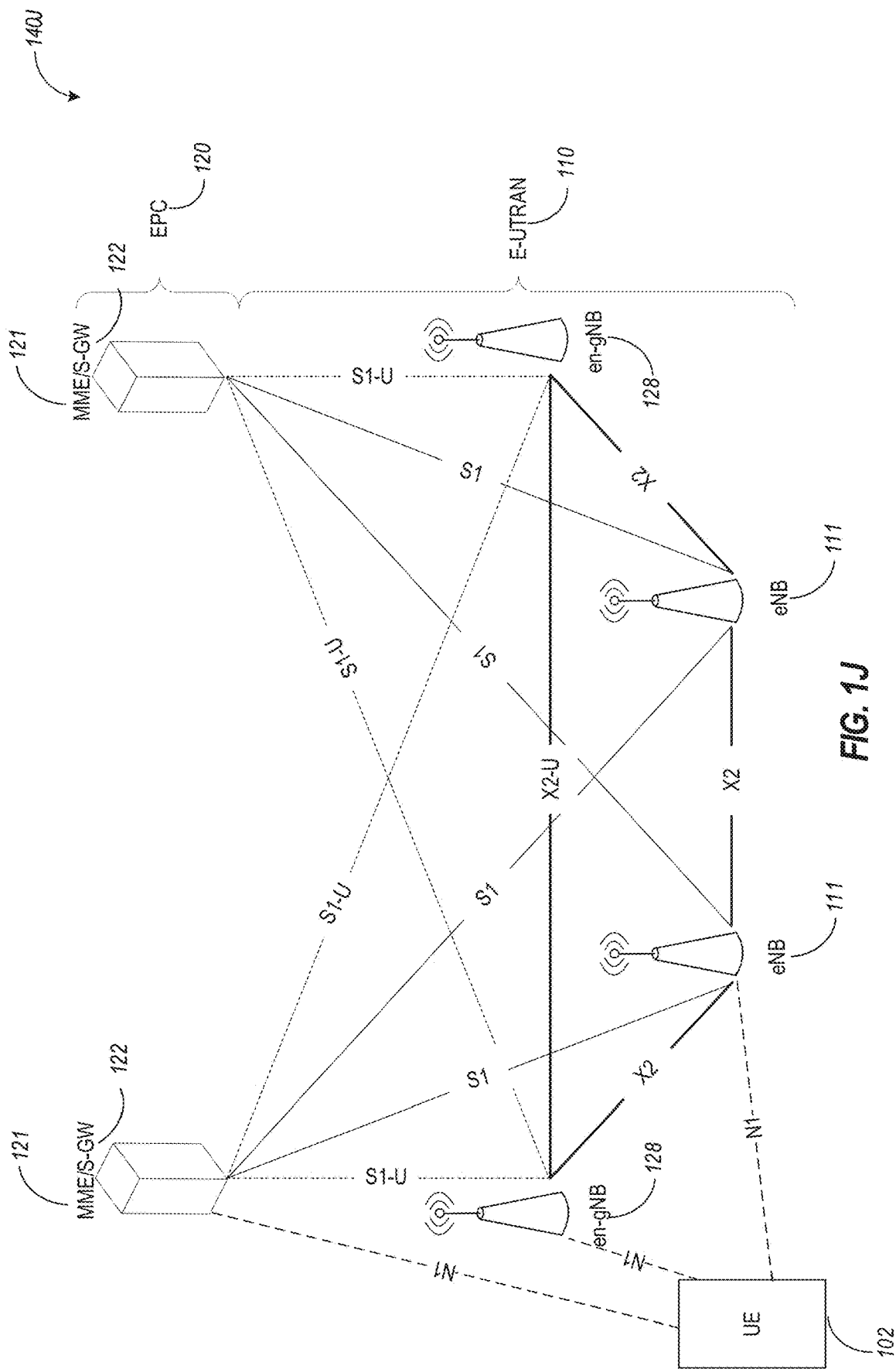
FIG. 1J illustrates an example Evolved Universal Terrestrial Radio Access (E-UTRA) New Radio Dual Connectivity (EN-DC) architecture in accordance with some aspects.

FIG. 1J illustrates an example Evolved Universal Terrestrial Radio Access (E-UTRA) New Radio Dual Connectivity (EN-DC) architecture in accordance with some aspects. Referring to FIG. 1G, the EN-DC architecture 140J includes radio access network (or E-TRA network, or E-TRAN) 110 and EPC 120. The EPC 120 can include MMEs 121 and S-GWs 122. The E-UTRAN 110 can include nodes 111 (e.g., eNBs) as well as Evolved Universal Terrestrial Radio Access New Radio (EN) next generation evolved Node-Bs (en-gNBs) 128.

In some aspects, en-gNBs 128 can be configured to provide NR user plane and control plane protocol terminations towards the UE 102 and acting as Secondary Nodes (or SgNBs) in the EN-DC communication architecture 140J. The eNBs 111 can be configured as master nodes (or MeNBs) in the EN-DC communication architecture 140J. as illustrated in FIG. 1J, the eNBs 111 are connected to the EPC 120 via the S1 interface and to the EN-gNBs 128 via the X2 interface. The EN-gNBs 128 may be connected to the EPC 120 via the S1-U interface, and to other EN-gNBs via the X2-U interface.

Figure 2:
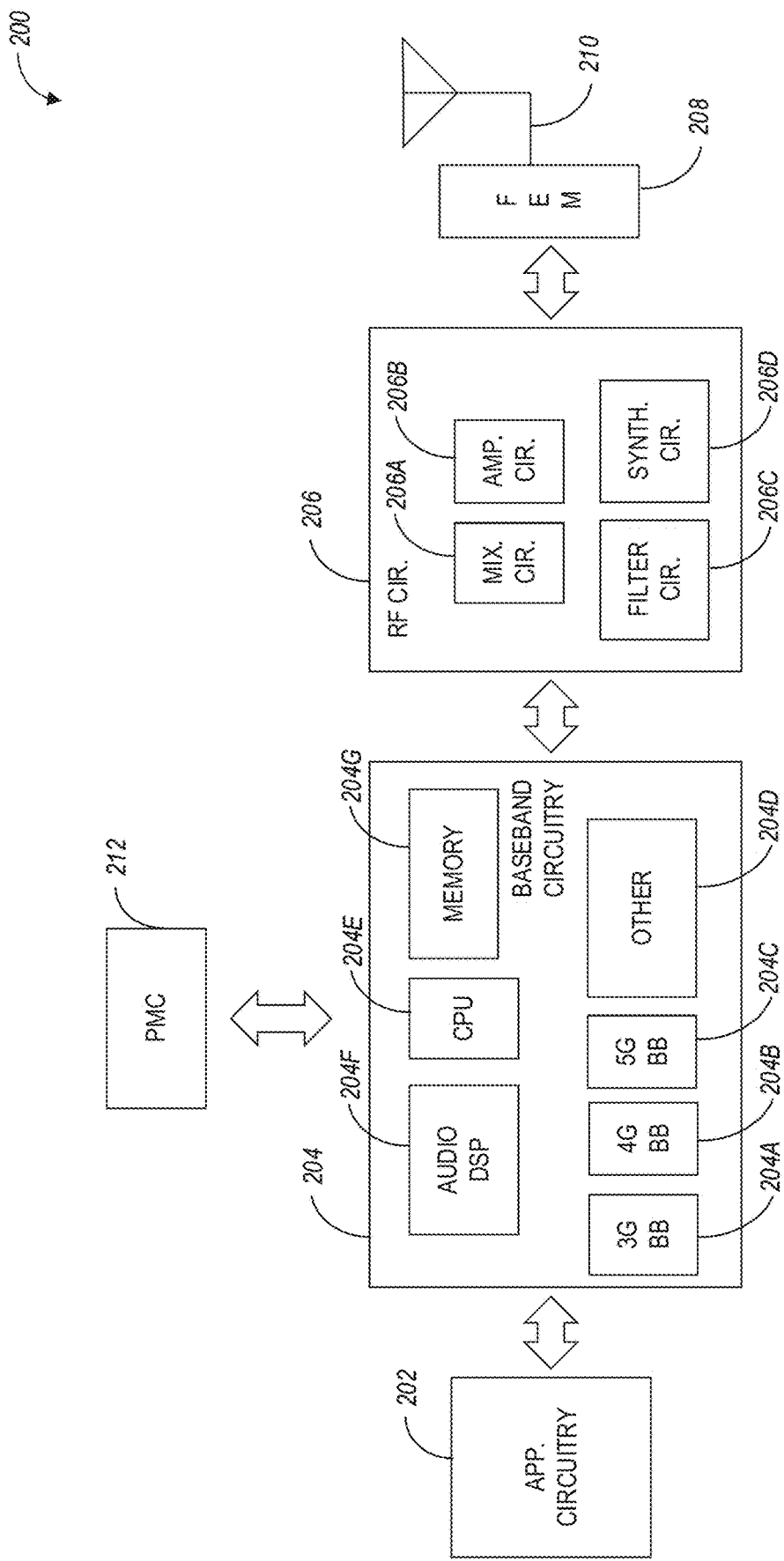
FIG. 2 illustrates example components of a device 200 in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FE M) circuitry 208, one or more antennas 210, and power management circuitry (PMC) 212 coupled together at least as shown. The components of the illustrated device 200 may be included in a UE or a RAN node. In some aspects, the device 200 may include fewer elements (e.g., a RAN node may not utilize application circuitry 202, and instead include a processor/controller to process IP data received from an EPC). In some aspects, the device 200 may include additional elements such as, for example, memory/storage, display, camera, sensor, and/or input/output (I/O) interface elements. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors, special-purpose processors, and dedicated processors (e.g., graphics processors, application processors, etc.). The processors may be coupled with, and/or may include, memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RE circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some aspects, the baseband circuitry 204 may include a third-generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth-generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include but are not limited to, signal modulation/demodulation, encoding/decoding, radio frequency shifting, etc. in some aspects, modulation/demodulation circuitry of the baseband circuitry 204 may include Fast-Fourier Transform (FFT), preceding, or constellation mapping/de-mapping functionality. In some aspects, encoding/decoding circuitry of the baseband circuitry 204 may include convolution, tail-biting convolution, turbo, Viterbi, or Low-Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s) (DSP) 204F. The audio DSP(s) 204F may include elements for compression/decompression and echo cancellation and may include other suitable processing elements in other aspects. Components of the baseband circuitry 204 may be suitably combined in a single chip, a single chipset, or disposed on the same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WMAN), a wireless local area network (WLAN), and/or a wireless personal area network (WPAN). Baseband circuitry 204 configured to support radio communications of more than one wireless protocol may be referred to as multi-mode baseband circuitry, in some aspects.

RF circuitry 206 may enable communication with wireless networks using modulated electromagnetic radiation through a non-solid medium. In various aspects, the RF circuitry 206 may include switches, filters, amplifiers, etc. to facilitate communication with the wireless network. RF circuitry 206 may include a receive signal path which may include circuitry to down-convert RF signals received from the FFM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some aspects, the receive signal path of the RF circuitry 206 may include a mixer 206A, an amplifier 206B, and a filter 206C. In some aspects, the transmit signal path of the RF circuitry 206 may include a filter 206C and a mixer 206A. RF circuitry 206 may also include a synthesizer 206D for synthesizing a frequency for use by the mixer 206A of the receive signal path and the transmit signal path. In some aspects, the mixer 206A of the receive signal path may be configured to down-convert RF signals received from the FEM circuitry 208 based on the synthesized frequency provided by synthesizer 206D. The amplifier 206B may be configured to amplify the down-converted signals and the filter 206C may be a low-pass filter (LPF) or band-pass filter (BPF) configured to remove unwanted signals from the down-converted signals to generate output baseband signals. Output baseband signals may be provided to the baseband circuitry 204 for further processing. In some aspects, the output baseband signals may optionally be zero-frequency baseband signals. In some aspects, mixer 206A of the receive signal path may comprise passive mixers.

In some aspects, the mixer 206A of the transmit signal path may be configured to up-convert input baseband signals based on the synthesized frequency provided by the synthesizer 206D to generate RF output signals for the FEM circuitry 208. The baseband signals may be provided by the baseband circuitry 204 and may be filtered by filter 206C.

In some aspects, the mixer 206A of the receive signal path and the mixer 206A of the transmit signal path may include two or more mixers and may be arranged for quadrature down conversion and upconversion, respectively. In some aspects, the mixer 206A of the receive signal path and the mixer 206A of the transmit signal path may include two or more mixers and may be arranged for image rejection (e.g., Hartley image rejection). In some aspects, the mixer 206A of the receive signal path and the mixer 206A may be arranged for direct down conversion and direct upconversion, respectively. In some aspects, the mixer 206A of the receive signal path and the mixer 206A of the transmit signal path may be configured for super-heterodyne operation.

In some aspects, the output baseband signals and the input baseband signals may optionally be analog baseband signals. According to some alternate aspects, the output baseband signals and the input baseband signals may be digital baseband signals. In these alternate aspects, the RF circuitry 206 may include an analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may optionally be provided for processing signals for each spectrum.

In some aspects, the synthesizer 206D may optionally be a fractional-N synthesizer or a fractional N/N+1 synthesizer, although other types of frequency synthesizers may be suitable. For example, the synthesizer 206D may be a delta-sigma synthesizer, a frequency multiplier, or a synthesizer comprising a phase-locked loop with a frequency divider.

The synthesizer 206D may be configured to synthesize an output frequency for use by the mixer 206A of the RF circuitry 206 based on a frequency input and a divider control input. In some aspects, the synthesizer 206D may be a fractional N/N+1 synthesizer.

In some aspects, frequency input may be provided by a voltage controlled oscillator (VCO), although that is not a requirement. The divider control input may be provided, for example, by either the baseband circuitry 204 or the applications circuitry 202 depending on the desired output frequency. In some aspects, a divider control input (e.g., N) may be determined from a look-up table based on a channel indicated by the applications circuitry 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump, and a D-type flip-flop. In these aspects, the delay elements may be configured to break a VCO period up into Nd equal packets of phase, where Nd is the number of delay elements in the delay line. In this way, the DLL provides negative feedback to assist in keeping the total delay through the delay line to one VCO cycle.

In some aspects, synthesizer circuitry 206D may be configured to generate a carrier frequency as the output frequency, while in other aspects, the output frequency may be a multiple of the carrier frequency (e.g., twice the carrier frequency, or four times the carrier frequency) and may be used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, and/or to amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various aspects, the amplification through the transmit signal paths or the receive signal paths may be done in part or solely in the RF circuitry 206, in part or solely in the FEM circuitry 208, or in both the RF circuitry 206 and the FEM circuitry 208.

In some aspects, the FEM circuitry 208 may include a TX/RX switch to switch between transmit mode and receive mode operation. The FEM circuitry 208 may include a receive signal path and a transmit signal path. The receive signal path of the FEM circuitry 208 may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 may manage power provided to the baseband circuitry 204. The PMC 212 may control power-source selection, voltage scaling, battery charging, and/or DC-to-DC conversion. The PMC 212 may, in some aspects, be included when the device 200 is capable of being powered by a battery, for example, when the device is included in a UE. The PMC 212 may increase the power conversion efficiency while providing beneficial implementation size and heat dissipation characteristics.

FIG. 2 shows the PMC 212 coupled with the baseband circuitry 204. In other aspects, the PMC 212 may be additionally or alternatively coupled with, and perform similar power management operations for, other components such as, but not limited to, application circuitry 202, RF circuitry 206, or FEM circuitry 208.

In some aspects, the PMC 212 may control, or otherwise be part of various power saving mechanisms of the device 200. For example, if the device 200 is in an RRC_Connected state, in which it is still connected to the RAN node as it expects to receive traffic shortly, then it may enter a state known as Discontinuous Reception Mode (DRX) after a period of inactivity. During this state, the device 200 may power down for brief intervals of time and thus save power.

According to some aspects, if there is no data traffic activity for an extended period of time, then the device 200 may transition off to an RRC_Idle state, in which it disconnects from the network and does not perform operations such as channel quality feedback, handover, etc. The device 200 goes into a very low power state and it performs paging during which it periodically wakes up to listen to the network and then powers down again. The device 200 may transition back to RRC_Connected state to receive data.

An additional power saving mode may allow a device to be unavailable to the network for periods longer than a paging interval (ranging from seconds to a few hours). During this time, the device 200 in some aspects may be unreachable to the network and may power down. Any data sent during this time incurs a delay, which may be large, and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
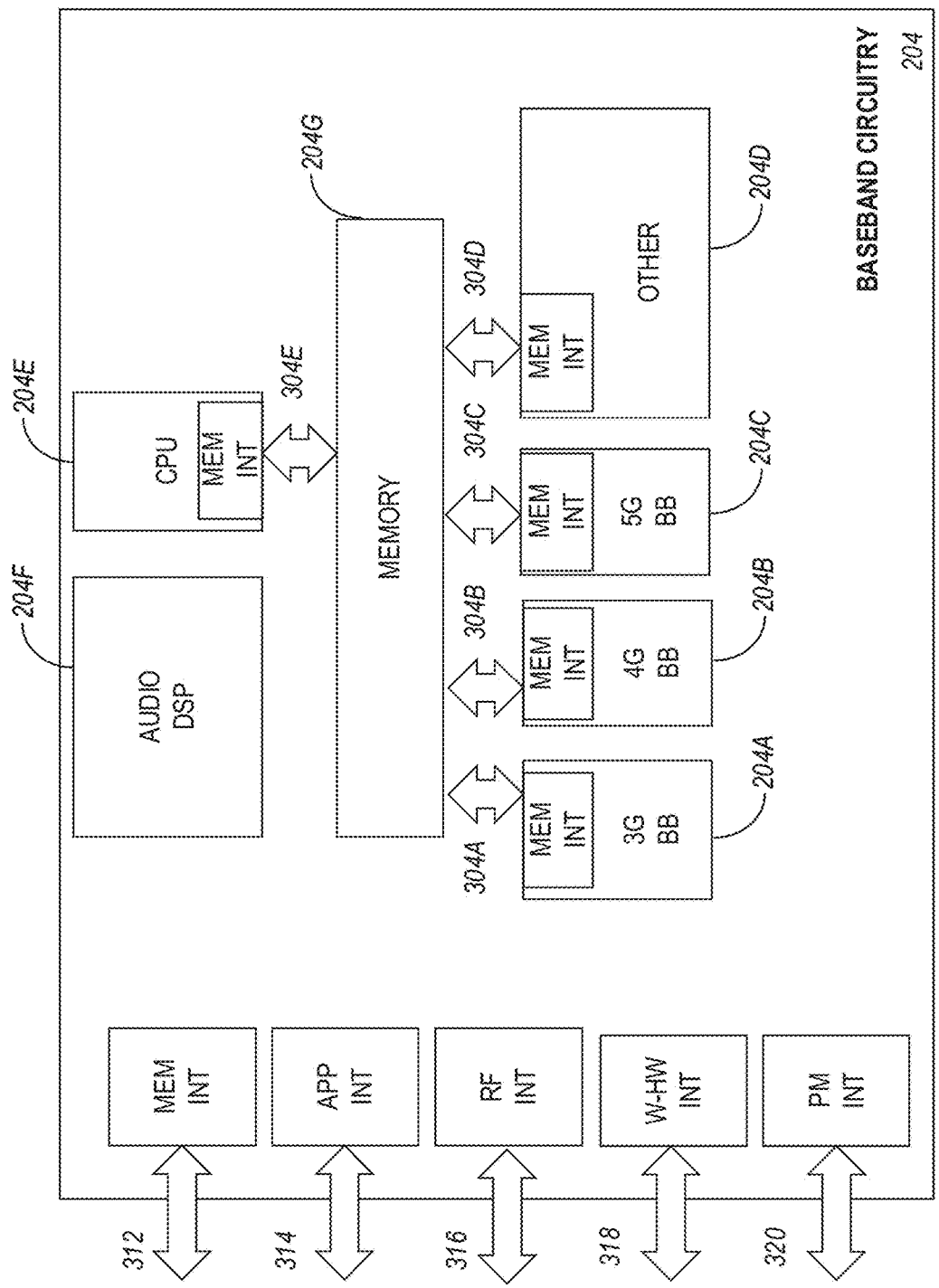
FIG. 3 illustrates example interfaces of baseband circuitry in accordance with some aspects.

FIG. 3 illustrates example interfaces of baseband circuitry 204, in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
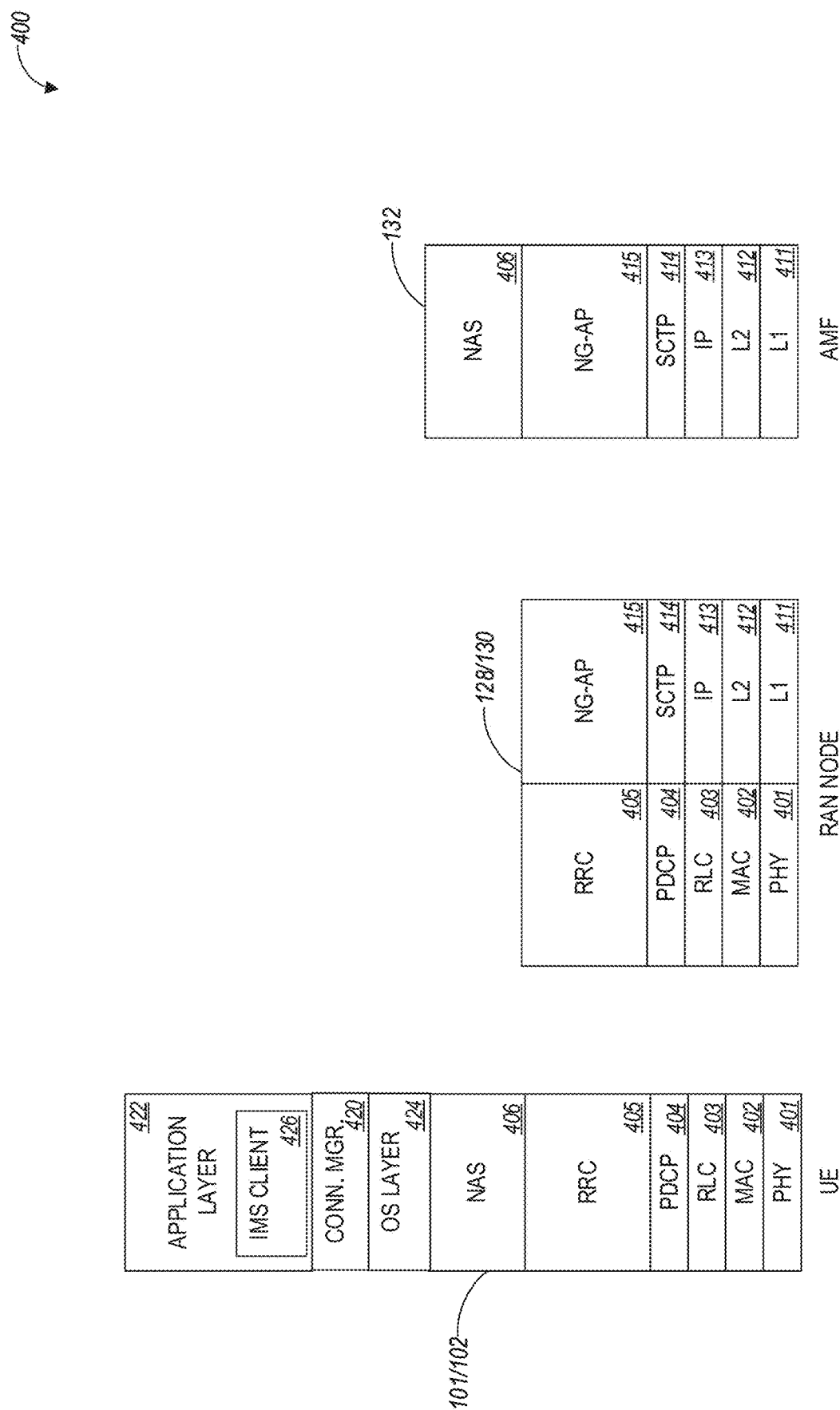
FIG. 4 is an illustration of a control plane protocol stack in accordance with some aspects.

FIG. 4 is an illustration of a control plane protocol stack in accordance with some aspects. In one aspect, a control plane 400 is shown as a communications protocol stack between the UE 102, the RAN node 128 (or alternatively, the RAN node 130), and the AMF 132.

The PHY layer 401 may in some aspects transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may in some aspects still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may in some aspects perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may in some aspects operate in a plurality of modes of operation, including Transparent Mode (TM), Unacknowledged Mode (UM), and Acknowledged Mode (AM). The RLC layer 403 may execute the transfer of upper layer protocol data units (PDUs), error correction through automatic repeat request (ARQ) for AM data transfers, and segmentation and reassembly of RLC SDUs for UM and AM data transfers. The RLC layer 403 may also maintain sequence numbers independent of the ones in PDCP for UM and AM data transfers. The RLC layer 403 may also in some aspects execute re-segmentation of RLC data PDUs for AM data transfers, detect duplicate data for AM data transfers, discard RLC SDUs for UM and AM data transfers, detect protocol errors for AM data transfers, and perform RLC re-establishment.

The PDCP layer 404 may in some aspects execute header compression and decompression of IP data, maintain PDCP Sequence Numbers (SNs), perform in-sequence delivery of upper layer PDUs at re-establishment of lower layers, perform reordering and eliminate duplicates of lower layer SDUs, execute PDCP PDU routing for the case of split hearers, execute retransmission of lower layer SDUs, cipher and decipher control plane and user plane data, perform integrity protection and integrity verification of control plane and user plane data, control timer-based discard of data, and perform security operations (e.g., ciphering, deciphering, integrity protection, integrity verification, etc.).

In some aspects, primary services and functions of the RRC layer 405 may include broadcast of system information (e.g., included in Master Information Blocks (MIBs) or System Information Blocks (SIBs) related to the non-access stratum (NAS)); broadcast of system information related to the access stratum (AS); paging initiated by 5GC 120 or NG-RAN 110, establishment, maintenance, and release of an RRC connection between the UE and NG-RAN (e.g., RRC connection paging, RRC connection establishment, RRC connection addition, RRC connection modification, and an RRC connection release, also for carrier aggregation and Dual Connectivity in NR or between E-UTRA and NR); establishment, configuration, maintenance, and release of Signalling Radio Bearers (SRBs) and Data Radio Bearers (DRBs); security functions including key management, mobility functions including handover and context transfer, UE cell selection and reselection and control of cell selection and reselection, and inter-radio access technology (RAT) mobility; and measurement configuration for UE measurement reporting. Said MIBs and SIBs may comprise one or more information elements (IEs), which may each comprise individual data fields or data structures. The RRC layer 405 may also, in some aspects, execute QoS management functions, detection of and recovery from radio link failure, and NAS message transfer between the NAS layer 406 in the UE and the NAS layer 406 in the AMF 132.

In some aspects, the following NAS messages can be communicated during the corresponding NAS procedure, as illustrated in Table 1 below:

TABLE 1

| 5G NAS Message | 5G NAS Procedure | 4G NAS Message name | 4G NAS Procedure |
|---|---|---|---|
| Registration Request | Initial registration procedure | Attach Request | Attach procedure |

TABLE 1-continued

| 5G NAS Message | 5G NAS Procedure | 4G NAS Message name | 4G NAS Procedure |
|---|---|---|---|
| Registration Request | Mobility registration update procedure | Tracking Area Update (TAU) Request | Tracking area updating procedure |
| Registration Request | Periodic registration update procedure | TAU Request | Periodic tracking area updating procedure |
| Deregistration Request | Deregistration procedure | Detach Request | Detach procedure |
| Service Request | Service request procedure | Service Request or Extended Service Request | Service request procedure |
| PDU Session Establishment Request | PDU session establishment procedure | PDN Connectivity Request | PDN connectivity procedure |

In some aspects, when the same message is used for more than one procedure, then a parameter can be used (e.g., registration type or TAU type) which indicates the specific purpose of the procedure, e.g. registration type="initial registration", "mobility registration update" or "periodic registration update".

The UE 101 and the RAN node 128/130 may utilize an NG radio interface (e.g., an LTE-Uu interface or an NR radio interface) to exchange control plane data via a protocol stack comprising the PEW layer 401, the MAC layer 402, the RLC layer 403, the PDCP layer 404, and the RRC layer 405.

The non-access stratum (NAS) protocol layers 406 forms the highest stratum of the control plane between the UE 101 and the AMF 132 as illustrated in FIG. 4. In aspects, the NAS protocol layers 406 support the mobility of the UE 101 and the session management procedures to establish and maintain IP connectivity between the UE 101 and the UPF 134. In some aspects, the UE protocol stack can include one or more upper layers, above the NAS layer 406. For example, the upper layers can include an operating system layer 424, a connection manager 420, and an application layer 422. In some aspects, the application layer 422 can include one or more clients which can be used to perform various application functionalities, including providing an interface for and communicating with one or more outside networks. In some aspects, the application layer 422 can include an IP multimedia subsystem (IMS) client 426.

The NG Application Protocol (NG-AP) layer 415 may support the functions of the N2 and N3 interface and comprise Elementary Procedures (EPs). An EP is a unit of interaction between the RAN node 128/130 and the 5GC 120. In certain aspects, the NG-AP layer 415 services may comprise two groups: UE-associated services and non-UE-associated services. These services perform functions including, but not limited to UE context management, PDU session management and management of corresponding NG-RAN resources (e.g. Data Radio Bearers [DRBs]), UE capability indication, mobility, NAS signaling transport, and configuration transfer (e.g. for the transfer of SON information).

The Stream Control Transmission Protocol (SCTP) layer (which may alternatively be referred to as the SCTP/IP layer) 414 may ensure reliable delivery of signaling messages between the RAN node 128/130 and the AMF 132 based, in part, on the IP protocol, supported by the IP layer 413. The L2 layer 412 and the L1 layer 411 may refer to communication links (e.g., wired or wireless) used by the RAN node 128/130 and the AMF 132 to exchange information.

The RAN node 128/130 and the AMF 132 may utilize an N2 interface to exchange control plane data via a protocol stack comprising the L1 layer 411, the L2 layer 412, the IP layer 413, the SCTP layer 414, and the S1-AP layer 415.

Figure 5:
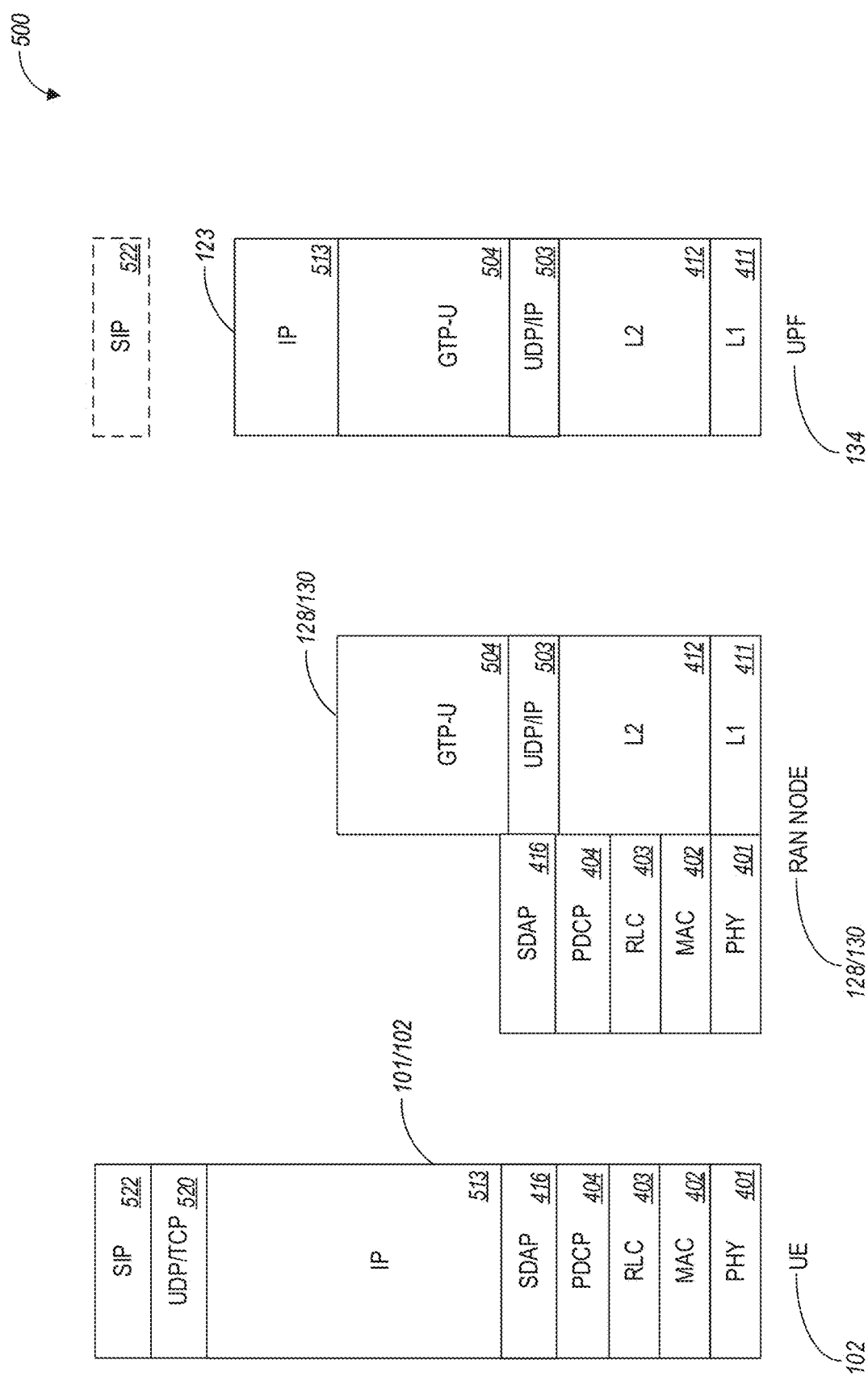
FIG. 5 is an illustration of a user plane protocol stack in accordance with some aspects.

FIG. 5 is an illustration of a user plane protocol stack in accordance with some aspects. In this aspect, a user plane 500 is shown as a communications protocol stack between the UE 102, the RAN node 128 (or alternatively, the RAN node 130), and the UPF 134. The user plane 500 may utilize at least some of the same protocol layers as the control plane 400. For example, the UE 102 and the RAN node 128 may utilize an NR radio interface to exchange user plane data via a protocol stack comprising the PHY layer 401, the MAC layer 402, the RLC layer 403, the PDCP layer 404, and the Service Data Adaptation Protocol (SDAP) layer 416. The SDAP layer 416 may, in some aspects, execute a mapping between a Quality of Service (QoS) flow and a data radio bearer (DRB), and a marking of both DL and UL packets with a QoS flow ID (QFI). In some aspects, an IP protocol stack 513 can be located above the SDAP 416. A user datagram protocol (UDP)/transmission control protocol (TCP) stack 520 can be located above the IP stack 513. A session initiation protocol (SIP) stack 522 can be located above the UDP/TCP stack 520 and can be used by the UE 102 and the UPF 134.

The General Packet Radio Service (CPRS) Tunneling Protocol for the user plane (GTP-U) layer 504 may be used for carrying user data within the 5G core network 120 and between the radio access network 110 and the 5G core network 120. The user data transported can be packets in IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 128/130 and the UPF 134 may utilize an N3 interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the UPF 134.

Figure 6:
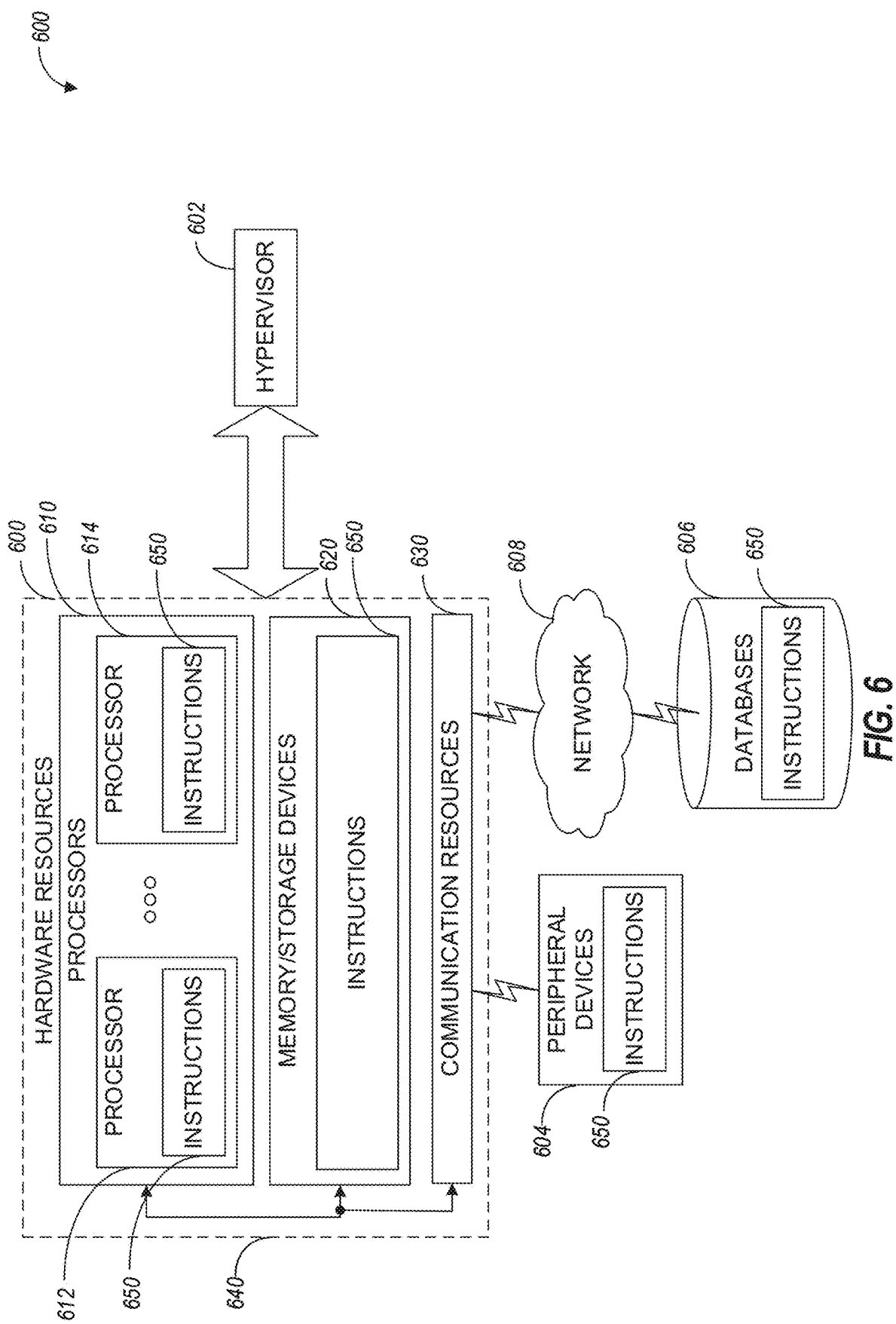
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For aspects in which node virtualization (e.g. NFV) is utilized, a hypervisor 602 may be executed to provide an execution environment for one or more network slices and/or sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include a main memory, disk storage, or any suitable combination thereof. The memory/storage devices 620 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NEC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
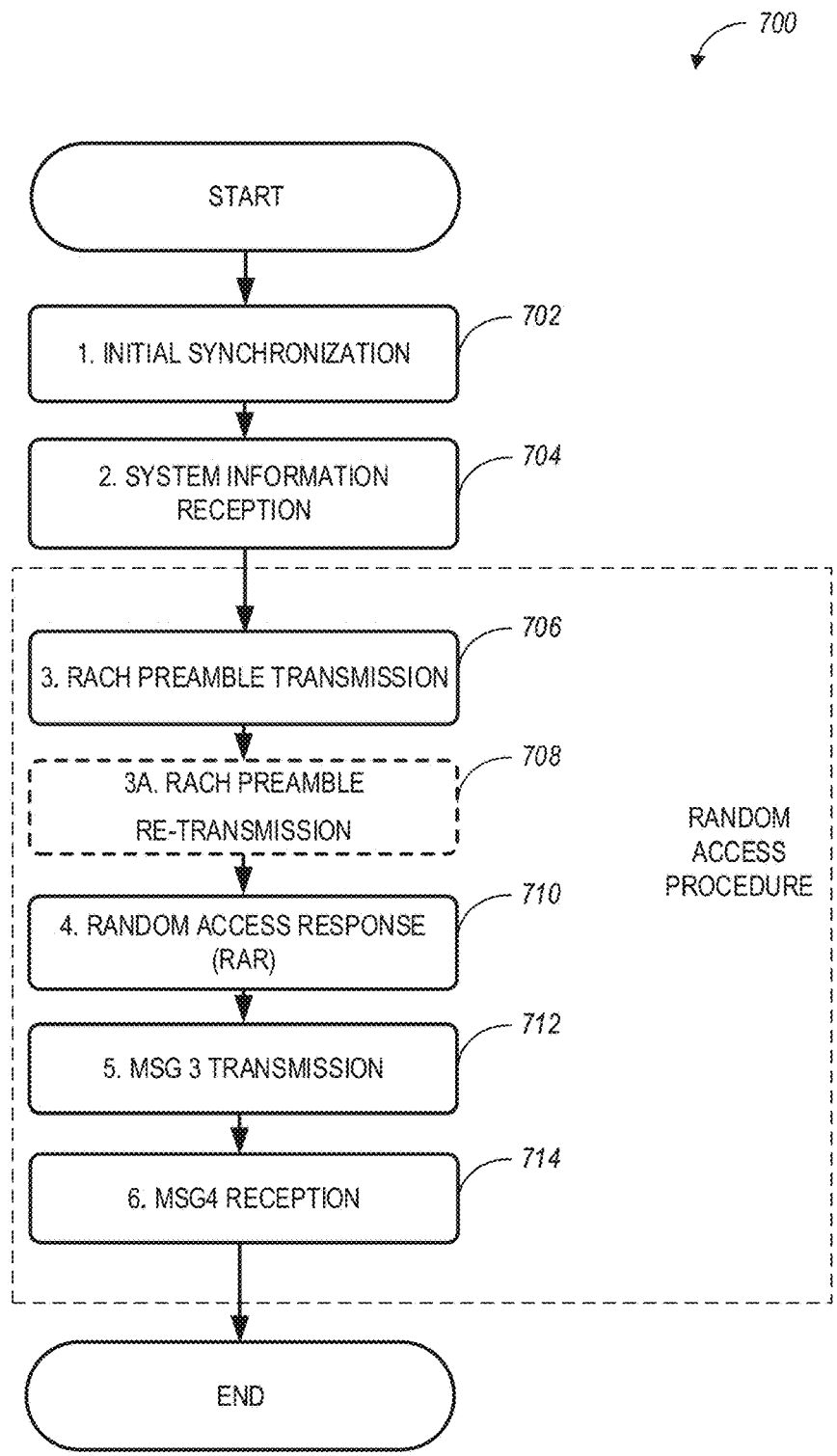
FIG. 7 is an illustration of an initial access procedure including PRACH preamble retransmission in accordance with some aspects.

FIG. 7 is an illustration of an initial access procedure 700 including PRACH preamble retransmission which can be performed by the UE 101, in accordance with some aspects. Referring to FIG. 7, the initial access procedure 700 can start with operation 702, when initial synchronization can take place. For example, the UE 101 can receive a primary synchronization signal and a secondary synchronization signal to achieve the initial synchronization. In some aspects, the initial synchronization at operation 702 can be performed using one or more SS blocks received within an SS burst set. At operation 704, the UE 101 can receive system information, such as one or more system information blocks (SIBs) and/or master information blocks (MIBs).

At operation 706 through 714, a random access procedure can take place. More specifically, at operation 706, a PRACH preamble transmission can take place as message 1 (Msg1). At operation 710, UE 101 can receive a random access response (RAR) message, which can be random access procedure message 2 (Msg2). In Msg2, the node (e.g., gNB) 111 can respond with random access radio network temporary identifier (RA-RNTI), which can be calculated from the preamble resource (e.g., time and frequency allocation).

In some aspects, UE 101 can be configured to perform one or more retransmissions of the PRACH preamble at operation 708, when the RAR is not received or detected within a preconfigured or predefined time window. The PRACH preamble retransmission can take place with power ramping, as explained hereinbelow so that the transmission power is increased until the random-access response is received.

At operation 712, UE 101 can transmit a random access procedure message 3 (Msg3), which can include a radio resource control (RRC) connection request message. At operation 714, a random access procedure message 4 (Msg4) can be received by the UE 101, which can include an RRC connection setup message, carrying the cell radio network temporary identifier (CRNTI) used for subsequent communication between the UE 101 and the node 111.

Techniques disclosed herein include systems and methods for secondary cell (SCell) beam failure recovery (BFR).

In 3GPP NR Rel-15, link recovery (beam failure recovery) for a primary cell (PCell) may include the following steps: beam failure detection (BFD), new beam identification, beam failure recovery (BFR) request, and BFR response.

In some aspects, the BFD is used to detect whether the quality of beams for control channel falls below a threshold, where a hypothetical block error rate (BLER) is used for beam failure detection. New beam identification is used to find out a new beam to replace the failed beams, which can be based on the Layer 1 Reference Signal Receiving Power (L1-RSRP) measurement from a synchronization signal block (SSB) and/or a Channel State Information Reference Signal (CSI-RS). In some aspects, the reference signal (RS) resources with measured L1-RSRP higher than a threshold can be considered as a candidate new beam. In some aspects, the beam failure recovery (BFR) request can be carried by a contention-free physical random access channel (CF-PRACH) or a contention-based physical random access channel (CB-PRACH). In some aspects, the gNB can configure a set of CF-PRACH resources, where each resource is associated with one beam. The newly identified beam index can be carried by the CF-PRACH resource implicitly. If a UE cannot find out a new beam, it can fall back to use CB-PRACH to carry the beam failure recovery request. After receiving a BFR request by CF-PRACH, the gNB can use a dedicated search space (SS-BFR) to carry the BFR response. Furthermore, if a BFR request is carried by CB-PRACH, the 4-step based RACH procedure can be used to finish the BFR procedure.

In some aspects, to support BFR in a secondary cell (SCell), the steps for PCell BFR can be used. However, to support BFR in SCell, some UE implementation complexity and inter-cell quasi-co-location (QCL) can be taken into account. Then how to define the above 4 steps could be one issue. Techniques disclosed herein for SCell BFR may include SCell beam failure detection, SCell new beam identification, SCell beam failure recovery request, and SCell beam failure recovery response.

SCell Beam Failure Detection.

In some aspects, for PCell BFD, the hypothetical BLER may be used. In some aspects, hypothetical BLER could increase the HE implementation complexity. For a UE configured with multiple SCells, it may be configured with multiple downlink RS resources for BFD, which could increase UE power consumption.

In some aspects, the BFD for SCell may be based on L1-RSRP and/or Layer 1 Reference Signal Receiving Quality (L1-RSRQ), and/or RS Signal to Interference plus Noise Ratio (RS-SINK), and/or hypothetical BLER, and which one can be used may be pre-defined or configured by RRC signaling. In some aspects, the UE may report the maximum number of downlink reference signal (DL-RS) resources that can be configured with hypothetical BLER detection or the maximum number of SCells for BFR or the maximum number of SCells for BFR that is configured with a hypothetical BLER detection.

In some aspects, a UE can be configured with up to N DL-RS resources in an SCell for BFD by RRC signaling. By default, if no DL-RS resources for BFD is configured, the DL-RS configured with quasi co-located (QCL)-type D in the transmission configuration indication (TCI) state for the control resource set (CORESET) can be used for BFD. Alternatively, if no DL-RS resource is configured, the BFD for an SCell can be considered to be "OFF".

In some aspects, if the quality of a subset of or all the DL-RS resources for BFD in an SCell falls below a threshold within a configured periodicity T, the UE can declare a beam failure instance. The L1-RSRP/L1-RSRQ/RS-SINR/ hypothetical BLER threshold for BFD over the SCell could be the same as the one for PCell. Alternatively, the L1-RSRP/L1-RSRQ/RS-SINR/hypothetical BLER threshold for beam failure detection could be independently configured for SCell and PCell. Furthermore, after N consecutive beam failure instance declaration, the UE can declare beam failure, where N is configured by RRC signaling per SCell or across all cells.

In some aspects, as there could be inter-CC or cross-carrier QCL between PCell and SCell or two SCells, the DL-RS for BFD could be from another cell or bandwidth part (BWP). Hence the CC/BWP index can be configured for the DL RS resources for BFD. Alternatively, the UE only uses the DL-RS resource for BFD in active BWP in a current cell, i.e., a PCell or an SCell.

Figure 8:
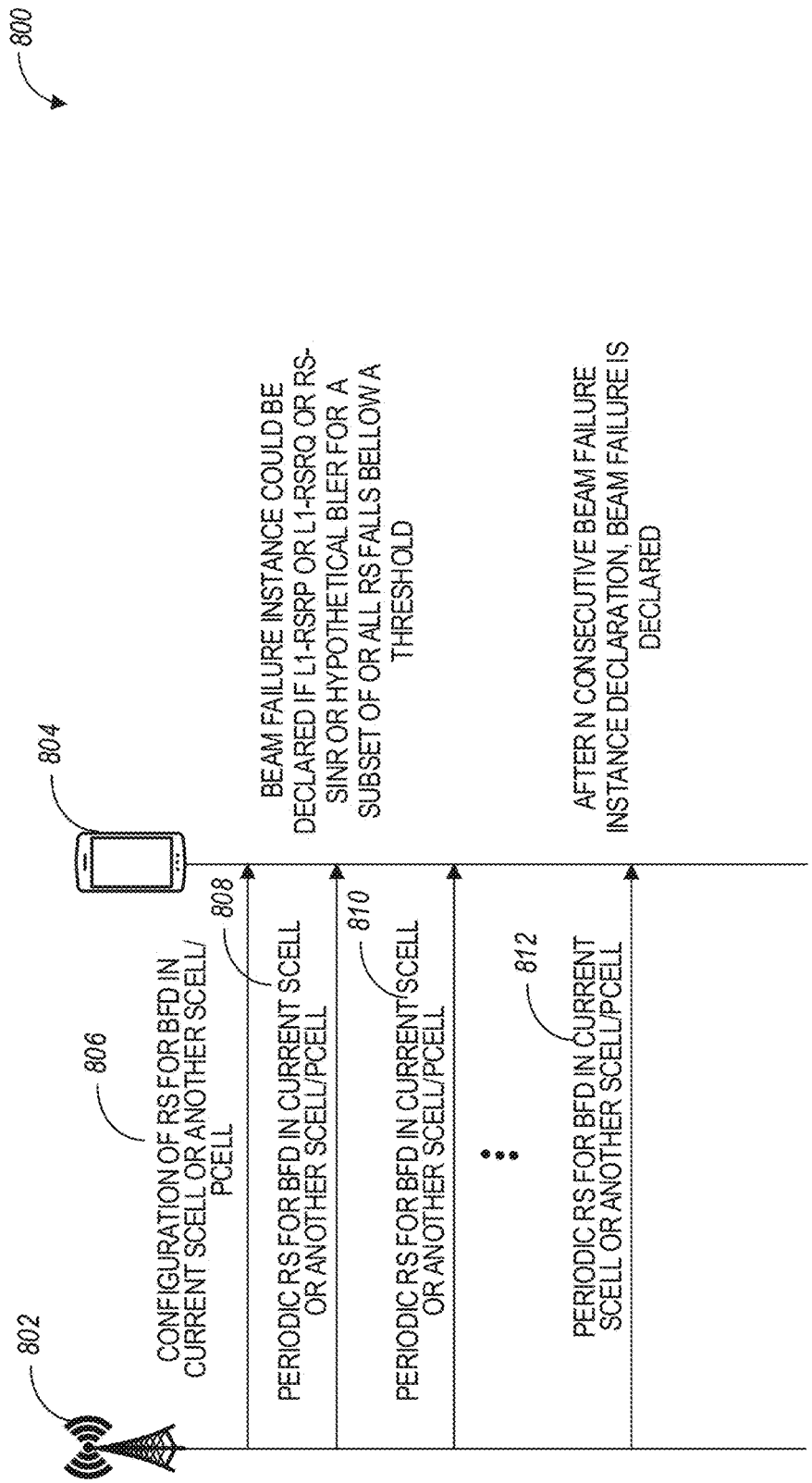
FIG. 8 illustrates an example procedure for a secondary cell (SCell) beam failure detection (BFD), in accordance with some aspects.

FIG. 8 illustrates an example of procedure 800 for a secondary cell (SCell) beam failure detection (BFD), in accordance with some aspects. Referring to FIG. 8, the example procedure 800 takes place between a base station 802 and a UE 804. At operation 806, the configuration of a reference signal (RS) for BSD in a current SCell or another SCell/Pcell is communicated from the base station 802 to the UE 804. At operations 808, 810, . . . , 812, periodic RS for BFD in a current SCell or another SCell/PCell are communicated from the base station 802 to the UE 804. A beam failure instance could be declared if L1-RSRP, L1-RSRQ, RS-SINR, or a hypothetical BLER for a subset of (or all) RS falls below a threshold. After N consecutive beam failure instance declarations, beam failure may be declared.

An example of the SCell BFD resource configuration is as follows:

```
beamFailureDetectionRS ::=     SEQUENCE {
    beamFailureDetectionRS-Id     beamFailureDetectionRS-Id,
    cell                          ServCellIndex    OPTIONAL,  -- Need R
    bwp-Id                        BWP-Id           OPTIONAL, --
    Cond CSI-RS-Indicated
    detectionResource             CHOICE {
        ssb-Index                     SSB-Index,
        csi-RS-Index                  NZP-CSI-RS-ResourceId
    },
    detectionScheme               ENUMERATED {bler, L1-Rsrp},
    ...
}
```

SCell New Beam Identification.

In some aspects, for a PCell, the new beam index is associated with each CF-PRACH resource. However, a gNB may not be able to configure many CF-PRACH resources to the UE The new beam may be identified based on the L1-RSRP as well as a threshold for the PCell.

Figure 9:
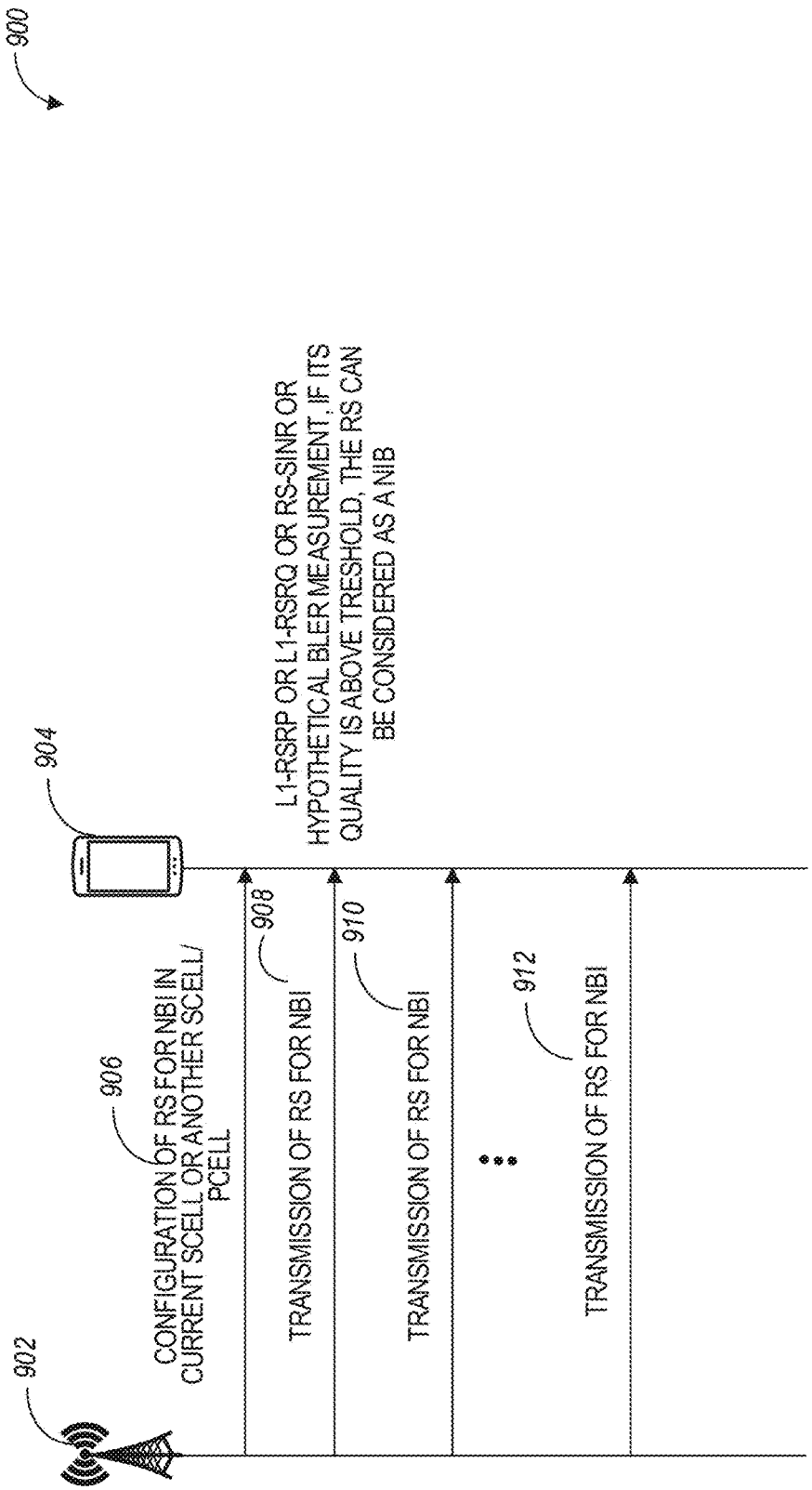
FIG. 9 illustrates an example procedure for an SCell new beam indication (NBI), in accordance with some aspects.

FIG. 9 illustrates an example of procedure 900 for an SCell new beam indication (NBI), in accordance with some aspects. Referring to FIG. 9, the example procedure 900 takes place between a base station 902 and a HE 904. At operation 906, the configuration of RS for NB-IoT in a current SCell or another SCell/PCell is communicated from the base station 902 to the UE 904. At operations 908, 910, . . . , 912, the transmission of RS for NBI can take place.

In some aspects, for an SCell NBI, the L1-RSRP, and/or L1-RSRQ, and/or RS-SINR, and/or hypothetical BLER may be used, where which one can be used can be predefined or configured by RRC signaling. In some aspects, the new beam index(es) can be configured by RRC signaling, which can be from current SCell or another SCell/PCell. The beam can be considered as a candidate new beam if the L1-RSRP, and/or L1-RSRQ, and/or RS-SINR is above a threshold and/or hypothetical BLER is below a threshold.

In some aspects, the L1-RSRP/L1-RSRQ/RS-SINR/hypothetical BLER threshold for new beam identification for SCell could be the same as the one for PCell. Alternatively, the L1-RSRP/L1-RSRQ/RS-SINR/hypothetical BLER threshold for new beam identification could be independently configured for an SCell and a PCell. Among the candidate new beam(s), up to K beam(s) can be the new beam to be transmitted in BFR request, where K can be predefined or configured by higher layer signaling or based on UE capability.

An example of one resource which may be used for NIB is as follows:

```
newBeamIdentificationRS ::=     SEQUENCE {
    newBeamIdentificationRS-Id     newBeamIdentificationRS-Id,
    cell                           ServCellIndex    OPTIONAL,  -- Need R
    bwp-Id                         BWP-Id           OPTIONAL, --
    Cond CSI-RS-Indicated
    resource                       CHOICE {
        ssb-Index                      SSB-Index,
        csi-RS-Index                   NZP-CSI-RS-ResourceId
    },
}
```

SCell BFR Request.

In some aspects, the BFR request for an SCell can be carried by PUSCH, and/or PUCCH, and/or CF-PRACH, and/or CB-PRACH in current SCell, or another SCell or PCell, and which one can be used may be predefined or configured by RRC signaling and/or based on UE capability. The Cell/BWP index can be configured for CF-PRACH resource for BFR. An example of signaling to configure the Cell/BWP index for each CF-PRACH is as follows:

```
PRACH-ResourceDedicatedBFR ::=     CHOICE {
    ssb                                BFR-SSB-Resource,
    csi-RS                             BFR-CSIRS-Resource
}
BFR-SSB-Resource ::=               SEQUENCE {
    cell                               ServCellIndex    OPTIONAL,  -- Need R
    ssb                                SSB-Index,
```

```
    ra-PreambleIndex              INTEGER (0..63),
    ...
}
BFR-CSIRS-Resource ::=            SEQUENCE {
    cell                          ServCellIndex      OPTIONAL,  -- Need
R
    bwp-Id                        BWP-Id                        OPTIONAL, -
- Need R
    csi-RS                        NZP-CSI-RS-ResourceId,
    ra-OccasionList               SEQUENCE (SIZE(1..maxRA-
OccasionsPerCSIRS)) OF INTEGER (0..maxRA-Occasions-1) OPTIONAL,  -
- Need R
    ra-PreambleIndex              INTEGER (0..63)
                                               OPTIONAL,  -- Need R
    ...
}
```

Figure 10:
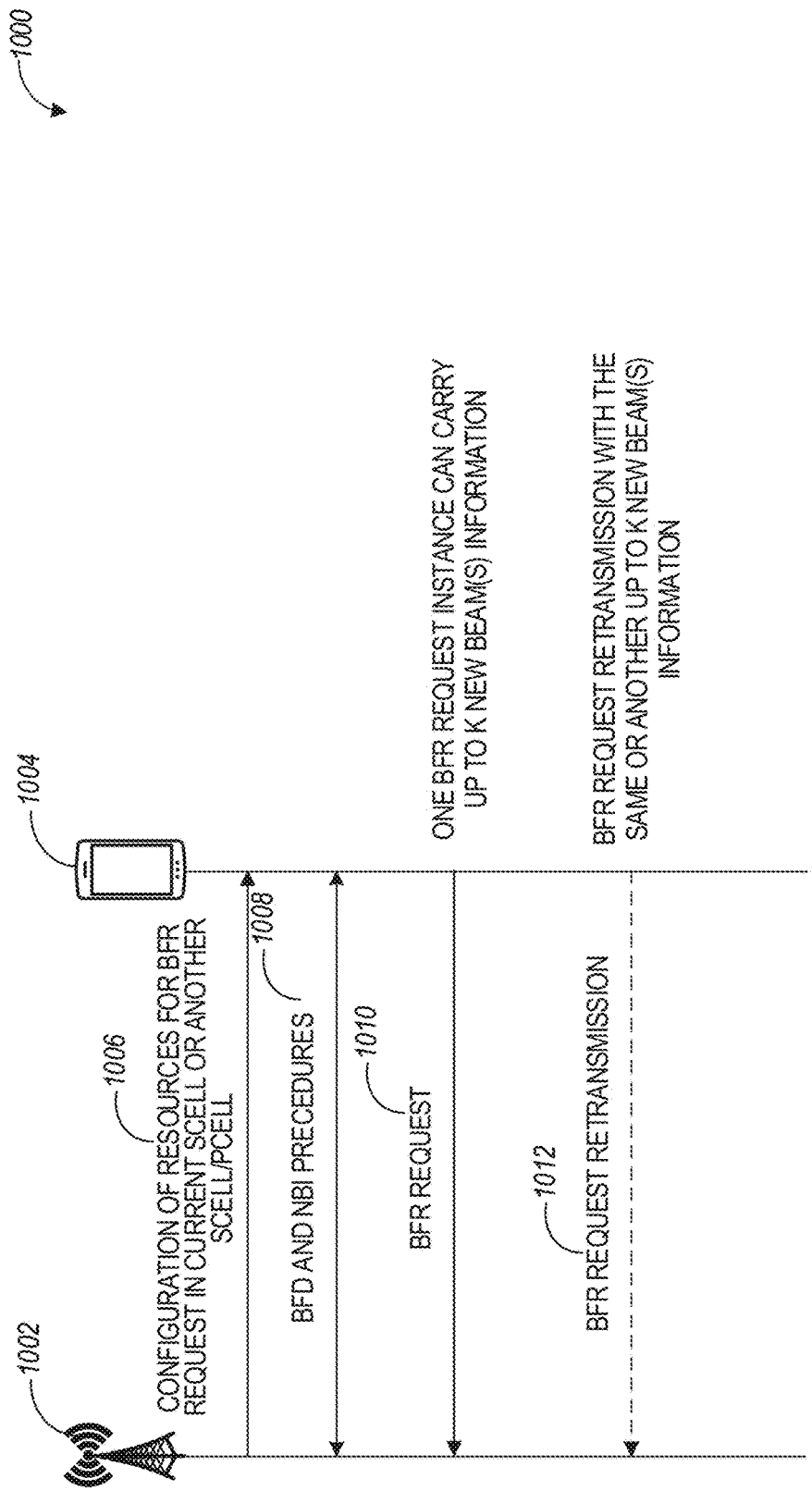
FIG. 10 illustrates an example procedure for an SCell beam failure recovery (BFR) request, in accordance with some aspects.

FIG. 10 illustrates an example procedure 1000 for an SCell beam failure recovery (BFR) request, in accordance with some aspects. Referring to FIG. 10, the example procedure 1000 takes place between a base station 1002 and a UE 1004. At operation 1006, configuration of resources for a BFR request a current SCell or another SCell/PCell is communicated from the base station to the UE. At operation 1008, BFD and NBI procedures take place. At operation 1010, a BFR request is communicated from the UE to the base station. In some aspects, a single BFR request instance can carry up to K new beams information. Optionally, at operation 1012, a BFR request for retransmission is communicated from the UE to the base station. The BFR request for retransmission is associated with the same or another up to K new beams information.

In some aspects, dedicated PUCCH resource(s) configured by RRC signaling can be used to carry BFR request, where such PUCCH resource(s) may be for another SCell or PCell. Alternatively, the CB-PRACH may not be used to carry SCell BFR request. Each BFR request can carry up to K new beams information including the resource index/new beam indication RS ID for new beams, and/or L1-RSRP for new beams, and/or cell/BWP index. The BFR request may be retransmitted when a time window to receive BFR response expires, where the retransmission can be based the same or another up to K new beam(s).

In some aspects, PRACH resource partitioning for a BFR request for a current SCell or a PCell or another SCell can be configured by higher layers via NR minimum system information (MSI), NR remaining minimum system information (RMSI), NR other system information (OSI), or radio resource control (RRC) signaling. The PRACH resource partitioning can be performed in a time division multiplexing (TDM), frequency division multiplexing (FDM), and/or code division multiplexing (CDM) manner or a combination thereof.

In some aspects, if PRACH transmitted in a PCell is used for a BFR request in an SCell, this PRACH resource can be multiplexed in a TDM/FDM/CDM manner as the PRACH resource configured for other purposes, e.g., BFR request for PCell, initial access, or contention-free RACH procedure.

SCell BFR Response.

In some aspects, after receiving the BFR request in an SCell, which is carried by PUSCH, or PUCCH, or CF-PRACH, the gNB can transmit the BFR response in a dedicated search space in current SCell or another SCell or PCell after x slots, where x can be predefined or configured by RRC signaling.

An example signaling for the configuration of a BFR response search space is as follows:

```
beamFailureRecoveryResponse ::=   CHOICE {
    cell                          ServCellIndex      OPTIONAL,  -- Need
R
    bwp-Id                        BWP-Id                        OPTIONAL, -
- Need R
    recoverySearchSpaceId         SearchSpaceId,
}
```

Figure 11:
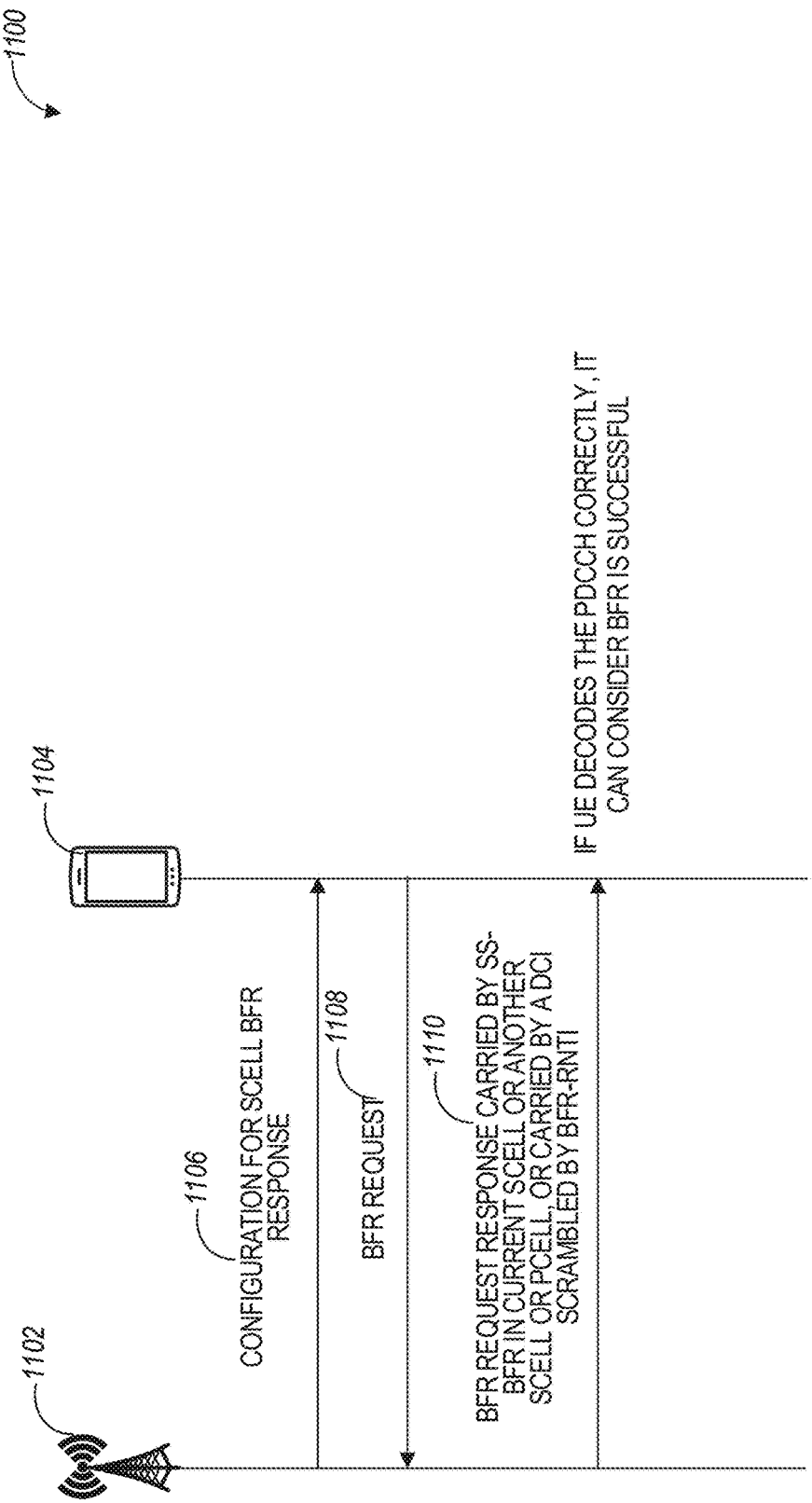
FIG. 11 illustrates an example procedure for an SCell BFR response, in accordance with some aspects.

FIG. 11 illustrates an example procedure 1100 for an SCell BFR response, in accordance with some aspects. Referring to FIG. 11, the example procedure 1100 can take place between a base station 1102 and a UE 1104. At operation 1106, configuration for an SCell BFR response is communicated from the base station to the UE. At operation 1108, a BFR request is communicated from the UE to the base station. At operation 1110, a BFR request response carried by SS-BFR in a current SCell, or another SCell or PCell, or carried by a DCI scrambled by BFR-RNTI is communicated from the base station to the LT.

If a UE receives a DCI scrambled by C-RNTI in the dedicated search space in current SCell or configured cell/BWP, it can consider the BFR for SCell is successful. The BFR response for some cells can share the same dedicated search space or be configured with different dedicated search space which is tied to the same CORESET. If UE shall assume this CORESET is based on the newly identified beam, and if a collision happens the search space for BFR in the cell with the lowest cell index shall have a higher priority.

In some aspects, if a UE receives a DCI in a search space scrambled by a dedicated RNTI, e.g. BFR-RNTI, it can consider the BFR for SCell is successful, where BFR-RNTI can be predefined or configured by higher layer signaling. The BFR-RNTI could be different for BFR for different cells.

In some aspects, a subset or all of a DCI format can be used to carry the BFR response, e.g., DCI format 0_0, DCI format 1_0, DCI format 0_1, or DCI format 1_1.

In some aspects, alternatively, the carrier index in the DCI 1_1 which is transmitted in the PCell can be used to indicate the BFR response for SCell. In addition, the carrier index can be included in the DCI format 1_0 to indicate the BFR response for an SCell.

In some aspects, if a UE decodes the PDCCH for BFR response correctly, it can consider BFR is successful and assume all the CORESET(s) for dedicated transmission are transmitted based on the new beam or only monitor the SS-BFR.

In some aspects, if a higher layer configured timer expires, which starts from beam failure and/or number of BFR request reaches a configured number, the UE can consider BFR procedure fails, and it may fallback to use CB-PRACH to recover the beam or can declare radio link failure or continue to communicate with gNB based on current configurations.

In some aspects, a UE includes the circuitry to recovery from beam failure in a secondary cell (SCell). In some aspects, the beam failure can be determined by the measurement of downlink reference signal resource(s) based on Layer 1 Reference Signal Receiving Power (L1-RSRP), and/or Layer 1 Reference Signal Receiving Quality (L1-RSRQ), and/or RS Signal to Interference plus Noise Ratio (RS-SINK), and/or hypothetical BLER, as well as a threshold. In some aspects, the detection scheme may be predefined or configured by RRC signaling. In some aspects, the threshold may be predefined or configured by RRC signaling per component carrier (CC) or per bandwidth part (BWP) or per HE. In some aspects, the downlink reference signal resource(s) may be from a current SCell, or another SCell or Primary Cell (PCell). In some aspects, an SCell new beam identification (NBI) can be based on the measurement of downlink reference signal resource(s) based on the L1-RSRP, and/or L1-RSRQ, and/or RS-SINR, and/or hypothetical BLER, as well as a threshold. In some aspects, the NBI scheme can be used can be predefined or configured by RRC signaling. In some aspects, the new beam index(es) can be configured by RRC signaling, which can be from the current SCell or another SCell/PCell. In some aspects, the threshold can be predefined or configured by RRC signaling per CC, per BWP, or per UE. In some aspects, up to K beams can be selected to be the new beams from the candidate new beams whose quality is above the threshold. In some aspects, the beam failure recovery (BFR) request for an SCell can be carried by PUSCH, PUCCH, CF-PRACH, and/or CB-PRACH in current SCell or another SCell or PCell.

In some aspects, the channel to carry BFR request can be predefined or configured by RRC signaling. In some aspects, the Cell/BWP index can be configured for a CF-PRACH resource for BFR. In some aspects, the CB-PRACH may not be used to carry the SCell BFR request. In some aspects, each BFR request can carry up to K new beams information including the resource index/new beam indication RS ID for new beams, and/or L1-RSRP for new beams, and/or cell/BWP index. In some aspects, PRACH resource partitioning for BFR request for current SCell or PCell or another SCell can be configured by higher layers via NR minimum system information (MSI), NR remaining minimum system information (RMSI), NR other system information (OSI), or radio resource control (RRC) signaling.

In some aspects, the PRACH resource partitioning can be performed in a time division multiplexing (TDM), frequency division multiplexing (FDM), and/or code division multiplexing (CDM) manner or a combination thereof. In some aspects, the UE can start to monitor the BFR response in a current SCell, or another SCell or PCell k slots after transmitting BFR request. In some aspects, a BFR response can be transmitted in a dedicated search space in a current SCell or another SCell or PCell. In some aspects, the BFR response for some CCs can share the same dedicated search space or be configured with different dedicated search space which is tied to the same Control Resource Set (CORESET).

In some aspects, if a UE receives a DCI in a search space scrambled by a dedicated RNTI, e.g. BFR-RNTI, it can consider the BFR for an SCell is successful, where the BFR-RNTI can be predefined or configured by higher layer signaling. In some aspects, the BFR-RNTI could be different for BFR for different cells. In some aspects, a subset or all of DCI format can be used to carry the BFR response. In some aspects, the carrier index in the DCI 1_1 which is transmitted in the PCell can be used to indicate the BFR response for SCell.

In some aspects, the carrier index can be included in the DCI format 1_0 to indicate the BFR response for an SCell. In some aspects, if a UE decodes the PDCCH for BFR response correctly, it can consider BFR is successful and assume all the CORESET(s) for dedicated transmission are transmitted based on the new beam or only monitor the dedicated search space for BFR. In some aspects, if a higher layer configured timer expires which starts from beam failure and/or the number of BFR request reaches a configured number, the UE can consider BFR procedure fails. In some aspects, the UE can use contention-based PRACH to recover the beam. In some aspects, the UE can declare radio link failure or continue to communicate with gNB based on current configurations.

Techniques disclosed herein include systems and methods for interference aware beam reporting.

In some aspects, the beam reporting can be based on Layer 1 Reference Signal Receiving Power (L1-RSRP). The L1-RSRP can be measured from a synchronization signal block (SSB) or a Channel State Information Reference Signal (CSI-RS), which can be referred to as SS-RSRP or CSI-RSRP. However, the L1-RSRP based scheme may not reflect the interference state. Hence in some other aspects, the interference-aware beam measurement could be one enhancement to improve the beam selection accuracy. In some aspects, the beam reporting can be based on either Layer 1 Reference Signal Receiving Quality (L1-RSRQ) or Layer 1 Signal to Interference plus Noise (L1-SINR).

Techniques disclosed herein can be used to address the following issues: how to let the UE know it should measure the SSB/CSI-RS based on L1-RSRP or L1-RSRQ/L1-SINR; how to report the L1-SINR/L1-RSRQ for both group-based and non-group based beam reporting; and how to measure the interference. More specifically, techniques disclosed herein can be used for interference-aware beam measurement and reporting, and include control signaling on beam measurement, reporting content for interference aware beam reporting, and interference measurement scheme.

Control Signaling on Beam Measurement.

In some aspects, the beam measurement can be used for gNB beam refinement and/or UE beam refinement. For gNB beam refinement, some beam reporting could provide information to assist gNB to select the best beam. For UE beam refinement, the gNB can transmit the downlink signals with the same beam repeatedly, and the UE can try to use different beams to measure different repetitions and select the best beam with the beast beam measurement results. In some aspects, the beam reporting for UE beam refinement may not be necessary.

In some aspects, the gNB can configure whether the beam reporting is based on L1-RSRP, L1-RSRQ, or L1-SINR by higher layer signaling. In one aspect, the following reportQuantity signaling can be configured by RRC signaling. There may be only cri-RSRQ and ssb-Index-RSRQ or cri-SINK and ssb-Index-SNR defined in the reportQuantity.

The UE may report whether it can support RSRQ or SINR based beam reporting as a UE capability using the following signaling.

```
reportQuantity                CHOICE {
    none                          NULL,
    cri-RI-PMI-CQI                NULL,
    cri-RI-i1                     NULL,
    cri-RI-i1-CQI                 SEQUENCE {
        pdsch-BundleSizeForCSI        ENUMERATED {n2,
n4}  OPTIONAL
    },
    cri-RI-CQI                    NULL,
    cri-RSRP                      NULL,
    ssb-Index-RSRP                NULL,
    cri-RI-LI-PMI-CQI             NULL,
    cri-RSRQ                      NULL,
    ssb-Index-RSRQ                NULL,
    cri-SINR                      NULL,
    ssb-Index-SINR                NULL,
},
```

In some aspects, for UE beam refinement, repetition could be configured to be "ON" for a CSI-RS resource set and reportQuantity is configured to be "none". Then the same gNB beams shall be applied to CSI-RS resources in a resource set. UE can use different beams to receive different CSI-RS resources.

In some aspects, when repetition is configured to be "ON" for a CSI-RS resource set and reportQuantity is configured to be "none", the gNB may indicate whether the measurement should be based on L1-RSRP or L1-RSRQ/L1-SINR by higher layer signaling or DCI. In one example, in reportQuantity, some new parameters could be added: "none-RSRP", "non-RSRQ", "non-SINR".

Alternatively, in some aspects, whether to use L1-RSRP or L1-RSRQ/L1-SINK to measure the CSI-RS resources could be up to UE implementation, when repetition is configured to be "ON" for a CSI-RS resource set and reportQuantity is configured to be "none".

In some aspects, the UE can use the SSB and the CSI-RS which is configured with QCL-typeA or QCL-typeD with the SSB to jointly measure the L1-RSRP/L1-RSRQ. Then the UE can report the SSB index and/or SSB index as well as the measured L1-RSRP/L1-RSRQ. Which CSI-RS resource(s) can be used if multiple CSI-RS resources are QCLed with the SSB can be selected by UE or indicated by higher layer signaling. Whether the UE can support the joint measurement by SSB and CSI-RS could be reported as a UE capability.

Reporting Content for Interference Aware Beam Reporting.

In some aspects, for beam reporting, there could be two modes: non-group-based beam reporting and group-based beam reporting. In non-group-based beam reporting mode, the UE reports the quality of up to N beams. In group-based beam reporting, the UE reports the quality of G groups of beams and in each group, K beams are reported. The beams in a group may be simultaneously received, or beams across groups may be simultaneously received.

In some aspects, the L1-RSRQ/L1-SINR can be reported in either non-group-based beam reporting or group-based beam reporting or both. In one option, the UE reports the L1-RSRQ/L1-SINK for each of the beams. In another aspect, the UE reports the L1-RSRQ/L1-SINR for X best beam(s) and the differential L1-RSRQ/L1-RSRP for the other beams, where X could be fixed, e.g., 1, for non-group based beam reporting, and X could be 1 or equal to the number of groups or number of beams within a group for group-based beam reporting. In some aspects, if X>1 for group-based beam reporting, the differential L1-RSRQ/L1-SINR can be based on the reference beam in the same group or the same index within a group.

Tables 2-5 illustrate examples for beam reporting content for both options mentioned above.

TABLE 2 an example of beam reporting content when N beams are reported in option 1:

| CSI report number | CSI fields |
|---|---|
| CSI report #n | CRI or SSBRI #1 |
|  | CRI or SSBRI #2 |
|  | . . . |
|  | CRI or SSBRI #N |
|  | RSRQ/SINR #1 |
|  | RSRQ/SINR #2 |
|  | . . . |
|  | RSRQ/SINR #4 |

TABLE 3 an example of beam reporting content when N beams are reported and X = 1 in option 2:

| CSI report number | CSI fields |
|---|---|
| CSI report #n | CRI or SSBRI #1 |
|  | CRI or SSBRI #2 |
|  | . . . |
|  | CRI or SSBRI #N |
|  | RSRQ/SINR #1 |
|  | Differential RSRQ/SINR #2 |
|  | . . . |
|  | Differential RSRQ/SINR #N |

TABLE 4 an example of beam reporting content when G groups and K beams per group are reported X = G in option 2:

| CSI report number | CSI fields |
|---|---|
| CSI report #n | CRI or SSBRI k = 1, g = 1 |
|  | CRI or SSBRI k = 2, g = 1 |
|  | . . . |
|  | CRI or SSBRI k = K, g = 1 |
|  | CRI or SSBRI k = K, g = 2 |
|  | . . . |
|  | CRI or SSBRI k = K, g = G |
|  | RSRQ/SINR k = 1, g = 1 |
|  | Differential RSRQ/SINR k = 2, g = 1 |
|  | . . . |
|  | Differential RSRQ/SINR k = K, g = 1 |
|  | RSRQ/SINR k = 1, g = 2 |
|  | Differential RSRQ/SINR k = 2, g = 2 |
|  | . . . |
|  | Differential RSRQ/SINR k = K, g = G |

TABLE 5 an example of beam reporting content when G groups
and K beams per group are reported X = K in option 2:

| CSI report number | CSI fields |
|---|---|
| CSI report #n | CRI or SSBRI k = 1, g = 1 |
| | CRI or SSBRI k = 2, g = 1 |
| | . . . |
| | CRI or SSBRI k = K, g = 1 |
| | CRI or SSBRI k = K, g = 2 |
| | . . . |
| | CRI or SSBRI k = K, g = G |
| | RSRQ/SINR k = 1, g = 1 |
| | RSRQ/SINR k = 2, g = 1 |
| | . . . |
| | RSRQ/SINR k = K, g = 1 |
| | Differential RSRQ/SINR k = 1, g = 2 |
| | Differential RSRQ/SINR k = 2, g = 2 |
| | . . . |
| | Differential RSRQ/SINR k = K, g = G |

In some aspects, the different L1-SINR/L1-RSRQ could be based on the measured L1-SINR/L1-RSRQ for reference beam. Alternatively, it can be based on the quantized L1-SINR/L1-RSRQ. In some aspects, one of the differential L1-SINR states can indicate that the measured SINR is below a threshold, where the threshold can be configured by higher layer signaling or be fixed. In some aspects, Tables 6-7 illustrate examples for the reporting content of differential L1-SINR/L1-RSRQ.

TABLE 6 an example for differential L1-SINR/L1-RSRQ report mapping:

| Reported Value | Measured Quantity Value | Unit |
|---|---|---|
| 0 | −0.5 ≤ Differential SINR/RSRQ ≤ 0 | dB |
| 1 | −1.0 ≤ Differential SINR/RSRQ < −0.5 | dB |
| . . . | . . . | . . . |
| 14 | −7.5 ≤ Differential SINR/RSRQ < −7.0 | dB |
| 15 | Differential SINR/RSRQ < −7.5 | dB |

TABLE 7 another example for differential L1-SINR/L1-RSRQ report mapping:

| Reported Value | Measured Quantity Value | Unit |
|---|---|---|
| 0 | −0.5 ≤ Differential SINR/RSRQ ≤ 0 | dB |
| 1 | −1.0 ≤ Differential SINR/RSRQ < −0.5 | dB |
| . . . | . . . | . . . |
| 14 | Differential SINR/RSRQ < −7.0 and SINR/RSRQ > threahold | dB |
| 15 | SINR/RSRQ < threshold | dB |

Interference Measurement Scheme.

In some aspects, to support MU-MIMO or multi-panel reception, the UE can be configured to measure the interference from a second beam.

In some aspects, for L1-SINK measurement, some non-zero-power (NZP) and/or CSI interference measurement (CSI-IM) resources can be configured for interference measurement. The interference measurement resources can be configured for non-group based beam reporting and/or group-based beam reporting. In some aspects, if such resources are configured, the UE can measure the interference based on the configured resources. The quasi-co-located (QCL) information for the NZP CSI-RS and CSI-IM can be provided by higher layer signaling.

Figure 12:
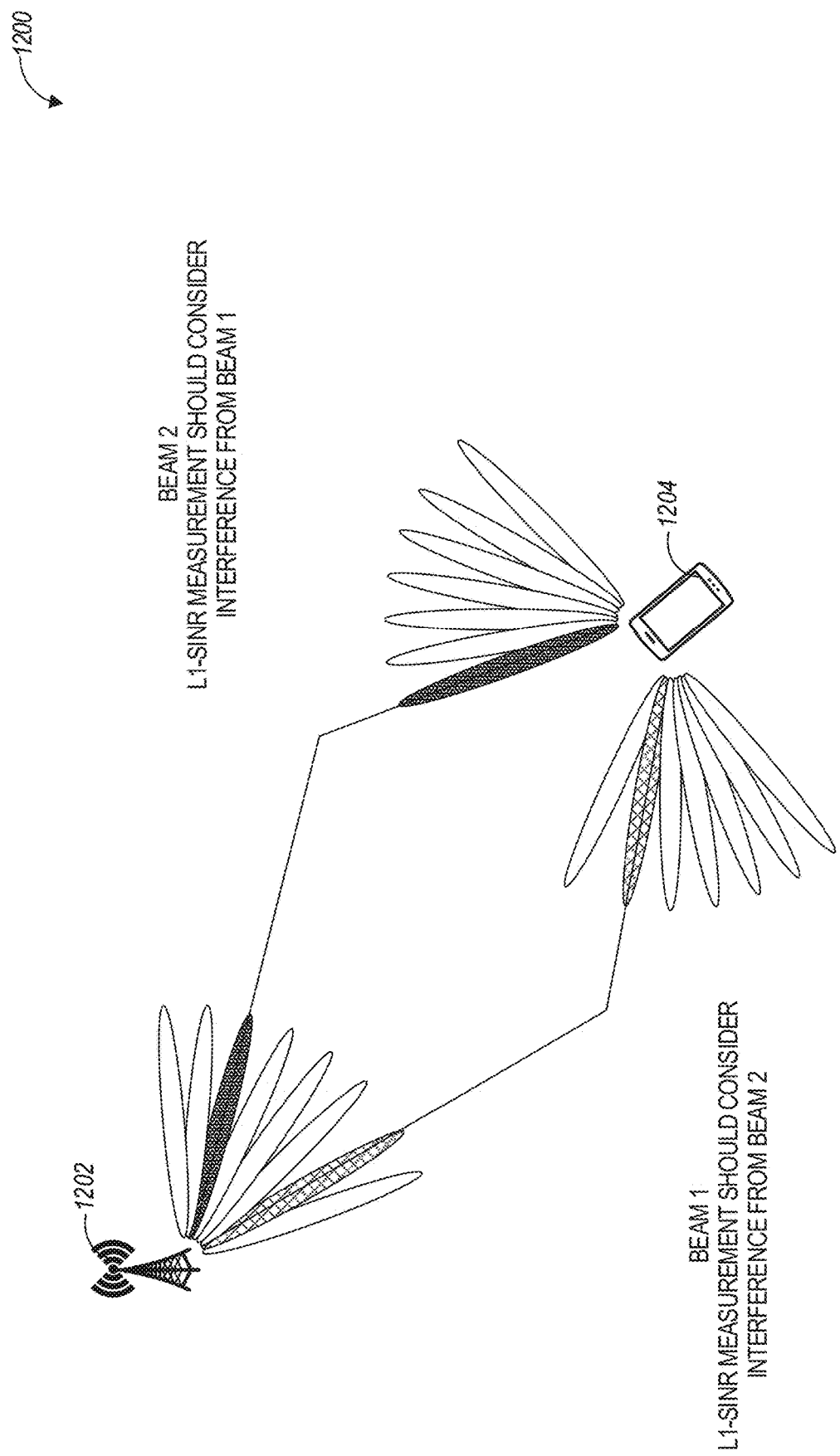
FIG. 12 illustrates an example of L1-SINR measurement for group-based beam reporting, in accordance with some aspects.

FIG. 12 illustrates an example 1200 for L1-SINR measurement for group-based beam reporting associated with communication between a base station 1202 and a UE 1204, in accordance with some aspects. In some aspects, for group-based beam reporting, the measured L1-SINR can be measured, including the interference from a second beam that UE can simultaneously receive, as illustrated in FIG. 12.

In some aspects, for L1-RSRQ measurement, the quasi-co-location (QCL) information for resources used for RSSI can be configured by higher layer signaling so that UE can use the same beam to receive the RSSI as well as corresponding SSB and/or CSI-RS resource for RSRP measurement.

In some aspects, a UE including circuitry to report the quality of synchronization signal block (SSB) and/or Channel State Information Reference Signal (CSI-RS) based on Layer 1 Reference Signal Receiving Power (L1-RSRQ) and/or Layer 1 Signal to interference plus Noise Ratio (L1-SINR). In some aspects, whether the reporting is based on Layer 1 Reference Signal Receiving Power (L1-RSRP) or L1-RSRQ or L1-SINR can be configured by higher layer signaling. In some aspects, when repetition in a CSI-RS resource set is configured to be "ON" and reportQuantity is configured to be "none", the measurement can be based on L1-RSRP or L1-RSRQ/L1-SINR. In some aspects, when repetition in a CSI-RS resource set is configured to be "ON" and reportQuantity is configured to be "none", whether the measurement should be based on L1-RSRP or L1-RSRQ/L1-SINR can be indicated by higher layer signaling or DCI. In some aspects, the UE can use the SSB and the CSI-RS which is configured with QCL-typeA or QCL-typeD with the SSB to jointly measure the L1-RSRP/L1-RSRQ. In some aspects, the UE can report the SSB index and/or SSB index as well as the measured L1-RSRP/L1-RSRQ. In some aspects, which CSI-RS resource(s) can be used if multiple CSI-RS resources are QCLed with the SSB can be selected by UE or indicated by higher layer signaling.

In some aspects, whether the UE can support the joint measurement by SSB and CSI-RS could be reported as a UE capability. In some aspects, the L1-RSRQ/L1-SINR can be reported in either non-group-based beam reporting or group-based beam reporting or both. In some aspects, the UE reports the L1-RSRQ/L1-SINR for each of the beams. In some aspects, the UE reports the L1-RSRQ/L1-SINR for X best beam(s) and the differential L1-RSRQ/L1-RSRP for the other beams, where X could be fixed for non-group based beam reporting, and X could be 1 or equal to the number of groups or number of beams within a group for group-based beam reporting. In some aspects, if X>1 for group-based beam reporting, the differential L1-RSRQ/L1-SINR can be based on the reference beam in the same group or the same index within a group.

In some aspects, the different L1-SINR/L1-RSRQ can be based on the measured L1-SINR/L1-RSRQ for a reference beam. In some aspects, the different L1-SINR/L1-RSRQ can be based on the quantized L1-SINR/L1-RSRQ. In some aspects, one of the differential L1-SINR states can indicate that the measured SINR is below a threshold, where the threshold can be configured by higher layer signaling or be fixed. In some aspects, for L1-SINR measurement, some non-zero-power (NZP) and/or CSI interference measurement (CSI-IM) resources can be configured for interference measurement. In some aspects, the interference measurement resources can be configured for non-group-based beam reporting and/or group-based beam reporting. In some aspects, the quasi-co-located (QCL) information for the NZP CSI-RS and CSI-IM can be provided by higher layer signaling. In some aspects, for L1-RSRQ measurement, the quasi-co-location (QCL) information for resources used for Reference Signal Strength Indicator (RSSI) can be configured by higher layer signaling. In some aspects, the UE can use the same beam to receive RSSI resources and resources for RSRP measurement.

Techniques disclosed herein include systems and methods for synchronization signal block quasi-co-location (QCL) indication.

In some aspects, the QCL indication can be specified for some downlink signals such as CSI-RS, PDSCH, and PDSCH. In some aspects, there can be 4 types of QCL indication, as follows: 'QCL-TypeA': {Doppler shift, Doppler spread, average delay, delay spread}; 'QCL-TypeB': {Doppler shift, Doppler spread}; 'QCL-TypeC': {Doppler shift, average delay}; and 'QCL-TypeD': {Spatial Rx parameter}.

In some aspects, if two downlink signals are indicated with QCL-TypeD, it means those signals can be received by the same UE receiving beam. Two downlink signals can be configured with more than one QCL types.

In some aspects, for SSB, no QCL indication is defined. In some aspects, with some QCL information, the UE can reduce its beam searching latency. The UE can sweep its beams to the SSBs that are QCLed. Then to search a UE beam for one SSB, the UE may not need to wait until next time instance for this SSB to try another UE beams.

Figure 13:
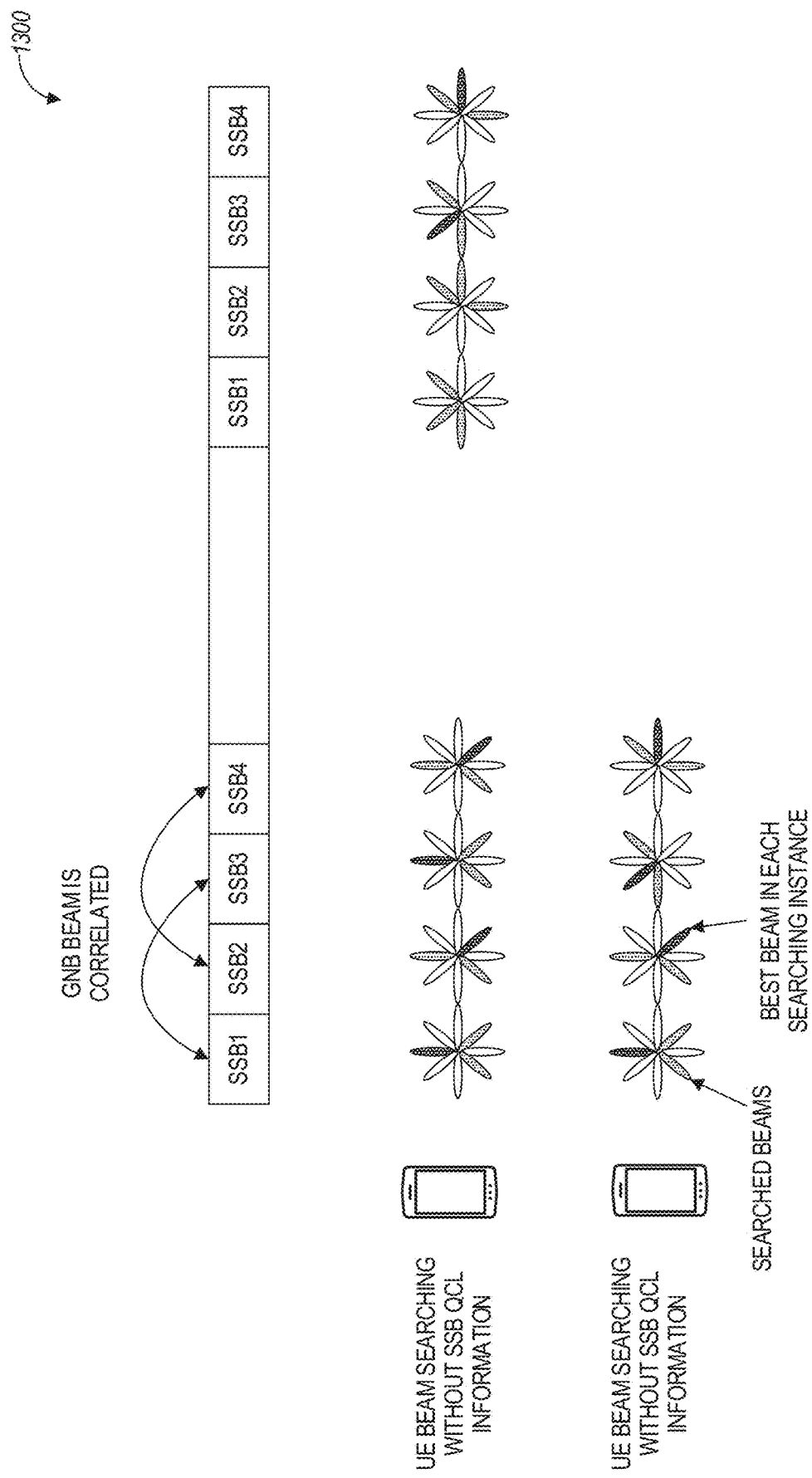
FIG. 13 illustrates UE beam searching with SSB QCL information, in accordance with some aspects.

FIG. 13 illustrates an example 1300 of UE beam searching with SSB QCL information, in accordance with some aspects. More specifically, FIG. 13 illustrates one example for the UE beam searching latency reduction with the help of SSB QCL information, where it is assumed that the UE can use 3 beams to measure one SSB and different beams can be applied to the symbols without primary synchronization signal (PSS). With SSB QCL information, the UE can apply different beams to different SSBs that are QCLed, so the beam searching latency can be reduced. Techniques disclosed herein can be used for notifying the UE of the QCL, information for the SSBs. More specifically, disclosed techniques provide the following methods for the QCL indication for SSBs are proposed including control signaling for SSB QCL indication and restriction for SSB QCL indication.

In some aspects, two ways can be used to indicate the SSB QCL: one is based on explicit control signaling, and the other is based on the implicit indication. The following aspects are provided for control signaling for SSB QCL indication.

In some aspects, the SSB QCL can be indicated by RRC signaling, which can be a broadcast signaling, such as master information block (MIB) or System Information Block (SIB), or can be a dedicated RRC signaling.

In one option, the control signaling could include part or all of the following elements: target SSB index, source resource signal index, QCL type, and a serving cell index.

In some aspects, the source reference signal index may be an SSB index only or may be either an SSB index or a channel state information reference signal (CSI-RS) resource index. In some aspects, the QCL type can be selected from a subset of or all of the QCL types from QCL typeA to QCL typeD. In some aspects, one or more than one of QCL types can be configured between two SSBs. In some aspects, the serving cell index is used to indicate the component carrier (CC) ID for a UE in carrier aggregation mode.

In some aspects, the control signaling could include a group of SSB indexes, which are QCLed as follows: an SSB index list and QCL type. In some aspects, the SSBs configured in the SSB index list can be considered to be QCLed with the indicated QCL type. The SSB may be from the same CC or different CCs.

Figure 14:
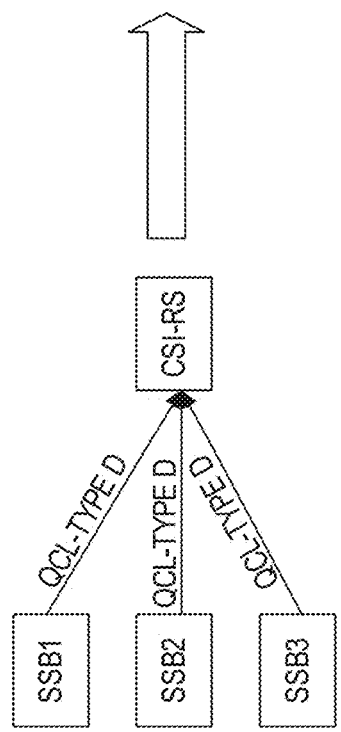
FIG. 14 illustrates an example of SSB QCL indication via other downlink signals, in accordance with some aspects.

In another aspect, the QCL between SSBs can be indicated via the QCL indication for other downlink signals. If two or more than two SSBs are QCLed with the same downlink signal, those SSBs can be considered to be QCLed. Therefore, for some downlink signals, e.g. CSI-RS, more than one SSB index can be configured with the same QCL type. FIG. 14 illustrates an example 1400 of the scheme for SSB QCL indication via other downlink signals, in accordance with some aspects.

In some aspects, the SSB QCL can be determined by its time and frequency resource and/or by SSB index. In one example, the SSBs in different frequency resources can be considered to be QCLed. Alternatively, the gNB can configure the number of SSB QCL groups via RRC signaling. In some aspects, the SSB QCL can be determined by the SSB index. In one aspect, given there are 3N SSBs and N SSB QCL groups, then SSB 0, 1 and 2 could be QCLed, and SSB 3, 4, and 5 can be QCLed, and so on.

A UE includes circuitry to determine the antenna port quasi-co-location (QCL) for a synchronization signal block (SSB). In some aspects, the SSB QCL can be indicated by a master information block (MIB) or a System Information Block (SIB), or a dedicated RRC signaling. In some aspects, the control signaling could include part or all of the following elements: target SSB index, source resource signal index, QCL type, and a serving cell index. In some aspects, the source reference signal index may be an SSB index only. In some aspects, the source reference signal index may be either an SSB index or a channel state information reference signal (CSI-RS) resource index. In some aspects, the QCL type can be selected from a subset of or all of the QCL types from QCL typeA to QCL typed. In some aspects, one or more than one of QCL types can be configured. In some aspects, the control signaling could include a group of SSB indexes which are QCLed as follows: SSB index list and QCL type. In some aspects, the SSBs configured in the SSB index list can be considered to be QCLed with the indicated QCL type. In some aspects, the QCL between SSBs can be indicated via the QCL indication for other downlink signals. In some aspects, for some downlink signals, more than one SSB index can be configured with the same QCL type. In some aspects, the SSB QCL can be determined by its time and frequency resource and/or by SSB index. In some aspects, the gNB can configure the number of SSB QCL groups via RRC signaling, and the SSB QCL can be determined by the SSB index.

Techniques disclosed herein include systems and methods for beam indication for semi-persistent and grant-free transmission.

In some aspects, beam management can be specified to support gNB to provide some beam indication related information to a UE. For downlink, the beam indication can be based on Transmission Configuration Indication (TCI) framework, where the gNB can configure N TCI states by radio resource control (RRC) signaling, down-select M TCI states among the N RRC-configured TCI states by medium access control (MAC) Control Element (CE), and select one of the TCI states from the M MAC-filtered TCI states by DCI, which is indicated by the Transmission configuration indication field. Then there could be one issue for DL semi-persistent scheduling (SPS) which can be addressed by disclosed techniques, namely, how to determine the TCI state if there is some reconfiguration by higher layer on the candidate TCI states during the transmission interval (as indicated in FIG. 15).

Figure 15:
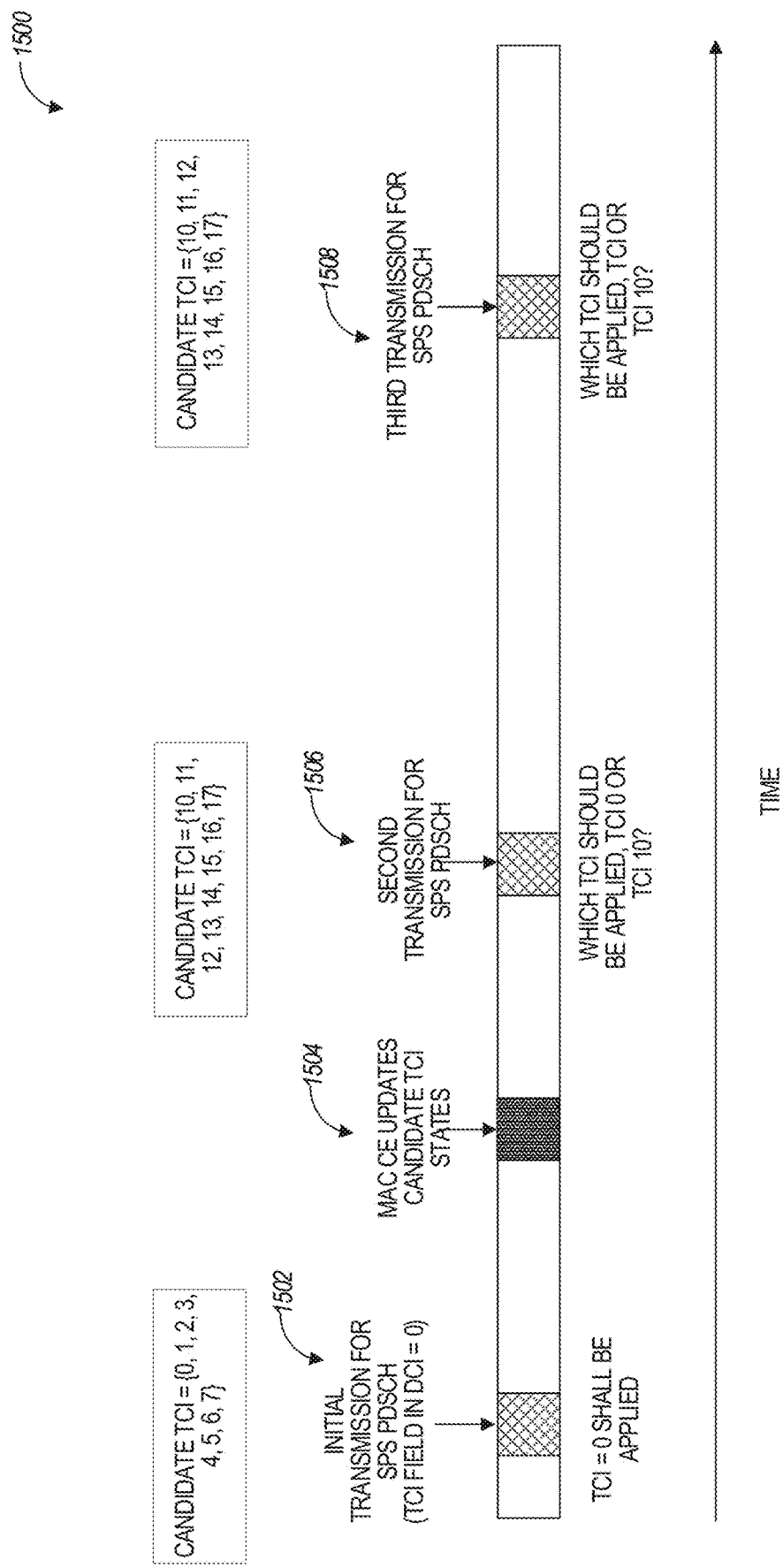
FIG. 15 illustrates an example of potential TCI indication ambiguity, in accordance with some aspects.

FIG. 15 illustrates an example of 1500 for potential TCI indication ambiguity, in accordance with some aspects. Referring to FIG. 15, the initial transmission for SPS PDSCH takes place at operation 1502. At operation 1504, the MAC CE updates the candidate TCI states. At operation 1506, a second transmission for SPS PDSCH takes place. At operation 1508, the third transmission for SPS PDSCH takes place. FIG. 15 illustrates the potential TCI indication ambiguity for the second and third transmissions.

In some aspects, the initial PDSCH TCI state is not based on the indicated TCI in DCI, and instead, it may be based on a TCI state in a Control Resource Set (CORESET). Then if the TCI state for the CORESET is updated, whether the SPS PDSCH TCI should be updated could be another issue that is addressed by disclosed techniques.

In some aspects, for uplink communications, the beam indication can be Sounding Reference Signal (SRS) based. The PUSCH transmission can be based on one SRS resource indicated by SRS Resource Indicator (SRI) in DCI for grant-based transmission or srs-ResourceIndicator signaling configured by RRC for grant-free transmission. In some aspects, the PUSCH can follow the SRS-spatialRelationInfo configured in the indicated SRS resource to determine the spatial domain transmission filter (Tx beam). In some aspects, two types of grant-free transmission can be used—Type 1 and Type 2. In Type 1 transmission, the UE can select to transmit the PUSCH based on RRC-configured parameters and opportunities. In Type 2 transmission, the UE can perform an SPS-like transmission, which is similar to DL SPS transmission. In some aspects, if the SRS-spatialRelationInfo is updated for the indicated SRS resource, how to determine the Tx beam for grant-free PUSCH could be an issue that can be addressed by disclosed techniques.

Disclosed techniques include methods for downlink TCI state assumption for SPS transmission and uplink spatial relation information assumption for Type 1/Type2 configured grant PUSCH transmission, such as fixed TCI state assumption for SPS transmission, dynamic TCI state update for SPS transmission, fixed spatial relation information assumption for Type1/Type2 configured grant PUSCH transmission; dynamic spatial relation information assumption for Type1/Type2 configured grant PUSCH transmission.

As used herein, the terminology "Type 1 and Type 2 grant free PUSCH transmission" is interchangeable to "Type 1 and Type 2 configured grant PUSCH transmission" or "Type 1 and Type 2 PUSCH transmission without grant".

TCI State Assumption for SPS-PDSCH.

In some aspects, for SPS PDSCH, the same TCI state can be applied to each transmission occasion. The UE can be configured to follow the quasi-co-location (QCL) information configured by the TCI state for initial transmission for the subsequent transmissions, regardless of whether the TCI state is updated or not.

Figure 16:
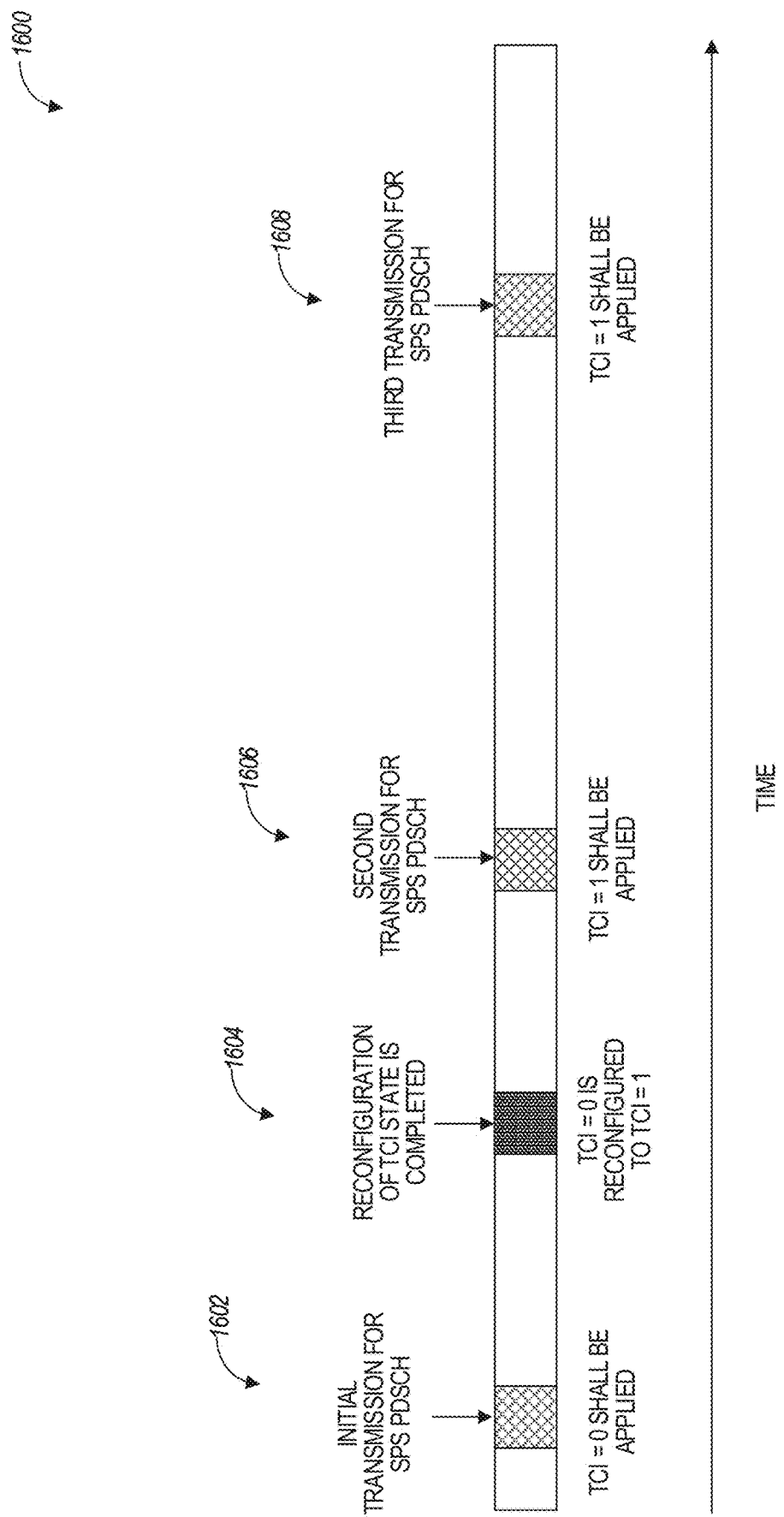
FIG. 16 illustrates an example of dynamic TCI state update, in accordance with some aspects.

In some aspects, for each transmission occasion of SPS PDSCH, the UE can follow the QCL information configured by the latest updated TCI state. If the TCI state for initial transmission is determined by DCI, to receive one SPS-PDSCH transmission, the UE may use the new TCI state selected from latest configured candidate TCI states by RRC/MAC CE based on the same TCI field index indicated by TCI. If the TCI state for initial transmission is based on a TCI state in a CORESET, to receive one SPS-PDSCH transmission, the UE may use the latest TCI state for this CORESET. FIG. 16 illustrates one such example for the dynamic TCI state update.

FIG. 16 illustrates an example 1600 for dynamic TCI state update, in accordance with some aspects. Referring to FIG. 16, the initial transmission for SPS PDSCH takes place at operation 1602. Reconfiguration of a TCI state is completed at operation 1604 (TCI is reconfigured from 0 to 1). A second transmission for SPS PDSCH takes place at operation 1606 with the new TCI state of 1. The third transmission for SPS PDSCH takes place at operation 1608 with the new TCI state of 1.

Spatial Relation Information Assumption for PUSCH.

In some aspects, for grant-based transmission, when scheduled by DCI format 0_1, the indicated SRI in slot n can indicate the most recent configured SRS resource before slot n, where "configured" indicates the configuration has taken effect. In one aspect, the indicated SRI in slot n is associated with the most recent configured SRS resource identified by the SRI, where the configuration of SRS resource is prior to the PDCCH carrying the SRI before slot n.

In some aspects, for Type1/Type2 grant-free PUSCH transmission, the HE can apply the spatial domain transmission filter (Tx beam) configured by SRS-spatialRelationInfo signaling for the SRS indicated by RRC signaling, where the Tx beam should be consistent for each transmission occasion. For Type1 transmission, the Tx beam for PUSCH can be based on the most recent configuration of the indicated SRS resource before srs-ResourceIndicator is configured by RRC signaling. For Type2 transmission, the Tx beam for PUSCH can be based on the most recent configuration of the indicated SRS resource before the slot with the grant for initial transmission.

In some aspects, for Type1/Type2 grant-free PUSCH transmission, the spatial domain transmission filter (Tx beam) for each PUSCH transmission occasion can be updated according to the latest configuration.

Figure 17:
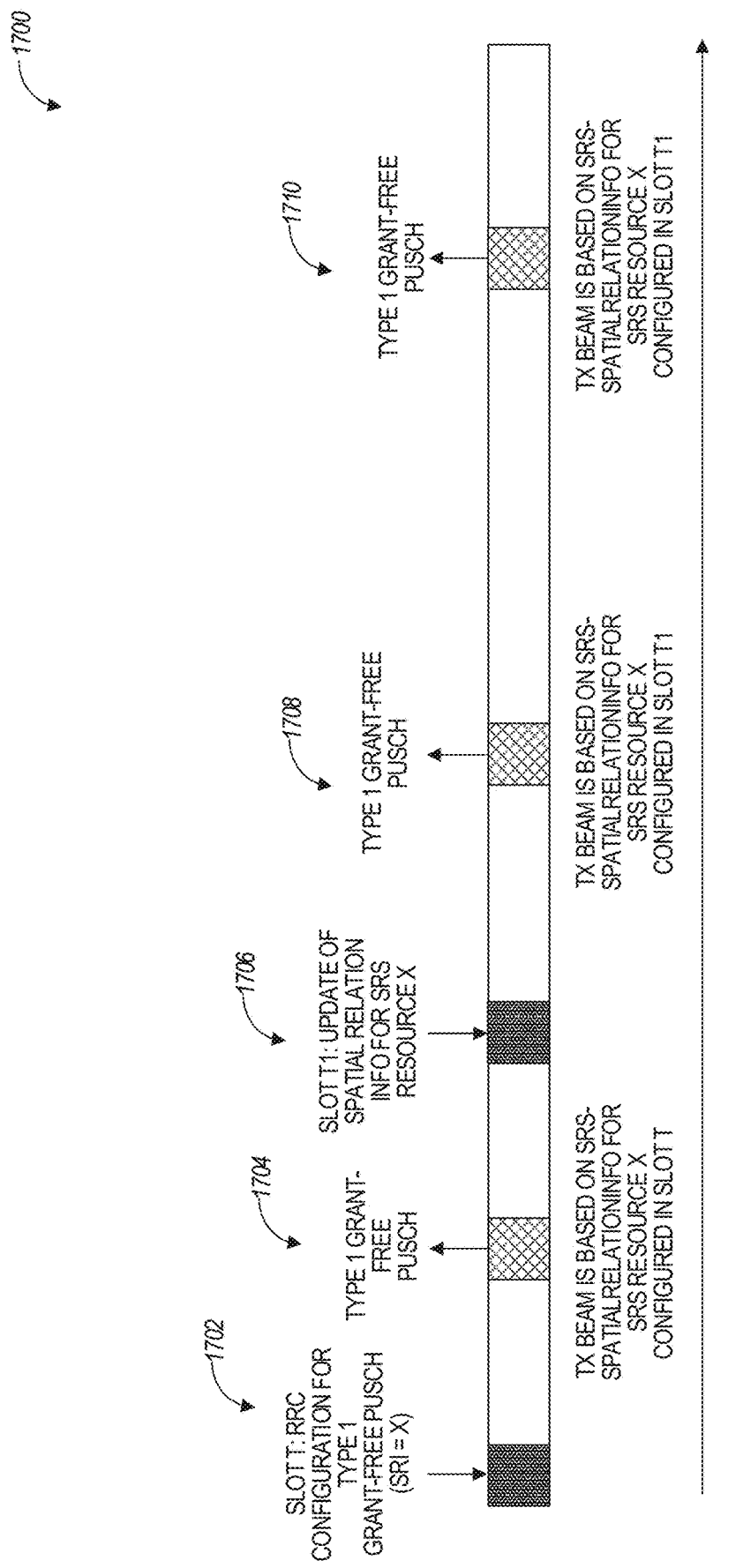
FIG. 17 illustrates an example of a dynamic spatial relation update for Type 1 grant-free based transmission, in accordance with some aspects.

In some aspects, for Type1 grant-free PUSCH transmission, the Tx beam for PUSCH transmission in slot n can be based on the most recent configuration of the SRS resource indicated by srs-ResourceIndicator before slot n−k, where k can be fixed, e.g. 0, or configured by higher layer signaling or based on UE capability, and the "configuration of SRS resource" indicates that the configuration is completed and takes effect. In some aspects, the above processing can also apply for the Type 2 grant-free PUSCH transmission for subsequent transmissions after the initial transmission. FIG. 17 illustrates an example 1700 for dynamic spatial relation update for Type 1 grant-free based transmission, in accordance with some aspects.

Referring to FIG. 17, at operation 1702 (at slot T), RRC configuration for Type 1 grant-free PUSCH (SRI=x) takes place. At operation 1704, Type 1 grant-free PUSCH transmission takes place (the Tx beam is based on SRS-spatialRelationInfo for SRS resource x configured in slot T). At operation 1706, the spatial relation info is updated (at slot T1) for SRS resource x. At operation 1708, Type 1 grant-free PUSCH transmission takes place (the Tx beam is based on SRS-spatialRelationInfo for SRS resource x configured in slot T1). At operation 1710, Type 1 grant-free PUSCH transmission takes place (the Tx beam is based on SRS-spatialRelationInfo for SRS resource x configured in slot T1).

Figure 18:
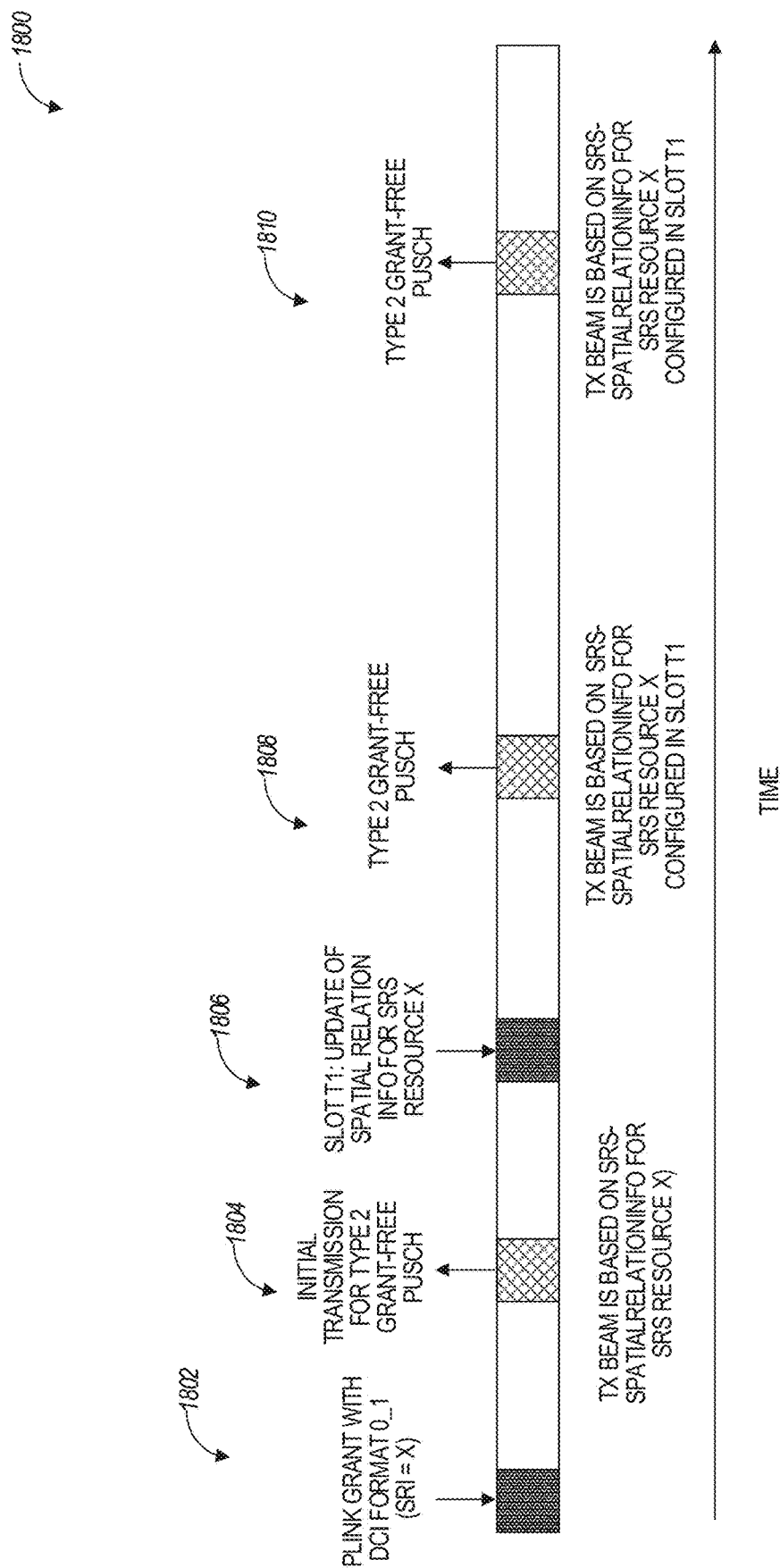
FIG. 18 illustrates an example of a dynamic spatial relation update for Type 2 grant-free based transmission when DCI format 0_1 is used to trigger initial transmission, in accordance with some aspects.
Figure 19:
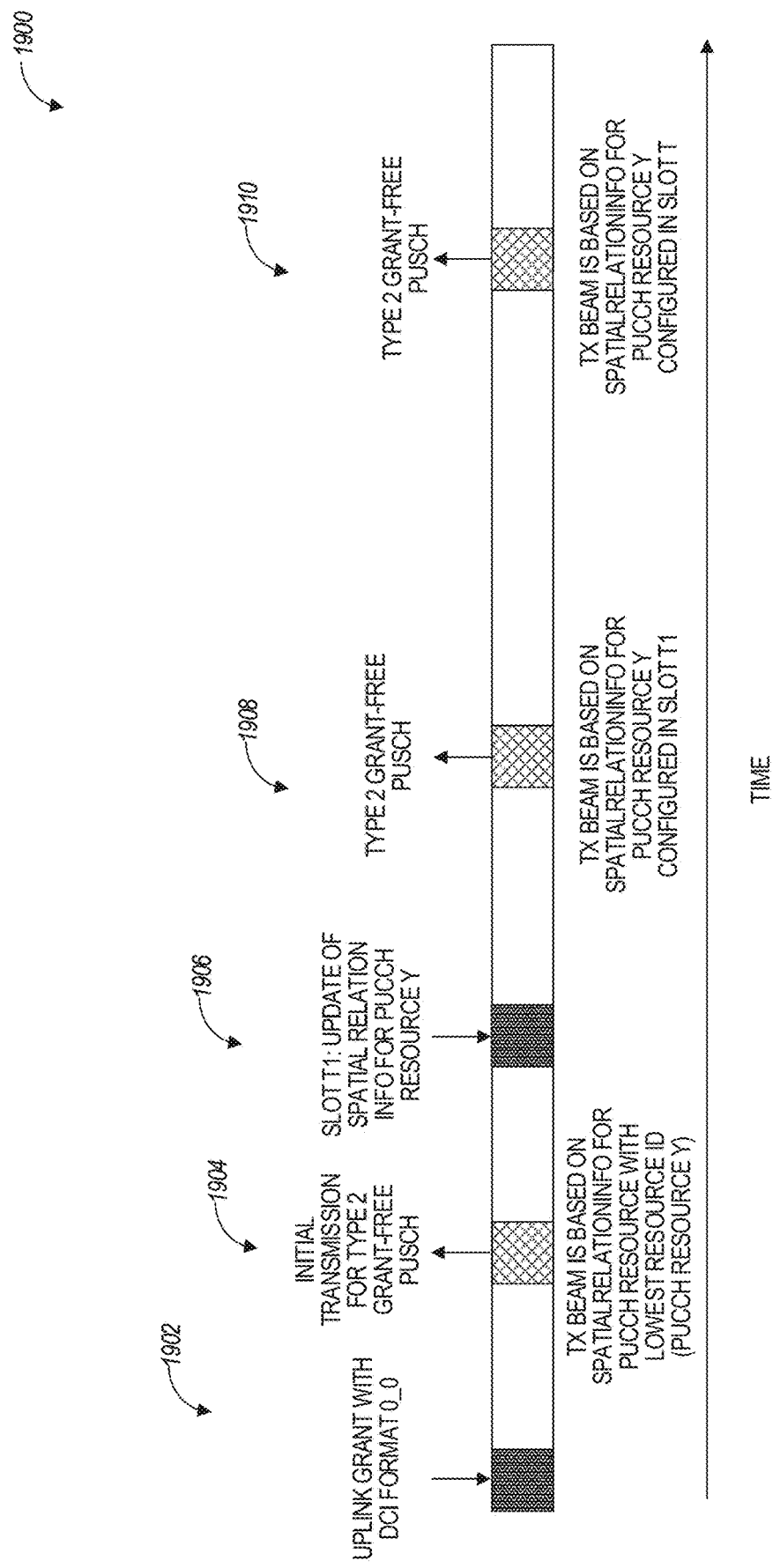
FIG. 19 illustrates an example of a dynamic spatial relation update for Type 2 grant-free based transmission when DCI format 0_0 is used to trigger initial transmission, in accordance with some aspects.

In some aspects, for Type2 grant-free PUSCH transmission, the Tx beam for PUSCH transmission in slot n can be based on the latest spatial relation info configured for the indicated SRI before slot n–k if the DCI format 0_1 is used to trigger Type2 grant-free PUSCH transmission. In some aspects, if DCI format 0_0 is used, the Tx beam for PUSCH transmission in slot n can be based on the latest spatial relation info configured for the PUCCH resource with lowest resource ID in active BWP before slot n–k. The variable k may be fixed, e.g., 0, or configured by higher layer signaling or based on UE capability. FIGS. 18-19 illustrates examples for dynamic spatial relation update for Type 2 grant-free based transmission when it is triggered by DCI format 0_1 or DCI format 0_0.

FIG. 18 illustrates an example 1800 for dynamic spatial relation update for Type 2 grant-free based transmission when DCI format 0_1 is used to trigger initial transmission, in accordance with some aspects. Referring to FIG. 18, at operation 1802, an uplink grant with DCI format 0_1 takes place. At operation 1804, an initial transmission for Type 2 grant-free PUSCH takes place (the Tx beam is based on SRS-spatialRelationInfo for SRS resource x). At operation 1806 (at slot T1), an update of the spatial relation info for SRS resource x takes place. At operation 1808, a Type 2 grant-free PUSCH transmission takes place (the Tx beam is based on SRS-spatialRelationInfo for SRS resource x configured in slot T1). At operation 1810, a Type 2 grant-free PUSCH transmission takes place (the Tx beam is based on SRS-spatialRelationInfo for SRS resource x configured in slot T1).

FIG. 19 illustrates an example 1900 for dynamic spatial relation update for Type 2 grant-free based transmission when DCI format 0_0 is used to trigger initial transmission, in accordance with some aspects. Referring to FIG. 19, at operation 1902, an uplink grant with DCI format 0_0 takes place. At operation 1904, an initial transmission for Type 2 grant-free PUSCH takes place (the Tx beam is based on SRS-spatialRelationInfo for PUCCH resource with the lowest resource ID, e.g., PUCCH resource y). At operation 1906 (at slot T1), an update of the spatial relation info for PUCCH resource y takes place. At operation 1908, a Type 2 grant-free PUSCH transmission takes place (the Tx beam is based on spatialRelationInfo for PUCCH resource y configured in slot T1). At operation 1910, a Type 2 grant-free PUSCH transmission takes place (the Tx beam is based on spatialRelationInfo for PUCCH resource y configured in slot T1).

In some aspects, to simplify the UE implementation, the UE may expect DCI format 0_1 can be used to schedule the initial transmission for Type 2 grant-free PUSCH.

In some aspects, when repetition is configured for Type 1 and 2 grant-free PUSCH transmission, the UE may not change the Tx beam during the configured repetition.

In some aspects, the power control parameters for Type 1 and Type 2 grant-free PUSCH can be updated by a MAC Control Element (MAC CE), where the power control parameters include at least one of a downlink reference signal for path loss estimation; P0, alpha, as well as closed-loop power control index.

In some aspects, for grant-based PUSCH scheduled by DCI format 0_0, its spatial relation info may be the same as that configured or indicated for dedicated PUCCH resource with the lowest resource ID in an active bandwidth part (BWP). Since the PUCCH beam indication could be based on a MAC CE, which is defined based on a 3 ms delay, how to select the occasion of corresponding PUCCH resource to determine PUSCH could be an issue resolved using disclosed techniques. More specifically, in some aspects, the following options can be used to determine the PUSCH spatial relation info when scheduled by DCI format 0_0:

Option 1: the spatial relation info for PUSCH may be the same as that for dedicated PUCCH resource with lowest resource ID before K slots before scheduling PDCCH;

Option 2: the spatial relation info for PUSCH may be the same as that for dedicated PUCCH resource with lowest resource ID before K slots before the PUSCH transmission;

Option 3: the spatial relation info for PUSCH may be the same as that for dedicated PUCCH resource with lowest resource ID most recent transmitted before K slots before scheduling DCI; and Option 4: the spatial relation info for PUSCH may be the same as that for dedicated PUCCH resource with the lowest resource ID most recent transmitted before K slots before the PUSCH transmission.

Figure 20:
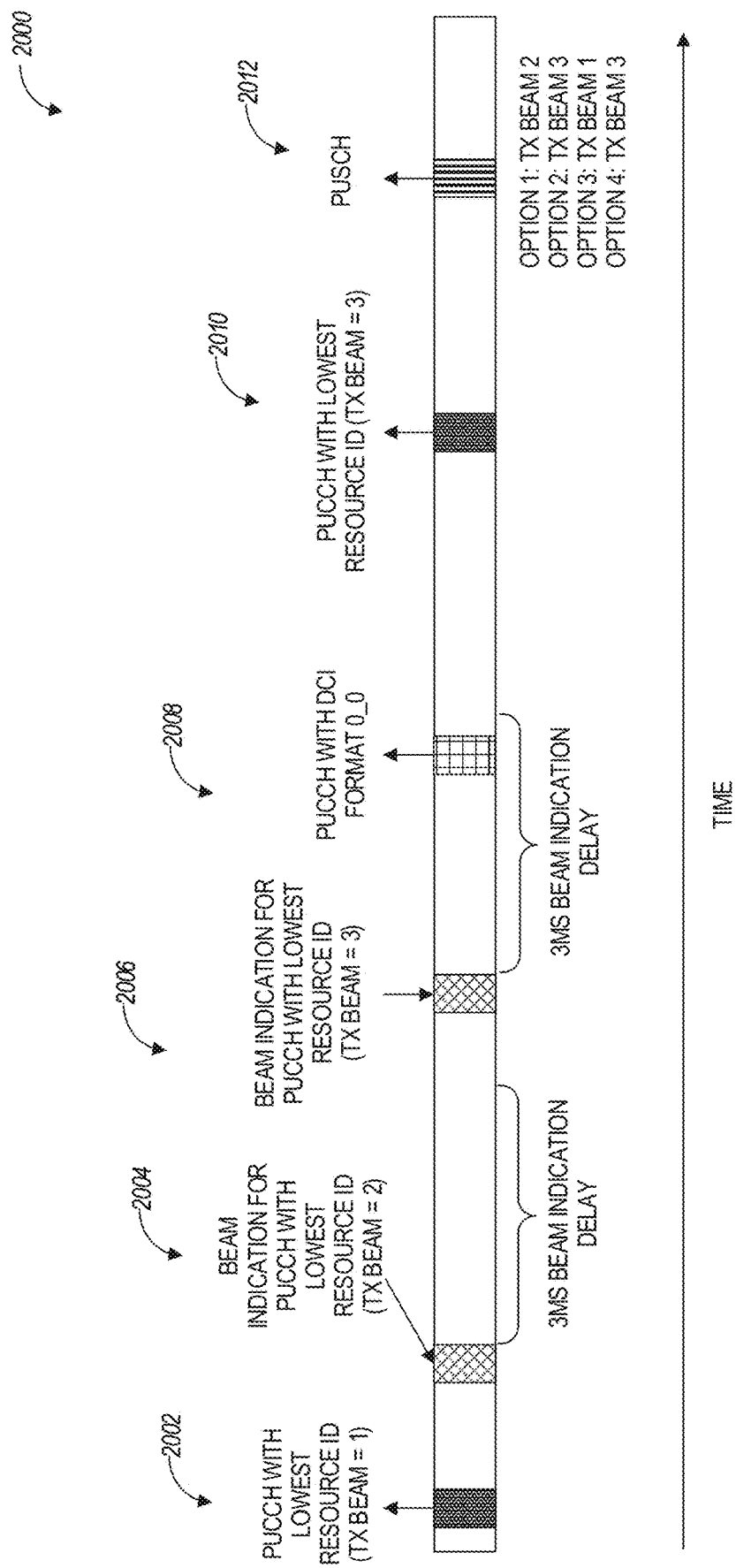
FIG. 20 illustrates an example of PUSCH spatial relation info selection when scheduled by DCI format 0_0, in accordance with some aspects.

In some aspects, the delay K could be fixed, e.g. K=0, or configured by higher layer signaling or based on UE capability. FIG. 20 illustrates examples for how to determine PUSCH spatial relation info when scheduled by DCI format 0_0 based on the options above. FIG. 20 illustrates examples 2000 for PUSCH spatial relation info selection when scheduled by DCI format 0_0, in accordance with some aspects.

Referring to FIG. 20, at operation 2002, PUCCH transmission with the lowest resource ID takes place (e.g., using Tx beam 1). At operation 2004, beam indication for PUCCH transmission with the lowest resource ID takes place (e.g., using Tx beam 2). At operation 2006, beam indication for PUCCH with the lowest resource ID takes place (e.g., using Tx beam 3). Operation 2006 takes place after the 3 ms beam indication delay following operation 2004. At operation 2008, PUCCH transmission with DCI format 0_0 takes place. Operation 2008 takes place within the 3 ms beam indication delay following operation 2006. At operation 2010, a PUCCH transmission with the lowest resource ID takes place (e.g., using Tx beam 3). At operation 2012, the PUSCH transmission takes place using the indicated Tx beams for corresponding options 1-4.

A UE performing the above techniques includes circuitry to determine the transmission configuration indication (TCI) states for semi-persistent scheduling (SPS) based downlink signal. In some aspects, for SPS PDSCH, the UE may assume that the same TCI state should be applied to each transmission occasion. In some aspects, the UE may follow the quasi-co-location (QCL) information configured by the TCI state for initial transmission for the subsequent transmissions, regardless of whether the TCI state is updated or not. In some aspects, for each transmission occasion of SPS PDSCH, the UE may follow the QCL information configured by the latest updated TCI state. In some aspects, if the TCI state for initial transmission is determined by DCI, to receive one SPS-PDSCH transmission, the UE may use the new TCI state selected from latest configured candidate TCI states by RRC/MAC CE based on the same TCI field index indicated by TCI. In some aspects, if the TCI state for initial transmission is based on a TCI state in a CORESET, to receive one SPS-PDSCH transmission, the UE may use the latest TCI state for this CORESET.

In some aspects, the HE includes circuitry to determine the spatial domain transmission filter for grant-based and Type1/Type2 configured grant based transmission. In some aspects, for grant-based transmission, when scheduled by DCI format 0_1, the indicated SRI in slot n may indicate the most recent configured SRS resource before slot n. In some aspects, for Type1/Type2 grant-free PUSCH transmission, the UE may apply the spatial domain transmission filter configured by SRS-spatialRelationInfo for the SRS indicated by RRC signaling. In some aspects, for a Type1 transmission, the spatial domain transmission filter for PUSCH may be based on the most recent configuration of the indicated SRS resource before srs-ResourceIndicator is configured by RRC signaling. In some aspects, for Type2 transmission, the spatial domain transmission filter for PUSCH is based on the most recent configuration of the indicated SRS resource before the slot with the grant for initial transmission. In some aspects, for Type1/Type2 configured grant PUSCH transmission, the spatial domain transmission filter for each PUSCH transmission occasion may be updated according to the latest configuration. In some aspects, for Type1 configured grant PUSCH transmission, the Tx beam for PUSCH transmission in slot n may be based on the most recent configuration of the SRS resource indicated by srs-ResourceIndicator before slot n−k, where k can be fixed or configured by higher layer signaling or based on UE capability.

In some aspects, for Type2 configured grant PUSCH transmission, the Tx beam for PUSCH transmission in slot n may be based on the latest spatial relation info configured for the indicated SRI before slot n-k, if the DCI format 0_1 is used to trigger Type2 configured grant PUSCH transmission. In some aspects, if DCI format 0_0 is used, the Tx beam for PUSCH transmission in slot n may be based on the latest spatial relation info configured for the PUCCH resource with lowest resource ID in active BWP before slot n–k. In some aspects, the UE may expect DCI format 0_1 can be used to schedule the initial transmission for Type 2 grant-free PUSCH. In some aspects, when repetition is configured for Type 1 and 2 grant-free PUSCH transmission, the UE may not change the Tx beam during the configured repetition.

In some aspects, the power control parameters for Type 1 and Type 2 grant-free PUSCH can be updated by MAC Control Element, where the power control parameters include at least one of a downlink reference signal for path loss estimation, P0, alpha, as well as closed-loop power control index.

In some aspects, the UE includes circuitry to determine spatial relation info for grant-based PUSCH when scheduled by DCI format 0_0. In some aspects, the spatial relation info for PUSCH may be the same as that for dedicated PUCCH resource with the lowest resource ID before K slots before scheduling PDCCH. In some aspects, the spatial relation info for PUSCH may be the same as that for a dedicated PUCCH resource with the lowest resource ID before K slots before the PUSCH transmission. In some aspects, the spatial relation info for PUSCH may be the same as that for dedicated PUCCH resource with the lowest resource ID most recent transmitted before K slots before scheduling DCI. In some aspects, the spatial relation info for PUSCH may be the same as that for dedicated PUCCH resource with the lowest resource ID most recent transmitted before K slots before the PUSCH transmission. In some aspects, the parameter K can be predefined or configured by higher layer signaling or be determined by UE capability.

Figure 21:
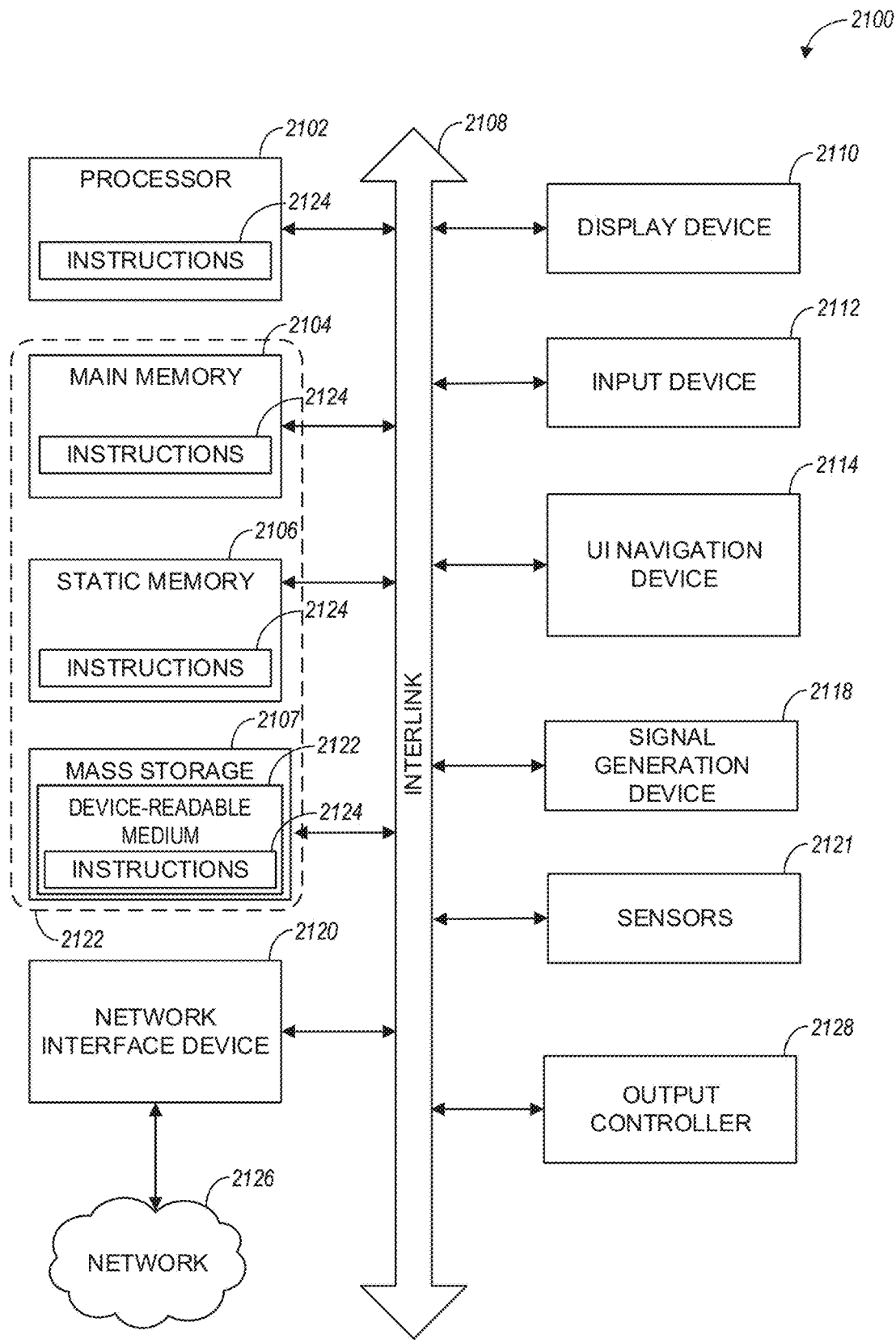
FIG. 21 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 21 illustrates a block diagram of a communication device such as an evolved Node-B (eNB), a next generation Node-B (gNB), an access point (AP), a wireless station (STA), a mobile station (MS), or a user equipment (UE), in accordance with some aspects. In alternative aspects, the communication device 2100 may operate as a standalone device or may be connected (e.g., networked) to other communication devices.

Circuitry (e.g., processing circuitry) is a collection of circuits implemented within tangible entities of the device 2100 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in the first circuit of a first circuitry at one point in time and reused by a second circuit in the first circuitry, or by a third circuit in a second circuitry at a different time. Additional examples of these components with respect to the device 2100 follow.

In some aspects, the device 2100 may operate as a standalone device or may be connected (e.g., networked) to other devices. In a networked deployment, the communication device 2100 may operate in the capacity of a server communication device, a client communication device, or both in server-client network environments. In an example, the communication device 2100 may act as a peer communication device in peer-to-peer (P2P) (or other distributed) network environment. The communication device 2100 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 2100 may include a hardware processor 2102 (e.g., a central processing unit (CPU), a graphics processing unit (GPU), a hardware processor core, or any combination thereof), a main memory 2104, a static memory 2106, and mass storage 2107 (e.g., hard drive, tape drive, flash storage, or other block or storage devices), some or all of which may communicate with each other via an interlink (e.g., bus) 2108.

The communication device 2100 may further include a display device 2110, an alphanumeric input device 2112 (e.g., a keyboard), and a user interface (UI) navigation device 2114 (e.g., a mouse). In an example, the display device 2110, input device 2112 and UI navigation device 2114 may be a touch screen display. The communication device 2100 may additionally include a signal generation device 2118 (e.g., a speaker), a network interface device 2120, and one or more sensors 2121, such as a global positioning system (GPS) sensor, compass, accelerometer, or other sensors. The communication device 2100 may include an output controller 2128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2107 may include a communication device-readable medium 2122, on which is stored one or more sets of data structures or instructions 2124 (e.g., software) embodying or utilized by any one or more of the techniques or functions described herein. In some aspects, registers of the processor 2102, the main memory 2104, the static memory 2106, and/or the mass storage 2107 may be, or include (completely or at least partially), the device-readable medium 2122, on which is stored the one or more sets of data structures or instructions 2124, embodying or utilized by any one or more of the techniques or functions described herein. In an example, one or any combination of the hardware processor 2102, the main memory 2104, the static memory 2106, or the mass storage 2116 may constitute the device-readable medium 2122.

As used herein, the term "device-readable medium" is interchangeable with "computer-readable medium" or "machine-readable medium". While the communication device-readable medium 2122 is illustrated as a single medium, the term "communication device-readable medium" may include a single medium or multiple media (e.g., a centralized or distributed database, and/or associated caches and servers) configured to store the one or more instructions 2124.

The term "communication device-readable medium" may include any medium that is capable of storing, encoding, or carrying instructions (e.g., instructions 2124) for execution by the communication device 2100 and that causes the communication device 2100 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 2124 may further be transmitted or received over a communications network 2126 using a transmission medium via the network interface device 2120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old. Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 2120 may include one or more physical jacks (e.g., Ethernet, coaxial, or phone jacks) or one or more antennas to connect to the communications network 2126. In an example, the network interface device 2120 may include a plurality of antennas to wirelessly communicate using at least one of single-input-multiple-output (SIMO), MIMO, or multiple-input-single-output (MISO) techniques. In some examples, the network interface device 2120 may wirelessly communicate using Multiple User MIMO techniques.

The term "transmission medium" shall be taken to include any intangible medium that is capable of storing, encoding or carrying instructions for execution by the communication device 2100, and includes digital or analog communications signals or another intangible medium to facilitate communication of such software. In this regard, a transmission medium in the context of this disclosure is a device-readable medium.

Additional Notes and Examples

Example 1 is an apparatus of a user equipment (UE), the apparatus comprising: processing circuitry, wherein to configure the UE for a semi-persistent scheduling (SPS) transmission or a grant-free transmission in a 5G New Radio (NR) communication network, the processing circuitry is to:

decode radio resource control (RRC) signaling from a base station, the RRC signaling configuring a plurality of transmission configuration information (TCI) candidates, the plurality of TCI candidates indicating a first set of transmission beams for an initial transmission on an SPS physical downlink shared channel (PDSCH); decode a medium access control (MAC) control element (MAC CE) from the base station, the MAC CE re-configuring the plurality of TCI candidates to include, at least a second set of transmission beams for the SPS PDSCH; select a transmission beam from the second set of transmission beams based on a TCI beam index used to select an initial transmission beam for the initial transmission; and decode downlink data received in a subsequent transmission via the selected transmission beam on the SPS PDSCH; and memory coupled to the processing circuitry, the memory configured to store the first and second sets of transmission beams.

In Example 2, the subject matter of Example 1 includes, wherein the processing circuitry is to: decode downlink control information (DCI), the DCI including a TCI field with the TCI beam index, the TCI beam index indicating the initial transmission beam for the initial transmission on the SPS PDSCH.

In Example 3, the subject matter of Examples 1-2 includes, wherein the processing circuitry is to: decode a control resource set (CORESET), the CORESET indicating the TCI beam index.

In Example 4, the subject matter of Examples 1-3 includes, wherein the processing circuitry is to: decode a second RRC signaling from the base station, the second RRC signaling including an updated TCI beam index; select the transmission beam from the second set of transmission beams based on the updated TCI beam index.

In Example 5, the subject matter of Examples 1-4 includes, wherein the processing circuitry is to: decode downlink control information (DCI) format 0_1, the DCI format 0_1 including a sounding reference signal (SRS) resource indicator (SRI); and determine a spatial domain transmission filter for grant-based transmission of uplink data based on the SRI, wherein the SRI is received in slot n and indicates a configured SRS resource prior to slot n.

In Example 6, the subject matter of Examples 1-5 includes, wherein the processing circuitry is to: determine a sounding reference signal (SRS) resource indicator (SRI), the SRI indicated by the RRC signaling; and configure a spatial domain transmission filter for Type 1 or Type 2 grant-free physical uplink shared channel (PUSCH) transmission based on the SRI.

In Example 7, the subject matter of Example 6 includes, grant-free PUSCH transmission, the spatial domain transmission filter is based on a most recent configuration of an SRS resource configured before the SRI is indicated by the RRC signaling.

In Example 8, the subject matter of Examples 6-7 includes, grant-free PUSCH transmission, the spatial domain transmission filter is based on a most recent configuration of an SRS resource indicated before a slot with a grant for initial uplink transmission.

In Example 9, the subject matter of Examples 6-8 includes, wherein the processing circuitry is to: update the spatial domain transmission filter for each PUSCH transmission occasion according to an SRI configuration received in a latest RRC signaling.

In Example 10, the subject matter of Examples 1-9 includes, transceiver circuitry coupled to the processing circuitry; and, one or more antennas coupled to the transceiver circuitry.

Example 11 is a non-transitory computer-readable storage medium that stores instructions for execution by one or more processors of a base station operating in a 5G New Radio (NR) communication network, the instructions to configure the one or more processors for a semi-persistent scheduling (SPS) transmission or a grant-free transmission in the 5G NR communication network and to cause the base station to: encode downlink control information (DCI) format 0_1, the DCI format 0_1 including a sounding reference signal (SRS) resource indicator (SRI) for transmission to a user equipment (UE) on a physical downlink control channel (PDCCH); decode first uplink data received via a grant-based transmission on a physical uplink shared channel (PUSCH), the grant-based transmission associated with a spatial domain transmission filter configured based on the SRI indicated in the DCI format 0_1; encode radio resource control (RRC) signaling indicating a second SRI; and decode second uplink data received via a grant-free transmission on the PUSCH, wherein the grant-free transmission is associated with the spatial domain transmission filter configured for Type 1 or Type 2 grant-free PUSCH transmission based on the second SRI.

In Example 12, the subject matter of Example 11 includes, grant-free PUSCH transmission, the spatial domain transmission filter is based on a most recent configuration of an SRS resource configured before the SRI is indicated by the RRC signaling.

In Example 13, the subject matter of Examples 11-12 includes, grant-free PUSCH transmission, the spatial domain transmission filter is based on a most recent configuration of an SRS resource indicated before a slot with a grant for initial uplink transmission.

Example 14 is a non-transitory computer-readable storage medium that stores instructions for execution by one or more processors of a user equipment (UE), the instructions to configure the one or more processors for a semi-persistent scheduling (SPS) transmission or a grant-free transmission in a 5G New Radio (NR) communication network and to cause the UE to: decode radio resource control (RRC) signaling from a base station, the RRC signaling configuring a plurality of transmission configuration information (TCI) candidates, the plurality of TCI candidates indicating a first set of transmission beams for an initial transmission on an SPS physical downlink shared channel (PDSCH); decode a medium access control (MAC) control element (MAC CE) from the base station, the MAC CE re-configuring the plurality of TCI candidates to include, at least a second set of transmission beams for the SPS PDSCH; select a transmission beam from the second set of transmission beams based on a TCI beam index used to select an initial transmission beam for the initial transmission; and decode downlink data received in a subsequent transmission via the selected transmission beam on the SPS PDSCH.

In Example 15, the subject matter of Example 14 includes, wherein the instructions further configure the one or more processors to cause the UE to decode downlink control information (DCI), the DCI including a TCI field with the TCI beam index, the TCI beam index indicating the initial transmission beam for the initial transmission on the SPS PDSCH.

In Example 16, the subject matter of Examples 14-15 includes, wherein the instructions further configure the one or more processors to cause the UE to decode a second RRC signaling from the base station, the second RRC signaling including an updated TCI beam index; select the transmission beam from the second set of transmission beams based on the updated TCI beam index.

In Example 17, the subject matter of Examples 14-16 includes, wherein the instructions further configure the one or more processors to cause the UE to decode downlink control information (DCI) format 0_1, the DCI format 0_1 including a sounding reference signal (SRS) resource indicator (SRI); and determine a spatial domain transmission filter for grant-based transmission of uplink data based on the SRI, wherein the SRI is received in slot n and indicates a configured SRS resource prior to slot n.

In Example 18, the subject matter of Examples 14-17 includes, wherein the instructions further configure the one or more processors to cause the UE to determine a sounding reference signal (SRS) resource indicator (SRI), the SRI indicated by the RRC signaling; and configure a spatial domain transmission filter for Type 1 or Type 2 grant-free physical uplink shared channel (PUSCH) transmission based on the SRI.

In Example 19, the subject matter of Example 18 includes, grant-free PUSCH transmission, the spatial domain transmission filter is based on a most recent configuration of an SRS resource configured before the SRI is indicated by the RRC signaling.

In Example 20, the subject matter of Examples 18-19 includes, grant-free PUSCH transmission, the spatial domain transmission filter is based on a most recent configuration of an SRS resource indicated before a slot with a grant for initial uplink transmission.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Various aspects discussed herein refer to a UE, a gNB (or base station or eNB) or other network entities, which may be without a specific reference to one of the figures. In this case, such reference to a UE, a gNB (or base station or eNB) or other network entities can be associated to an existing (similar) reference in one or more of the figures (e.g., a reference to a function being performed by "a UE", such function can be performed by any of the illustrated UEs, such as UE 101). Additionally, any reference to a UE or a gNB in FIG. 7 or thereafter can refer to any referenced UE or gNB (or base station) in any of FIG. 1A-FIG. 7.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, the inventive subject matter lies in less than all features of a single disclosed aspect. Thus the following claims are hereby incorporated into the Detailed Description, with each claim standing on its own as a separate aspect.

What is claimed is:

1. An apparatus of a user equipment (UE), the apparatus comprising:
   processing circuitry, wherein to configure the UE for semi-persistent scheduling (SPS) transmission or grant-free transmission in a 5G New Radio (NR) communication network, wherein the processing circuitry is configured to:
      decode radio resource control (RRC) signaling from a base station, wherein the RRC signaling configures a plurality of transmission configuration information (TCI) candidates, wherein the plurality of TCI candidates indicate a first set of transmission beams for an initial transmission on an SPS physical downlink shared channel (PDSCH), and wherein the initial transmission uses an initial transmission beam that is selected based on a TCI beam index;
      decode a medium access control (MAC) control element (MAC CE) from the base station, wherein the MAC CE indicates a re-configuration of the plurality of TCI candidates to include at least a second set of transmission beams for the SPS PDSCH;
      select a transmission beam from the second set of transmission beams based on the TCI beam index; and
      decode downlink data received in a subsequent transmission via the selected transmission beam on the SPS PDSCH; and
   memory coupled to the processing circuitry, wherein the memory is configured to store the first and second sets of transmission beams.

2. The apparatus of claim 1,
   wherein the processing circuitry is further configured to:
      decode downlink control information (DCI), wherein the DCI includes a TCI field with the TCI beam index, and wherein the TCI beam index indicates the initial transmission beam for the initial transmission on the SPS PDSCH.

3. The apparatus of claim 1,
wherein the processing circuitry is further configured to:
decode a control resource set (CORESET), wherein the CORESET indicates the TCI beam index.

4. The apparatus of claim 1,
wherein the processing circuitry is further configured to:
decode a second RRC signaling from the base station, wherein the second RRC signaling includes an updated TCI beam index; and
select the transmission beam from the second set of transmission beams based on the updated TCI beam index.

5. The apparatus of claim 1,
wherein the processing circuitry is further configured to:
decode downlink control information (DCI) format 0_1, wherein the DCI format 0_1 includes a sounding reference signal (SRS) resource indicator (SRI); and
determine a spatial domain transmission filter for grant-based transmission of uplink data based on the SRI, wherein the SRI is received in slot n and indicates a configured SRS resource prior to slot n.

6. The apparatus of claim 1,
wherein the processing circuitry is further configured to:
determine a sounding reference signal (SRS) resource indicator (SRI), wherein the SRI is indicated by the RRC signaling; and
configure a spatial domain transmission filter for Type 1 or Type 2 grant-free physical uplink shared channel (PUSCH) transmission based on the SRI.

7. The apparatus of claim 6,
wherein for the Type 1 grant-free PUSCH transmission, the spatial domain transmission filter is based on a most recent configuration of an SRS resource configured before the SRI is indicated by the RRC signaling.

8. The apparatus of claim 6,
wherein for the Type 2 grant-free PUSCH transmission, the spatial domain transmission filter is based on a most recent configuration of an SRS resource indicated before a slot with a grant for initial uplink transmission.

9. The apparatus of claim 6,
wherein the processing circuitry is further configured to:
update the spatial domain transmission filter for each PUSCH transmission occasion according to an SRI configuration received in a latest RRC signaling.

10. The apparatus of claim 1,
further comprising transceiver circuitry coupled to the processing circuitry; and
one or more antennas coupled to the transceiver circuitry.

11. A non-transitory computer-readable storage medium that stores instructions for execution by one or more processors of a user equipment (UE), the instructions to configure the one or more processors for a semi-persistent scheduling (SPS) transmission or a grant-free transmission in a 5G New Radio (NR) communication network and to cause the UE to:
decode radio resource control (RRC) signaling from a base station, wherein the RRC signaling configures a plurality of transmission configuration information (TCI) candidates, wherein the plurality of TCI candidates indicate a first set of transmission beams for an initial transmission on an SPS physical downlink shared channel (PDSCH), and wherein the initial transmission uses an initial transmission beam that is selected based on a TCI beam index;
decode a medium access control (MAC) control element (MAC CE) from the base station, wherein the MAC CE indicates a re-configuration of the plurality of TCI candidates to include at least a second set of transmission beams for the SPS PDSCH;
select a transmission beam from the second set of transmission beams based on the TCI beam index; and
decode downlink data received in a subsequent transmission via the selected transmission beam on the SPS PDSCH.

12. The non-transitory computer-readable storage medium of claim 11,
wherein the instructions further configure the one or more processors to cause the UE to:
decode downlink control information (DCI), wherein the DCI includes a TCI field with the TCI beam index, and wherein the TCI beam index indicates the initial transmission beam for the initial transmission on the SPS PDSCH.

13. The non-transitory computer-readable storage medium of claim 11,
wherein the instructions further configure the one or more processors to cause the UE to:
wherein the second RRC signaling includes an updated TCI beam index; and
select the transmission beam from the second set of transmission beams based on the updated TCI beam index.

14. The non-transitory computer-readable storage medium of claim 11,
wherein the instructions further configure the one or more processors to cause the UE to:
decode downlink control information (DCI) format 0_1, wherein the DCI format 0_1 includes a sounding reference signal (SRS) resource indicator (SRI); and
determine a spatial domain transmission filter for grant-based transmission of uplink data based on the SRI, wherein the SRI is received in slot n and indicates a configured SRS resource prior to slot n.

15. The non-transitory computer-readable storage medium of claim 11,
wherein the instructions further configure the one or more processors to cause the UE to:
determine a sounding reference signal (SRS) resource indicator (SRI), wherein the SRI is indicated by the RRC signaling; and
configure a spatial domain transmission filter for Type 1 or Type 2 grant-free physical uplink shared channel (PUSCH) transmission based on the SRI.

16. The non-transitory computer-readable storage medium of claim 15,
wherein for the Type 1 grant-free PUSCH transmission, the spatial domain transmission filter is based on a most recent configuration of an SRS resource configured before the SRI is indicated by the RRC signaling.

17. The non-transitory computer-readable storage medium of claim 15,
wherein for the Type 2 grant-free PUSCH transmission, the spatial domain transmission filter is based on a most recent configuration of an SRS resource indicated before a slot with a grant for initial uplink transmission.

18. A user equipment (UE), comprising:
a radio; and
one or more processors in communication with the radio, wherein the one or more processors are configured to cause the UE to:
decode radio resource control (RRC) signaling from a base station, wherein the RRC signaling configures a plurality of transmission configuration information (TCI) candidates, wherein the plurality of TCI candidates indicate a first set of transmission beams for an initial transmission on an SPS physical downlink shared channel (PDSCH), and wherein the initial transmission uses an initial transmission beam that is selected based on a TCI beam index;

decode a medium access control (MAC) control element (MAC CE) from the base station, wherein the MAC CE indicates a re-configuration of the plurality of TCI candidates to include at least a second set of transmission beams for the SPS PDSCH;

select a transmission beam from the second set of transmission beams based on the TCI beam index; and decode downlink data received in a subsequent transmission via the selected transmission beam on the SPS PDSCH.

19. The UE of claim 18, wherein the one or more processors are further configured to cause the UE to:

decode downlink control information (DCI), wherein the DC1 includes a TCI field with the TCI beam index, and wherein the TCI beam index indicates the initial transmission beam for the initial transmission on the SPS PDSCH.

20. The UE of claim 18, wherein the one or more processors are further configured to cause the UE to:

decode a control resource set (CORESET), wherein the CORESET indicates the TCI beam index.

* * * * *